(12) United States Patent
Yazami et al.

(10) Patent No.: US 7,794,880 B2
(45) Date of Patent: Sep. 14, 2010

(54) FLUORINATION OF MULTI-LAYERED CARBON NANOMATERIALS

(75) Inventors: Rachid Yazami, Los Angeles, CA (US); André Hamwi, Clermont-Ferrand (FR)

(73) Assignees: California Institute of Technology, Pasadena, CA (US); Centre National de la Recherche Scientifique (C.N.R.S), Paris (FR); Universite Blaise Pascal, Clermont-Ferrand (FR)

( * ) Notice: Subject to any disclaimer, the term of this patent is extended or adjusted under 35 U.S.C. 154(b) by 0 days.

(21) Appl. No.: 11/560,570

(22) Filed: Nov. 16, 2006

(65) Prior Publication Data

US 2007/0231696 A1    Oct. 4, 2007

Related U.S. Application Data

(60) Provisional application No. 60/737,186, filed on Nov. 16, 2005, provisional application No. 60/775,110, filed on Feb. 21, 2006, provisional application No. 60/775,559, filed on Feb. 22, 2006.

(51) Int. Cl.
*H01M 4/58* (2010.01)
*H01M 4/60* (2006.01)
*H01M 4/02* (2006.01)

(52) U.S. Cl. .................... 429/231.7; 429/209; 429/212

(58) Field of Classification Search ........................ None
See application file for complete search history.

(56) References Cited

U.S. PATENT DOCUMENTS

| | | | |
|---|---|---|---|
| 3,536,532 A | 10/1970 | Watanabe et al. | |
| 3,700,502 A | 10/1972 | Wantanabe et al. | |
| 3,796,604 A | 3/1974 | Gabano et al. | |
| 3,796,605 A | 3/1974 | Dechenaux et al. | |
| 3,956,018 A | 5/1976 | Kozawa | |
| 4,052,539 A | 10/1977 | Shropshire et al. | |
| 4,119,655 A | 10/1978 | Hulme | |
| 4,247,608 A | 1/1981 | Wantanabe et al. | |
| 4,431,567 A | 2/1984 | Gestaut et al. | |
| 4,438,086 A | 3/1984 | Armaki et al. | |

(Continued)

FOREIGN PATENT DOCUMENTS

CN    1092742    9/1994

(Continued)

OTHER PUBLICATIONS

Abidi et al. (2003) "Alkali Metal Ion Complexes of Functionalized Calizarenes—Competition Between Pendent Arm and Anion Bond to Sodium," *Org. Biomol. Chem.* 1:3144-3146.

(Continued)

*Primary Examiner*—Dah-Wei D Yuan
*Assistant Examiner*—Adam A Arciero
(74) *Attorney, Agent, or Firm*—Greenlee Sullivan, P.C.

(57) ABSTRACT

The invention provides fluorinated multi-layered carbon nanomaterials and methods for their production. In one aspect of the invention, the carbon nanomaterials are partially fluorinated and retain some unreacted carbon. The invention also provides electrodes and electrochemical devices incorporating the fluorinated carbon nanomaterials of the invention. In one aspect of the invention, the electrochemical has a first electrode including the at least partially fluorinated carbon materials of the invention and a second electrode including a source of lithium ions.

20 Claims, 20 Drawing Sheets

U.S. PATENT DOCUMENTS

| | | |
|---|---|---|
| 4,753,786 A | 6/1988 | Wantanabe et al. |
| 4,830,938 A | 5/1989 | McCullough et al. |
| 4,840,859 A | 6/1989 | Williams et al. |
| 4,865,931 A | 9/1989 | McCullough et al. |
| 5,106,606 A | 4/1992 | Endo et al. |
| 5,114,811 A | 5/1992 | Ebel et al. |
| 5,116,592 A | 5/1992 | Weinberg |
| 5,151,162 A | 9/1992 | Muller et al. |
| 5,175,066 A | 12/1992 | Hamwi et al. |
| 5,443,930 A | 8/1995 | Shoji et al. |
| 5,518,836 A | 5/1996 | McCullough |
| 5,532,083 A | 7/1996 | McCullough |
| 5,534,370 A | 7/1996 | Kita et al. |
| 5,702,844 A | 12/1997 | Bernard et al. |
| 5,705,689 A | 1/1998 | Lee et al. |
| 5,712,062 A | 1/1998 | Yamana et al. |
| 5,916,642 A | 6/1999 | Chang |
| 5,968,683 A | 10/1999 | Kolb |
| 6,022,643 A | 2/2000 | Lee et al. |
| 6,068,921 A | 5/2000 | Yamana et al. |
| 6,077,624 A | 6/2000 | Mitchell et al. |
| 6,100,324 A | 8/2000 | Choi et al. |
| 6,120,941 A | 9/2000 | Lee et al. |
| 6,203,814 B1 | 3/2001 | Fisher et al. |
| 6,245,465 B1 | 6/2001 | Angell et al. |
| 6,268,430 B1 | 7/2001 | Choi et al. |
| 6,306,540 B1 | 10/2001 | Hiroi et al. |
| 6,334,939 B1 | 1/2002 | Zhou et al. |
| 6,352,798 B1 | 3/2002 | Lee et al. |
| 6,358,649 B1 | 3/2002 | Yazami et al. |
| 6,479,192 B1 | 11/2002 | Chung et al. |
| 6,482,550 B1 | 11/2002 | Imachi et al. |
| 6,489,055 B1 | 12/2002 | Ichihashi et al. |
| 6,528,208 B1 | 3/2003 | Thackeray et al. |
| 6,586,133 B1 | 7/2003 | Teeteus et al. |
| 6,589,299 B2 | 7/2003 | Missling et al. |
| 6,638,662 B2 | 10/2003 | Kaneda et al. |
| 6,649,033 B2 | 11/2003 | Yagi et al. |
| 6,709,566 B2 | 3/2004 | Cumings et al. |
| 6,713,214 B2 | 3/2004 | Koga et al. |
| 6,743,547 B2 | 6/2004 | Gan et al. |
| 6,743,549 B1 | 6/2004 | Doyle et al. |
| 6,767,671 B2 | 7/2004 | Itagaki et al. |
| 6,841,610 B2 | 1/2005 | Yanagisawa |
| 6,844,115 B2 | 1/2005 | Gan et al. |
| 6,852,446 B2 | 2/2005 | Barbarich |
| 6,852,449 B2 | 2/2005 | Nagata et al. |
| 6,926,991 B2 | 8/2005 | Gan et al. |
| 6,939,383 B2 | 9/2005 | Eastin et al. |
| 6,958,198 B2 | 10/2005 | Iwamoto et al. |
| 6,986,967 B2 | 1/2006 | Barton et al. |
| 7,005,211 B2 | 2/2006 | Kim et al. |
| 7,074,523 B2 | 7/2006 | Arai et al. |
| 7,087,348 B2 | 8/2006 | Holman et al. |
| 7,563,542 B2 | 7/2009 | Yazami et al. |
| 2002/0061441 A1* | 5/2002 | Ogura et al. ............. 429/218.1 |
| 2002/0081492 A1 | 6/2002 | Gan et al. |
| 2002/0106558 A1 | 8/2002 | Maske et al. |
| 2002/0119371 A1 | 8/2002 | Haug et al. |
| 2002/0127171 A1 | 9/2002 | Smalley et al. |
| 2002/0177041 A1 | 11/2002 | Worle et al. |
| 2002/0182506 A1 | 12/2002 | Cagle |
| 2003/0003370 A1 | 1/2003 | Arai et al. |
| 2003/0049535 A1 | 3/2003 | Ohta et al. |
| 2003/0108799 A1 | 6/2003 | Lascaud et al. |
| 2003/0158310 A1 | 8/2003 | Asano et al. |
| 2003/0224168 A1 | 12/2003 | Mack et al. |
| 2004/0013814 A1 | 1/2004 | Guerfi et al. |
| 2004/0018138 A1* | 1/2004 | Hirata .................... 423/447.2 |
| 2004/0131859 A1 | 1/2004 | Chen et al. |
| 2004/0048160 A1 | 3/2004 | Omaru |
| 2004/0058247 A1 | 3/2004 | Omaru |
| 2004/0091783 A1 | 5/2004 | Cagle |
| 2004/0106047 A1 | 6/2004 | Mie et al. |
| 2004/0258986 A1 | 12/2004 | Shen et al. |
| 2005/0006623 A1 | 1/2005 | Wong et al. |
| 2005/0011710 A1 | 1/2005 | Hitchcock et al. |
| 2005/0026044 A1 | 2/2005 | Koike et al. |
| 2005/0069778 A1 | 3/2005 | Bonnett et al. |
| 2005/0118512 A1 | 6/2005 | Onuki et al. |
| 2005/0123835 A1 | 6/2005 | Sun |
| 2005/0170251 A1 | 8/2005 | Jung et al. |
| 2005/0207966 A1 | 9/2005 | Zaghib |
| 2005/0227146 A1* | 10/2005 | Ghantous et al. ......... 429/231.7 |
| 2006/0269834 A1 | 11/2006 | West et al. |
| 2007/0037063 A1 | 2/2007 | Choi et al. |
| 2007/0077493 A1 | 4/2007 | Yazami et al. |
| 2007/0077495 A1 | 4/2007 | Yazami et al. |
| 2007/0231697 A1 | 10/2007 | Yazami et al. |
| 2009/0258294 A1 | 10/2009 | Yazami et al. |

FOREIGN PATENT DOCUMENTS

| | | |
|---|---|---|
| EP | 0169407 | 1/1986 |
| EP | 0 776 053 | 5/1997 |
| EP | 1 019 975 | 7/2000 |
| EP | 1 028 476 | 8/2000 |
| EP | 1 205 003 | 5/2002 |
| EP | 1 230 708 | 8/2002 |
| EP | 1 236 239 | 9/2002 |
| EP | 1 520 318 | 4/2005 |
| EP | 1 551 069 | 7/2005 |
| FR | 2 856 674 | 12/2004 |
| FR | 2856674 | 12/2004 |
| JP | 11214037 | 8/1999 |
| JP | 2000106188 | 4/2000 |
| JP | 2000200604 | 7/2000 |
| JP | 2003187799 | 7/2003 |
| JP | 2005113361 | 4/2005 |
| JP | 2005-285440 | 10/2005 |
| JP | 2005285440 | 10/2005 |
| SU | 584369 | 12/1977 |
| WO | WO 97/02580 | 1/1997 |
| WO | WO 99/18624 | 4/1999 |
| WO | WO 99/34470 | 7/1999 |
| WO | WO 01/09972 | 2/2001 |
| WO | WO 01/33656 | 5/2001 |
| WO | WO 01/41246 | 6/2001 |
| WO | WO 01/94260 | 12/2001 |
| WO | WO 02/03430 | 1/2002 |
| WO | WO 03/004410 | 1/2003 |
| WO | WO 03/031050 | 4/2003 |
| WO | WO 03/040446 | 5/2003 |
| WO | WO 04/001888 | 12/2003 |
| WO | WO 2004/051784 | 6/2004 |
| WO | WO 2004/088769 | 10/2004 |
| WO | WO 2004/090921 | 10/2004 |
| WO | WO 2004/096704 | 11/2004 |
| WO | WO 2006/128174 | 11/2006 |
| WO | WO 2007/040547 | 4/2007 |
| WO | WO 2007/098369 | 8/2007 |
| WO | WO 2007/098478 | 8/2007 |
| WO | WO 2007/126436 | 11/2007 |

OTHER PUBLICATIONS

Arnold et al. (1987) "Evidence for Cryptand-Like Behavior in Bibracchial Lariat Ether (BiBLE) Complexes Obtained from X-Ray Crystallography and Solution Thermodynamic Studies," *J. Am. Chem. Soc.* 109:3716-3721.

Arora et al. (2004) "Battery Separators," *Chem. Rev.*, 104:4419-4462.

Audier et al. (1981) "Crystallographic Orientations of Catalytic Particles in Filamentous Carbon; Case of Simple Conical Particles," *J. Cryst. Growth* 55:549-556.

Banerjee et al. (2003) "Rational Chemical Strategies for Carbon Nanotube Functionalization," *Chem. Eur. J.* 9:1898-1908.

Basire et al. (2000) "Evolution of the Lamellar Structure During Crystallization of a Semicrystalline-Amorphous Polymer Blend: Time-Resolved Hot-Stage SPM Study," *Phys. Rev. Lett.* 85:5587-5590.

Beer et al. (2003) "Transition Metal and Organometallic Anion Complexation Agents," *Coord. Chem. Rev.* 240:167-189.

Bertani et al. (1999) "$^{19}F/^{29}Si$ Distance Determination in Fluoride-Containing Octadecasil by Hartmann-Hahn Corss-Polarization Under Fast Magic-Angle Spinning," *Solid State Magn. Res.* 13:219-229.

Bethune et al. (1993) "Cobalt-Catalyzed Growth of Carbon Nanotubes with Single-Atomic0Layer Walls," *Nature* 363:605-607.

Bitter et al. (1998) "Studies on Calix(aza)crowns, II. Synthesis of Novel Proximal Doubly Bridged Calix[4]arenes by Intramolecular Ring Closure of Syn 1,3- and 1,2- to ω-Chloraolkylamides," *Tetrahedron* 54:3857-3870.

Blesa et al. (2006) "Bis(calixcrown)tetrathiafuvalene Receptors," *Chem. Eur. J.* 12:1906-1914.

Blumberg, W.E. (1960) "Nuclear Spin Lattice Relaxation Caused by Paramagnetic Impurities," *Phys. Rev.* 119:79-84.

Bonnamy et al. (1999) "Carbonization of Various Precursors. Effect of Heating Rate: Part II: Transmission Electron Microscopy and Physicochemical Studies," *Carbon* 37:1707-1724.

Bonnamy et al. (1999) "Carbonizaion of Various Preursors. Effect of Heating Rate: Part I: Optical Microscopy Studies,"*Carbon* 37:1691-1705.

Bourderau et al. (1999) "Amorphous Silicon as a Possile Anode Material for Li-ion Batteries," *J. Power Sources* 81:233-236.

Bruce, G. (2005) "Development of a CFx D Cell for Man Portable Apllications," In; Joint Service Power Expo, Power Point Presentation.

Bulusheva et al. (2002) "Atomic Arrangement and Electronic Structure of Graphite Fluoride C2F," *Phys. Low-Dim. Struct.* 7/8:1-14.

Cassell et al. (1999) "Large Scale CVD Synthesis of Single-Walled Carbon Nanotubes," *J. Phys. Chem. B* 103(31):6484-6492.

Chamssedine et al. (2007) "Reactivity of Carbon Nanofibers with Fluorine Gas," *Chem. Mater.* 19:161-172.

Charlier et al. (1993) "First Principles Study of Graphite Monofluoride $(CF)_n$," *Phys. Rev. B*, 47:16162-16168.

Chevalier et al. (1994) "Anionic Intercalation in $La_2CuO_4$ Oxide by Fluorine or Chlorine Treatment," *Mol. Cryst. Liq. Cryst.* 244:135-142.

Cheng et al. (1998) "Large-Scale and Low-Cost Synthesis of Single-Walled Carbon Nanotubes by the Catalytic Pyrolysis of Hydrocarbons," *Appl. Phys. Lett.* 72(25):3282-3284.

Chiang et al. (2001) Purification and Characterization of Single-Walled Carbon Nanotubes (SWNTs) Obtained from the Gas-Phase Decomposition of CO (HiPco Process) *J. Phys. Chem. B* 105:8297-8301.

Chieu et al. (1982) "Raman Studies of Benzene-Derived Graphite Fibers," *Phys. Rev. B* 26:5867.

Chung et al. (1995) "Electrochemical Behavior of Calix[4]arenediquinones and Their Cation Binding Properties," *J. Electroanalytical Chem.* 396:431-439.

Dahn et al. (2000) "Energy and Capacity Projections for Practical Dual-Graphite Cells," *J. Electrochem. Soc.* 147(3):899-901.

Davidson (2003) "Lithium Batteries, Molecular Expressions, Electricity and Magnetism," Florida State Univ., http://micro.magnet.fsu.edu/electromag/electricity/ batteries/lithium.html , Downloaded Dec. 15, 2005.

De Jong et al. (2000) "Carbon Nanofibers: Catalytic Synthesis and Applications," *Catalysis Reviews-Science and Engineering* 42:481-510.

Derf et al. (2001) "Tetrathiafulvalene Crowns: Redox Switchable Ligands," *Chem. Eur. J.* 7(2):447-455.

Dietrich (1993) "Desgn of Anion Receptors: Applications," *Pure Apple. Chem.* 65(7):1457-1464.

Ding et al. (2001) "Change of Conductivity with Salt Content, Solvent Composition, and Temperature for Electrolytes of LiPF6 in Ethylene Carbonate-Ethyl Methyl Carbonate," *J. Electrochem. Soc.* 148(10):A1196-A1204.

Dresselhaus et al. (1981) "Intercalation Compounds of Graphite," *Adv. Phys.* 30(2):139-326.

Dubois et al. (2006) "EPR and Solid-State NMR Studies of Poly(dicarbon monofluoride) $(C_2F)_n$," *J. Phys. Chem. B.* 110:11800-11808.

Dubois et al. (2004) "NMR and EPR Studies of Room Temperature Highly Fluorinated Graphite Heat-Treated Under Fluorine Atmosphere," *Carbon* 42:1931-1940.

Duclaux, L. (2002) "Review of the Doping of Carbon Nanotubes (Multiwalled and Single-Walled)," *Carbon* 40:1751-1764.

Duesberg et al. (1998) "Chromatographic Size Separation of Single-Wall Carbon Nanotubes," *Appl. Phys. A* 67:117-119.

Duijvestjn et al. (1983) "$^{13}C$ NMR Spectroscopy in Diamonds Using Dynamic Nuclear Polarization," *Chem. Phys. Lett.* 102:25-28.

Ebert et al. (1974) "Carbon Monofluoride. Evidence for a Structure Containing an Infinite Array of Cyclohexane Boats," *J. Am. Chem Soc.*, 96:7841-7842.

Ehrlich, G.M. (2001) "Lithium-Ion Batteries," In; Handbook of Batteries, 3$^{rd}$ ed., Ch. 35, New York, McGraw Hill, pp. 35.1-35.90.

Endo, M. (1988) "Grow Carbon Fibers in the Varpor Phase," *Chemtech* :568-576.

Feng et al. (2003) "Removal of Some Impurities From Carbon Nanotubes," *Chem. Phys. Lett.* 375:645-648.

Frank et al. (1975) "Preparation and Crystal-Structure of $Li_3SN_5$ and Structural Relations Between Phases of Systems Li-SN and Li-PB," *Z. Naturforsch. B* 30:316-322.

Fujimoto (1997) "Structure Analysis of Graphite Fluoride by Rietveld Method," Carbon, 35:1061-1065.

Furdin, G. (1998) "Exfoliation Process and Elaboration of New Carbonaceous Materials," *Fuel* 77(6):479-485.

Giraudet et al. (2006) "Solid-State NMR Studies of Covalent Graphite Fluorides $(CF)_n$ and $(C_2F)_n$," *J. Phys. Chem. Solids* 67(5-6):1100-1105.

Giraudet et al. (2005) "Solid-State $^{19}F$ and $^{13}C$ NMR of Room Temperature Fluorinated Graphited and Samples Thermally Treated Under Fluorine: Low-Field and High-Resolution Studies," *J. Solid State Chem.* 118:1262-1268.

Giraudet et al. (2005) "Solis-State NMR ($^{19}F$ and $^{13}C$) Study of Graphite Monofluoride $(CF)_n$: 19F Spin;Lattice Magnetic Relaxation and 19F/13C Distance Determination by Hartmann-Hahn Cross Polarization," *J. Phys. Chem. B* 109:175-181.

Gladyshevskii et al. (1964) "New Examples of the Structural Type $Li_{22} Pb_5$," *Sov. Phys. Crystallogr.* 9(3):269-271.

Gokel et al. (2000) "Experimental Evidence for Alkali Metal Cation—π Interactions," *Eur. J. Chem.* :2967-2978.

Graetz et al. (2003) "Highly Reversible Lithium Storage in Nanostructured Silicon," *Electrochemical and Solid-State Letters*, 6(9) A194-A197.

Guerin et al. (2004) "Hybrid-Type Graphite Fluoride as Cathode Material in Promary Lithium Batteries," *Electrochem. Solid-State Lett.* 7(6):A159-A162.

Gupta et al. (2001) "Raman Scattering Study of Highly Fluorinated Graphite," *J. Fluorine Chem.*, 110:145-151.

Gupta et al. (2003) "A Study on the Formation Mechanism of Graphite Fluorides by Raman Spectroscopy," *J. Fluorine Chem.* 120:143-150.

Hafner et al. (1998) "Catalytic Growth of Single-Wall Carbon Nanotubes From Metal Particles," *Chem. Phys. Lett.* 296(1-2): 4195-202.

Hagaman et al. (1998) "Solid-State $^{13}C$ and $^{19}F$ NMR Characterization of Fluorinated Charcoal," *Energy & Fuel* 12:399-408.

Hamwi et al. (1997) "Fluorination of Carbon Nanotubes," *Carbon* 35:723-728.

Hamwi et al. (1998) "Electrochemical Properties of Carbon Nanotube Fluorides in a Lithium Cell System," *Mol. Cryst. Liq. Cryst.* 310:185-190.

Hamwi, A. (1996) "Fluorine Reactivity with graphite and Fullerenes. Fluoride Derivatives and Some Practiccal Electrochemical Applications," *J. Phys. Chem. Solids* 57(6-8):677-688.

Hany et al. (1997) "Low-Temperature Carbon Fluoride for High Power Density Lithium Primary Batteries," *J. Power Sources* 68(2):708-710.

Harris, P. (1999) *Carbon Nanotubes and Related Structures*, Cambridge University Press, Cambridge, pp. 103.

Harutyunyuan et al. (2002) "Purification of Single-Wall Carbon Nanotubes by Selective Microwave Heating of Catalyst Particles," *J. Phys. Chem. B* 106:8671-8675.

Holzinger et al. (2000) "A New Purification Method for Single-Wall Carbon Nanotubes (SWNTs)," *Appl. Phys. A* 70:599-602.

Hopf et al. (1972) "Structure of the Lithium Germanide Phase $Li_7Ge_2$," *Z. Naturforsch. B* 22:1157-1160.

Iijima, S. (1991) "Helical Microtubules of Graphite Carbon," *Nature* 354:56-58.

Iijima et al. (1993) "Single-Shell Carbon Nanotunbes 1-nm Diameter," *Nature* 363:603-605.

Inagaki et al. (2004) "Exfoliation Process of Graphite Via Intercalation Compounds with Sulfuric Acid," *J. Phys. Chem. Solids* 65:133-137.

Inagaki et al. (1994) "Graphite Exfoliation at Room Temperature and its Structural Annealing," *Carbon* 32(7):1253-1257.

International Search Report Coressponding to International Application No. PCT/US07/62518, Mailed Sep. 27, 2007.

International Search Report Corresponding to International Application No. PCT/US 05/37871, Mailed Apr. 19, 2006.

International Search Report Corresponding to International Application No. PCT/US05/08897, Mailed Aug. 28, 2006.

International Search Report corresponding to International Application No. PCT/US/03/28395, Mailed Feb. 8, 2005.

Jacobs (2005) Lithium Battery Basics, Machine Design, www.machinedesign.com/ASP/strArticleID/55501/strSite/MDSite/viewSelected Art.asp.

Jacobs (2005) "Long-lasting Lithiums," *Electron. Comm Technol.*, http://dataweek/co.za/Article.ASP?pklArticleID=1847&pklIssueID=455.

Johansson, P. (2006) "Intrinsic Anion Oxidation Potentials," *J. Phys. Chem.* 110:12077-12080.

Johnson et al. (1965) "The Crystal Structure of $Li_{15}Ge_4$," *Acta. Cryst.* 18:131-132.

Journet et al. (1997) "Large-Scale Production of Single-Walled Carbon Nanotubes by the Electric-Arc Technique," *Nature* 388:756-758.

Kelly et al. (1999) "Insight into the Mechanicsm of Sidewall Functionalization of Single-Walled Nanotubes: An STM Study," *Chem. Phys. Lett.* 313:445-450.

Kita et al. (1979) "Chemical Composition and Crystal Structure of Graphite Fluoride," *J. Am. Chem. Soc.*, 101:3832-3841.

Kitiyanan et al. (2000) "Controlled Production of Single-Wall Carbon Nanotubes by Catalytic Decomposition of CO on Bimetallic Co—Mo Catalysts," *Chem. Phys. Lett.* 317(3-5):497-503.

Knight et al. (1980) "Characterization of Diamond Films by Ranan Spectroscopy," *J. Mater Res.* 4:385-393.

Kovtyukhova et al. (2003) "Individual Single-Walled Nanotubes and Hydrogels Made by Oxidative Exfoliation of Carbon Nanotube Ropes," *J. Am. Chem. Soc.* 125:9761-9769.

Krawietz et al. (1998) "Characterization of Poly(carbon monofluoride) by 19F and 19F to 13C Cross Polarization MAS NMR Spectroscopy," *Chem. Commun.* 19:2151-2151.

Kuga et al. (1993) "Laser-Assisted Exfoliation of Potassium-Ammonia-Graphite Intercalation Compounds," *Carbon* 31(1):201-204.

Kuriakose et al. (1965) "Kinetics of Reactions of Elemental Fluorine. IV. Fluorination of Graphite," *J. Phys. Chem.* 69:2272-2274.

Lam et al. (Jun. 27, 2005) "Physical Characteristics and Rate Performance $(CF_x)_n$ (0.33<x<0.66) in Lithium Batteries," *J. Power Sci.* 153:354-359.

Lee et al. (2003) "The Physiochemical Characteristics of Modified Carbon Fibers by Fluorination," *Korean J. Chem. Eng.* 20(1):151-156.

Lee et al. (2004) "Synthesis of a Series of Fluorinated Boronate Compounds and Tehir Uses as Additives in Lithium Battery Electrolytes," *J. Electrochem. Soc.* 151(9):A1429-1435.

Lee et al. (Aug. 1998) "The Synthesis of a New Family of Boron-Based Anion Receptors and The Study of Their Effect on Ion Pair Dissociation and Conductivity of Lithium Salts in Nonaqueous Solutions," *J. Electrochem. Soc.* 145(8):2813-2818.

Li et al. (2000) "The Crystal Structural Evolution of Nano-Si Anode Caused by Lithium Insertion and Extraction at Room Temperature," *Solid State Ionics*, 135:181-191.

Li et al. (1999) "A High Capacity Nano-Si Composite Anode Material for Lithium Rechargeable Batteries," *Electrochemical and Solid-State Letters*, 2(11) 547-549.

Limthongkul et al. (2003) "Electorchemically-Driven Solid-State Amorphization in Lithium-Silicon Alloys and Implications for Lithium Storage," *Acta Materialia* 51:1103-1113.

Linden et al. (2001) "Lithium Batteries," In; *Handbook of Batteries*, 3$^{rd}$ ed., Ch. 14, New York, McGraw Hill, pp. 14.1-14.99.

Liu et al. (1998) "Fullerene Pipes," *Science* 280:1253-1256.

Liu et al. (2005) "Versatile Self-Complexing Compounds Based on Covalently Linked Donoe-Acceptor Cyclophanes," *Chem. Eur. J.* 11:369-385.

Magasinski et al. (2002) "Graphitization, Intercalation, and Exfoliation of Cokes and Anthracites: A Comparative Study," *Fuel Processing Technol.* 79(3):259-264.

Mark et al. (1986) "Electron-Transfer Polymers," In; *Encyclopedia of Polymer Science and Engineering*, 2$^{nd}$ ed., vol. 5, Wiley, pp. 725-755.

Menges et al. (1969) "Crystal Structure of Lithium Germanide, A New Type of Three-Dimensional Bonding of Element(IV) Atoms," *Z. Naturforsch. B* 24:1351-1352.

Messaoudi et al. (1991) "Chemical-Reduction of $FeCl_3$-Graphite Intercalation Compounds with Potassium Naphalene Complex in Tetrahydrofuran," *J. Mater. Chem.* 1(5):735-738.

Mickelson et al. (1998) "Fluorination of Single-Wall Carbon Nanotubes," *Chem. Phys. Lett.* 296:188-194.

Mitkin et al. (2002) "X-ray Electron- and Auger-Spectroscopic Study of Superstoichiometric Fluorographite-Like Materials," *J. Struct. Chem.*, 43:843-855.

Mittkin et al. (2003) "Types of Inorganic Fluorocarbon Polymer Materials and Structure-+roperty Correlation Problems," *J. Struct. Chem.* 44:82-115 (Translated from *Zhurnal Structunoi Khimii* 44:99-138).

Mochida et al. (2000) "Chemistry of Synthesis, Structure, Preparation and Application of Aromatic-Derived Mesophase Pitch," *Carbon* 38:305-328.

Morita et al. (1980) "Evaluation of Cathode Materials for the Lithium/Carbonmonofluride Battery," *J. Power Sources* 5:111-125.

Nakajima et al. (1999) "Electrochemical Behavior of Surface-Fluorinated Graphite," Electrochem. Acta, 44:2879-2888.

Nakajima et al. (1991) "Synthesis and Structures of Graphite Fluorides," In; *Graphite Fluorides and Carbon-Fluorine Compounds*, CRC Press, Boca Raton, FL, Ch. 2, pp. 11-41.

Nakajima et al. (1991) "Lithium-Graphite Fluoride Battery," In; *Graphite Fluorides and Carbon-Fluorine Compounds*, CRC Press, Boca Raton, FL, Ch. 4, pp. 77-109.

Nakajima, T. (1995) "Synthesis, Structure, and Physicochemical Properties of Fluorine-Graphite Intercalation Compounds," In; *Fluorine-Carbon and Fluoride-Carbon Materials*, Marcel Dekker, New York, pp. 1-31.

Nakamizo et al. (1974) "Laser Raman Studies on Carbons," *Carbon* 12:259-267.

Nanse et al. (1997) "Fluorination of Carbon Blacks: An X-Ray Photoelectron Spectroscopy Study: I. A literature Review of XPS Studies of Fluorinated Carbons. XPS investigation of some reference compounds," *Carbon*, 35:175-194.

Nasimbulin eet al. (2005) "Synthesis of Nanoparticles Using Vapor-Phase Decomposition of Copper(II) Acetylacetonate," *Colloid J.* 67(1):1-20.

Nazri, M. (2004) "Liquid Electrolytes: Some Theoretical and Practical Aspects," In; *Lithium Batteries Science and Technology*, Ch. 17, Kluer Academic Publisherss, pp. 509-573.

Nemanich et al. (1977) "Raman Scattering from Intercalated Donor Compounds of Graphite," *Phys. Rev. B* 16(6):2965-2972.

Nesper (1990) "Structure and Chemical Bonding in Zintl-Phases Containing Lithium," *Prog. Solid-State Chem.* 20:1-45.

Oberlin et al. (1989) "High-Resolution TEM Studies of Carbonization and Graphitization," *Chemistry and Physics of Carbon*, Thrower, P.A. ed., vol. 22, New York, Marcel Dekker, pp. 1-143.

Ohara et al. (2003) "Li Insertion/Extraction Reaction at a Si Film Evaporated on a Ni Foil," *Journal of Power Sources*, 119-121.

Okotrub et al. (2000) "Fluorinated Cage Multiwall Carbon Nanoparticles," *Chem. Phys. Lett.* 323:231-236.

Osswald et al. (2005) "Elimination of D-Band in Raman Spectra of Double-Wall Carbon Nanotubes by Oxidation," *Chem. Phys. Lett.* 402:422-427.

Panich A.M. (1999) "Nuclear Magnetic Resonance Study of Fluorine-Graphite Intercalation Compounds and Graphite Fluorides," *Synth. Matals* 100:169-185.

Panich et al. (2001) "On Paramagnetism in Fluorinated Graphite: EPR and Solid-State NMR Study," *J. Phys. Chem. Solids* 62:959-964.

Pelikan et al. (2003) "On the Structural and Electronic Properties of Poly(dicarbon monofluoride): Solid-State Semi-Empirical INDO Study," *J. Solid State Chem.*, 174:233-240.

Petitjean et al. (1994) "Exothermic Exfoliation of Graphite-Intercalation Compounds Containing Perchloric-Acid," *Carbon* 32(3):461-467.

Pilarzyk "Lithium Carbon Monofluoride Coin Cells in Real-Time Clock and Memory Backup Applications," *Rayovac, White Papers*, http://www.rayovac.com/technical/wp_lithium.htm.m Downloaded Oct. 17, 2005.

Piotrowski et al. (2001) "Self-Assembled Organometallic [12]Metallacrown-3 Complexes," *Chem. Eur. J.* 7(15):3197-3207.

Press et al. (1988) *Numerical Recipes in C, The Art of Scientific Computing*, Plenum Press, New York.

Rao et al. (1992) "Raman-Scattering and Transmission-Electron-Microscopy Studies of Fluorine-Intercalated Graphite Fibers CxF ($7.8 \geq x \geq 2.9$)," *Phys. Rev. B* 45:6883-6892.

Rinzler et al. (1998) "Large-Scale Purification of Single-Wall Carbon Nanotubes: Process, Product, and Characterization," *Appl. Phys. A* 67:29-37.

Rudorf et al. (1947) "Zur Konstitution des Kohlenstoff-Monofluorides," *Z. Anorg. Allg. Chem.* 253:281-296.

Ruff et al. (1934) "Die Reaktionsprodukte der verschiedenen Kohlenstoffformen mit Fluor II (Kohlenstoff-monofluoride)," *Z. Anorg. Allg. Chem.* 217:1-18.

Sano et al. (2002) "Properties of Carbon Onions Produced by an Arc Discharge in Water," *J. Appl. Phys.* 92(5):2783-2788.

Sato et al. (2004) "On the So-Called 'Semi-Ionic' C-F Bond Character in Fluorine-GIC," *Carbon* 42:3243-3249.

Sayama et al. (2002) "New Active Material Structure in Si Thin Film Electrode for Rechargable Lithium Batteries," The 11th International Meeting on Lithium Batteries, Abstract 52, Monterey, CA, Jun. 23-28, 2002.

Seel et al. (2000) "Electrochemical Intercalation of $PF_6$ into Graphite," *J. Electrochem. Soc.* 147(3):892-898.

Shneyder "Two-Dimensional Oxidation of SiGe," 69-71, http://www.nnf.cornell.edu/1999REU/ra/Schneyder.pdf.

Shundrin et al. (2004) "The Electrochemical Oxidation of Polyfluorophenyltrifluoroborate Anions in Acetonitrile," *Z. Anorg. Allg. Chem.* 630:1253-1257.

Singh et al. (2006) "Study of Interactions of Various Ionic Species with Solvents Toward the Design of Receptors," *Theor. Chem. Acc.* 115:127-135.

Skowronski et al. (2004) "Electrochemical Intercalation of $ZnCl_2$-$CrO_3$-GIC (Graphite Intercalation Compound) with Sulfuric Acid," *Polish J. Chem.* 78:1339-1344.

Steed, J.W. (2001) "First- and Second Sphere Coordination Chemistry of Alkali Metal Crown Ether Complexes," *Coord. Chem. Rev.* 215:171-221.

Stein et al. (1987) "π-Electron Properties of Large Condensed Polyaromatic Hydrocarbons," *J. Am. Chem. Soc.* 109:3721-3729.

Su et al. (2000) "A Scalable CVD Method for the Synthesis of Single-Walled Carbon Nanotubes with High Catalyst Productivity," *Chem. Phys. Lett.* 322(5):321-326.

Sun et al. (2003) "The Compatibility of a Boron-Based Anion Receptor with the Carbon Anode in Lithium-Ion Bateriers," *Electrochem. Solid-State Lett.* 6(2):A43-A46.

Sun et al. (1998) "A Novel Lithium Battery Electrolyte Based on Lithium Fluoride and a Tris(pentafluorophenyl) Borane Anion Receptor in DME," *Electrochem. Solid-State Lett.* 1(6):239-240.

Takai et al. (2000) "Fluorine-Introduced sp3-Carbon Sites in a Nano-Sized pi-Electron System and Their Effects on the Electronic Properties," *Mol. Cryst. Liq. Cryst.* 340:289-294.

Takamura et al. (2002) "Li Insertion/Extraction Reaction of a Si Film Evaporated on Ni Foil," The 11th International Meeting on Lithium Batteries, Abstract 257, Monterey, CA, Jun. 23-28, 2002.

Takenobu et al. (2003) "Hydrogen Storage in $C_{70}$ Encapsulated Single-Walled Carbon Nanotube," *Synthetic Metals* 135-136:787-788.

Thess et al. (1996) "Crystalline Ropes of Metallic Carbon Nanotubes," *Science* 273:483-487.

Touhara et al. (1987) "On the Structure of Graphite Fluoride," *Anorg. All. Chem.*, 544:7-20.

Touhara et al. (2000) "Property Control of Carbon Materials by Fluorination," *Carbon* 38:241-267.

Touhara et al. (2002) "Property Control of New Forms of Carbon Materials by Fluorination," *J. Fluorine Chem.* 114:181-188.

Touhara et al. (1987) "Electrochemical Characteristics of Fluorine Intercalated Graphite Fiber-Lithium Cells," *Electrochemica Acta* 32(2):293-298.

Touhara et al. (2004) "Fluorination of Cup-Stacked Carbon Nanotubes, Structure and Properties," Materials Research Society Fall Meeting Proceedings, MRS Proceedings vol. 858E, Abstract No. HH12.3.

Toyoda et al. (2004) "Exfoliation of Carbon Fibers," *J. Phys. Chem. Solids* 65:109-117.

Tuinstra et al. (1970) "Raman Spectrum of Graphite," *J. Chem. Phys.* 53(3):1126-1130.

Ue et al. (2002) "Anodic Stability of Several Anions Examined by AB Initio Molecular Orbital and Density Functional Theories," *J. Electrochem. Soc.* 149(12):A1572-A1577.

Ue et al. (2006) "Electrochemical Properties of $Li[C_nF2_{n+1}BF_3]$ as Electrolyte Salts for Lithium-Ion Cells," *Solid State Ionics* 177:323-331.

Watanabe et al. (1988) "Graphite Intercalation Compound of Fluorine," In; *Graphite Fluorides*, Elsevier, Amsterdam, Ch. 8, pp. 240-261.

Wantanabe et al. (1988) "Lithium-Graphite Fluoride Battery," In; *Graphite Fluorides*, Elsevier, Amsterdam, Ch. 5, pp. 148-203.

Wantanabe et al. (1988) "Preparation, Stoichiometry and Structure of Graphite Fluoride," In; *Graphite Fluorides*, Elsevier, Amsterdam, Ch. 2, pp. 23-89.

Watanabe, N. (1981) "Characteristics and Applications of Graphite Fluoride," *Physica B* 105:17-21.

Whitacre et al. (Sep. 2006) "Low Operational Temperature Li-CFx Batteries Using Cathodes Containing Sub'Fluorinated GraphiteMaterials," *J. Power Sources* 160:577-584.

Whittingham (1975) "Mechanism of Reduction of Fluorographite Cathode," *J. Electrochem. Soc.*, 122:526-527.

Wilkie et al. (1979) "The Solid-State $^{13}$C-NMR and $^{19}$F-NMR Spectra of Some Graphite Fluorides," *J. Solid State Chem.* 30:197-201.

Winter et al. (2004) "Carbonaceous and Graphitic Anodes," In; *Lithium Batteries Science and Technology*, Ch. 5, Kluer Academic Publisherss, pp. 144-194.

Woo et al. (2003) "Structural Characteristics of Carbon Nanorods and Nanotubes Grown Using Electron Cyclotron Resonance Chemical Vapor Deposition," *J. Appl. Phys.* 94(10):6789-6795.

Xu et al. (2004) "Nonaqueous Liquid Electrolytes for Lithium-Based Rechanrgeable Batteries," *Chem. Rev.* 104:4303-4417.

Yang et al. (2002) "Characteristics and Carbonization Behaviors of Coal Extracts," *Fuel Processing Technol.* 70:207-215.

Yazami et al. (2006) "The Kinetics of Sub-Fluorinated Carbon Fluoride Cathods for Lithium Battereis," Meeting Abstracts, Electrochem Soc., 210th ECS Meeting, Oct. 29-Nov. 3, Cancun Mexico Abstract #235.

Yokomichi et al. (2000) "Temperature Dependence of Electron Spin Resonance in Fluorinated Amorphous Carbon Films," *J. Non-Cryst. Solids* 266:797-802.

Yokomichi et al. (1998) "Preparation of Fluorinated Amorphous Carbon Thin Films," *J. Non-Cryst. Solids* 227:641-644.

Yoshida et al. (1991) "Exfoliated Graphite from Various Intercalation Compounds," *Carbon* 29(8):1227-1231.

Zajac et al. (2000) "The Structure and Properties of Graphite Monofluoride Using the Three-Dimensional Cyclic Cluster Approach," *J. Solid State Chem.*, 150:286-293.

Zhao et al. (2005) "A Calixarene-Amide-tetrathiafulvalene Assembly for the Electrochemical Detection of Anions," *New J. Chem.* 29:1164-1167.

Zheng et al. (2002) "CVD Synthesis and Purification of Single-Walled Carbon Nanotubes on Aerogel-Supported Catalyst," *Appl. Phys. A* 74:345-348.

Zhou et al. (2005) "Li[$C_2F_5BF_3$] as an Electrolyte Salt for 4 V Class Lithium-Ion Cells," *J. Electrochem. Soc.* 152(2):A351-A356.

Zhou et al. (1999) "Controlled Li Doping of Si Nanowires by Electrochemical Insertion Method," Applied Physics Letters, 75(16):2447-2449.

Author (Unknown), 2004, "Meeting the Energy Need of Future Warriors," *National Academic Press*, www.nap.edu/openbook/0309092612/html/91.html, Downloaded Oct. 14, 2005.

Author (Unknown), 2004, "Meeting the Energy Need of Future Warriors," *National Academic Press*, www.nap.edu/openbook/0309092612/html/88.html, Downloaded Oct. 14, 2005.

Author (Unknown), "Lithium Batteries," Panasonic Ideas for Life, Product brochure, www.panasonic.com/industrial/battery/oem/chem/lith/index.html, Downloaded Oct. 14, 2005.

Author (Unknown), 2000-2005, PowerStream Battery Chemistry FAQ, PowerStream Technology, www.powerstream.com/BatterFAQ.html, Last Updated Aug. 17, 2003.

International Search Report Corresponding to International Application No. PCT/US06/60991, Mailed Nov. 15, 2007.

Matsuo et al., (1995), "Carbon-Fluorine Bondings of Fluorinated Fullerene and Graphite", *Zeitschrift für anorganische und allgemine Chemie*, 621:1943-1950.

Supplementary European Search Report, Corresponding to European Application No. EP 07 75 7061, completed Feb. 10, 2010.

Giraudet et al. (Web Release Nov. 15, 2005) "Comparative Performances for Primary Lithium Batteries of Some Covalent and Semi-Covalent Graphite Fluorides," *J. Power Sources* 158:1365-1372.

International Search Report, Corresponding to International Application No. PCT/US06/20911, Mailed Aug. 22, 2007.

Office Action Corresponding to Chinese Patent Application No. 200780006081.4, Issued Aug. 28, 2009.

Office Actions and Responses Corresponding to U.S. Appl. No. 11/675,308, filed Feb. 15, 2007.

Office Actions and Responses Corresponding to U.S. Appl. No. 11/677,541, filed Feb. 21, 2007.

Office Action and Response, Corresponding to U.S. Appl. No. 12/489,565, filed Jun. 23, 2009.

Written Opinion, Corresponding to International Application No. PCT/US05/37871, Mailed Apr. 19, 2006.

Written Opinion, Corresponding to International Application No. PCT/US07/62518, Mailed Sep. 27, 2007.

Written Opinion, Corresponding to International Application No. PCT/US06/60991, Mailed Nov. 15, 2007.

Written Opinion, Corresponding to International Application No. PCT/US06/20911, Mailed Aug. 22, 2007.

Bi et al. (Nov. 1995), "Nanoscale Carbon Blacks Produced by CO2 Laser Pyrolysis," *J. Mater. Res.* 10(11)2875-2884.

Nanse et al., (1997), "Fluorination of Carbon Blacks, an X-Ray Photoelectron Spectroscopy Study. Part II. XPS Study of a Furnace Carbon Black Treated with Gaseous Fluorine at Temperatures Below 100° C. Influence of the Reaction Parameters and of the Activation of the Carbon Black on the Fluorine Fixation," *Carbon* 35(3)371-388.

International Search Report and Written Opinion, Corresponding to International Application No. PCT/US07/62243, Mailed Mar. 27, 2008.

Lagow et al. (1974) "Some New Synthetic Approaches to Graphite Fluorine Chemistry," *J. Chem. Soc. Dalton Trans* :1268-1273.

Watanabe et al. (1974) "Vapor Phase Amination Reaction of Phenol Over Solid Acid Catalysts," *Nippon Kagaku Kaishi* 3:540-544.

Wood et al. (1973) "Thermodynamic, Electrochemical, and Synthetic Studies of the Graphite-Fluorine Compounds Fluoromethylidyne and Carbon Fluoride ($C_4F$)," *Chemical Abstracts* 78:366.

Yazami et al. (2007) "The Kinetics of Sub-Fluorinated Carbon Fluoride Cathodes for Lithium Batteries," *ECS Trans.* 3(36):199-211.

Office Action and English Translation, Corresponding to People's Republic of China Patent Publication No. 200680042706.8, Issued Apr. 26, 2010.

* cited by examiner

FLUORINATION OF MULTI-LAYERED CARBON NANOMATERIALS

CROSS-REFERENCE TO RELATED APPLICATIONS

This application claims priority from U.S. Provisional Application No. 60/737,186, filed Nov. 16, 2005, U.S. Provisional Application No. 60/775,110, filed on Feb. 21, 2006 and U.S. Provisional Application No. 60/775,559, filed on Feb. 22, 2006, each of which is incorporated herein by reference in its entirety to the extent not inconsistent with the disclosure herein.

BACKGROUND OF INVENTION

This invention is in the field of fluorinated multilayered carbon nanomaterials, in particular fluorinated multiwalled carbon nanotubes, multilayered carbon nanofibers, multilayered carbon nanoparticles, carbon nanowhiskers and carbon nanorods.

Fluorinated carbons are used commercially as a positive electrode material in primary lithium batteries. Fluorination of graphite allows intercalation of fluorine between the carbon layers. Other industrial applications of fluorinated carbons include use as solid lubricants or as reservoirs for very active molecular oxidizers such as $BrF_3$ and $ClF_3$.

In a lithium/$CF_x$ cell, the cell overall discharge reaction, first postulated by Wittingham (1975) Electrochem. Soc. 122: 526, can be schematized by equation (1):

$$(CF_x)_n + xnLi \leftrightarrow nC + nxLiF \quad (1)$$

Thus, the theoretical specific discharge capacity $Q_{th}$, expressed in $mAh \cdot g^{-1}$, is given by equation (2):

$$Q_{th}(x) = \frac{xF}{3.6(12+19x)} \quad (2)$$

where F is the Faraday constant and 3.6 is a unit conversion constant.

The theoretical capacity of $(CF_x)_n$ materials with different stoichiometry is therefore as follows: x=0.25, $Q_{th}$=400 $mAh \cdot g^{-1}$; x=0.33, $Q_{th}$=484 $mAh \cdot g^{-1}$; x=0.50, $Q_{th}$=623 $mAh \cdot g^{-1}$; x=0.66, $Q_{th}$=721 $mAh \cdot g^{-1}$; and x=1.00, $Q_{th}$=865 $mAh \cdot g^{-1}$.

The reactivity of carbon allotropic forms with fluorine gas differs largely owing either to the degree of graphitization or to the type of the carbon material (Hamwi A. et al.; J. Phys. Chem. Solids, 1996, 57 (6-8), 677-688). In general, the higher the graphitization degree, the higher the reaction temperature. Carbon fluorides have been obtained by direct fluorination in the presence of fluorine or mixtures of fluorine and an inert gas. When graphite is used as the starting material, no significant fluorination is observed below 300° C. From 350 to 640° C., two graphite fluorides, mainly differing in crystal structure and composition are formed: poly(dicarbon monofluoride) $(C_2F)_n$ and poly(carbon monofluoride) $(CF)_n$ (Nakajima T.; Watanabe N. Graphite fluorides and Carbon-Fluorine compounds, 1991, CRC Press, Boston; Kita Y.; Watanabe N.; Fujii Y.; J. Am. Chem. Soc., 1979, 101, 3832). In both compounds the carbon atoms take the $sp^3$ hybridization with associated distortion of the carbon hexagons from planar to 'chair-like' or 'boat-like' configuration. Poly(dicarbon monofluoride) is obtained at ~350° C. and has a characteristic structure, where two adjacent fluorine layers are separated by two carbon layers bonded by strongly covalent C—C bonding along the c-axis of the hexagonal lattice (stage 2). On the other hand, poly(carbon monofluoride) which is achieved at ~600° C. has a structure with only one carbon layer between two adjacent fluorine layers (stage 1). Graphite fluorides obtained between 350 and 600° C. have an intermediary composition between $(C_2F)_n$ and $(CF)_n$ and consist of a mixture of these two phases (Kita, 1979). The stage s denotes the number of layers of carbon separating two successive layers of fluorine. Thus a compound of stage 1 has a sequence of stacking of the layers as FCF/FCF . . . , and a compound of stage 2 has the sequence FCCF/FCCF . . . . Both poly(dicarbon monofluoride) and poly(carbon monofluoride) are known to have relatively poor electrical conductivity.

Use of fluorinated carbon nanotubes in batteries has been reported in the patent literature. Japanese Patent publication JP2005285440, Mashushita Electric Ind. Co. Ltd., reports a nonaqueous electrolyte battery including a positive electrode made of a fluorocarbon including fluorinated carbon nanotubes and a negative electrode made of materials which can provide a source of lithium ions.

Reaction of multi-walled carbon nanotubes (MWCNT) with fluorine has been reported in the scientific literature. Hamwi et al. (1997) report fluorination of carbon nanotubes having an outer diameter between 20 and 40 nm prepared by thermal decomposition of acetylene over silica-supported cobalt catalysts. Fluorination at about 500° C. for four hours under pure fluorine atmosphere led to white compounds indicative of complete fluorination. (A. Hamwi, H. Alvergnat, S. Bonnamy, F. Beguin, 1997, Carbon, 35, 723). Touhara et al. (2002) report fluorination of template synthesized carbon nanotubes having an outer diameter of 30 nm at temperatures from 50° C. to 200° C. for 5 days under 1 atm of fluorine gas. (H. Touhara et al., 2002, J. Fluorine Chem, 114, 181-188).

Reaction of carbon fibers with fluorine has also been reported. U.S. Pat. No. 6,841,610 to Yanagisawa et al. reports fluorinated carbon fibers in which the exposed edges of the carbon layers are fluorinated. The pristine carbon fiber starting material had a "herring bone" structure and an average diameter of about 100 nm. The fluorination temperature was reported as 340° C., the fluorine partial pressure as 460 mm Hg, the nitrogen partial pressure as 310 mm Hg and the reaction time as 72 hours. Touhara et al. (1987) reported reaction of elemental fluorine and heat treated vapor-grown carbon fibers having a diameter of approximately 10 microns at temperatures between 330° C. and 614° C. No residual graphite was confirmed for all compounds. The F/C ratios reported ranged between 0.53 (at 345° C.) and 0.99 at 614° C. (Touhara et al., 1987 Electrochemica Acta, Vol. 32, No. 2, 293-298).

Carbon-fluorine intercalation compounds have been also obtained by incorporating other compounds capable of acting as a fluorination catalyst, such as HF or other fluorides, into the gas mixture. These methods can allow fluorination at lower temperatures. These methods have also allowed intercalation compounds other than $(C_2F)_n$ and $(CF)_n$ to be prepared (N. Watanabe et al., "Graphite Fluorides", Elsevier, Amsterdam, 1988, pp 240-246). These intercalation compounds prepared in the presence of HF or of a metal fluoride have an ionic character when the fluorine content is very low (F/C<0.1), or an iono-covalent character for higher fluorine contents (0.2<F/C<0.5). In any case, the bonding energy measured by Electron Spectroscopy for Chemical Analysis (ESCA) gives a value less than 687 eV for the most important peak of the $F_1$ line and a value less than 285 eV for that of the $C_{1s}$ line (T. Nakajima, Fluorine-carbon and Fluoride-carbon, Chemistry, Physics and Applications, Marcel Dekker 1995 p. 13).

Hamwi et al. have reported room temperature fluorination of MWNT under a gaseous atmosphere of $F_2$, HF and $IF_5$ for about 10 hours. The F/C ratio, determined by mass uptake, was reported as 0.4. Fourier Transform Infrared Spectroscopy spectra were reported to display a broad band centered at about 1100 $cm^{-1}$, indicating the presence of semi-ionic C—F bonds (Hamwi 1997 ibid.).

U.S. Pat. No. 5,106,606 to Endo et al. report fluorinated graphite fibers having a composition of $C_5F$ to $C_{30}F$. The examples describe room temperature fluorination in the presence of a silver fluoride catalyst.

SUMMARY OF THE INVENTION

The invention provides fluorinated multi-layered carbon nanomaterials. Multi-layered carbon materials suitable for use with the invention include multi-walled carbon nanotubes (MWCNT), multi-layered carbon nanofibers (CNF), multi-layered carbon nanoparticles, carbon nanowhiskers, and carbon nanorods. These fluorinated materials are suitable for use in electrochemical devices such as primary batteries and secondary batteries. In particular, use of partially fluorinated nanomaterials in lithium batteries can provide good battery performance at high discharge rates.

In an embodiment, the invention provides a fluorinated multi-layered carbon nanomaterial obtained by direct fluorination and having an average chemical composition $CF_x$, where x is the atomic ratio of fluorine to carbon. In one aspect of the invention, x is between 0.06 and 0.95, In an embodiment, the carbon nanomaterial has a substantially ordered multi-layered structure prior to fluorination In an embodiment, the invention provides partially fluorinated carbon nanomaterials which contain both unfluorinated (unreacted) and fluorinated carbon. The unreacted carbon phase has higher electrical conductivity than the fluorinated carbon product. When the partially fluorinated material is used in the cathode of $Li/CF_x$ cell, the non-fluorinated component of the material ensures electronic conductivity whereas the fluorinated component is electrochemically active during discharge, following Equation 1. For these partially fluorinated nanomaterials, the combination of these two phenomena allows high energy densities to be obtained during discharge.

In another embodiment, the invention provides fluorinated carbon nanomaterials which contain at least two fluorinated carbon products: a more lightly fluorinated, more electrically conductive product and a more heavily fluorinated, less electrically conductive product. These fluorinated carbon materials may also contain unfluorinated carbon. As previously described, the presence of a component with a higher electrical conductivity is expected to aid $Li/CF_x$ cell performance at high discharge rates.

The invention also provides methods for fluorinating multi-layered carbon nanomaterials. In an embodiment, the methods of the invention involve contacting the multi-layered carbon nanomaterials with either fluorine or a fluorine gas mixture at a temperature greater than about 375° C. for a time greater than four hours.

The invention also provides electrochemical devices that convert chemical energy to electrochemical current, such a devices being exemplified by lithium batteries. Such a device has a first electrode comprising at least one fluorinated multi-layered carbon nanomaterial of the invention; a second electrode; and an ion-transporting material called the electrolyte and a separator material that physically separates the two electrodes and prevents direct electrical contact therebetween. In another embodiment, the electrolyte and the separator may be provided by one material, such as a solid state polymer (POE, PPE), a gelled electrolyte or a solid state electrolyte (Lithium phosphorus oxynitride (LiPON) thin film). In a lithium battery, the second electrode comprises a source of lithium ions. In an embodiment, the first electrode is a cathode or positive electrode and the second electrode is an anode or negative electrode. The anode may comprise a source of an ion corresponding to a metal of Groups 1, 2, or 3 of the Periodic Table of the Elements.

In a further aspect of the invention, an electrode is provided, the electrode comprising a fluorinated multi-layered carbon nanomaterial. Generally, the fluorinated multi-layered carbon nanomaterial is present in a composition that additionally includes a conductive diluent and a binder. Such electrodes may be employed in electrochemical devices that convert chemical energy to electrode current and in electronic devices.

DETAILED DESCRIPTION OF THE INVENTION

Figure 1:
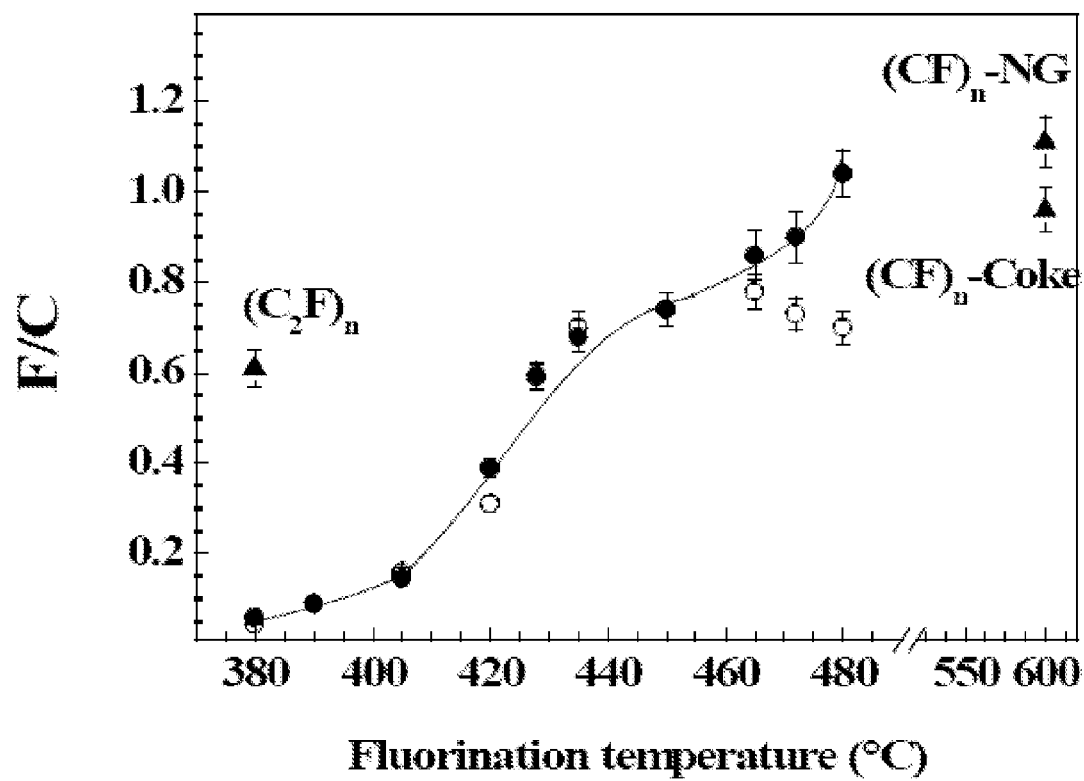
FIG. 1. Evolution of the F:C molar ratio with temperature estimated by both weight uptake (○) and quantitative NMR data (●).

In an embodiment, the invention provides a fluorinated multiwalled or multilayered carbon nanomaterial. As used herein, a carbon nanomaterial has at least one dimension that is between one nanometer and one micron. In an embodiment, at least one dimension of the nanomaterial is between 2 nm and 1000 nm. For carbon nanotubes, nanofibers, nanowhiskers or nanorods the diameter of the tube, fiber, nanowhiskers or nanorod falls within this size range. For carbon nanoparticles, the diameter of the nanoparticle falls within this size range. Carbon nanomaterials suitable for use with the invention include materials which have total impurity levels less than 10% and carbon materials doped with elements such as boron, nitrogen, silicon, tin and phosphorous.

Carbon nanomaterials suitable for use with the invention have multiple carbon layers prior to fluorination. For multi-walled nanotubes, the layers are formed by the graphene layers which make up the walls of the nanotube. For multi-layered nanoparticles, the layers are formed by multilayered fullerenes.

As used herein, the term "nanotube" refers to a tube-shaped discrete fibril typically characterized by a diameter of typically about 1 nm to about 20 nm. In addition, the nanotube typically exhibits a length greater than about 10 times the diameter, preferably greater than about 100 times the diameter. The term "multi-wall" as used to describe nanotubes refers to nanotubes having a layered structure, so that the nanotube comprises an outer region of multiple continuous layers of ordered atoms and a distinct inner core region or lumen. The layers are disposed substantially concentrically about the longitudinal axis of the fibril. For carbon nanotubes, the layers are graphene layers. Carbon nanotubes have been synthesized in different forms as Single-, Double- and Multi-Walled Carbon Nanotubes noted SWCNT, DWCNT and MWCNT respectively. The diameter size ranges between about 2 nm in SWCNTs and DWCNTs to about 20 nm in MWCNTs. In an embodiment, the MWNT used in the invention have a diameter greater than 5 nm, greater than 10 nm, between 10 and 20 nm, or about 20 nm.

Multi-walled carbon nanotubes can be produced by catalytic chemical vapor deposition (CVD). In an embodiment, carbon nanotubes produced by CVD are heat treated to improve their structural and micro textural characteristics before undergoing the fluorination process of the invention. In particular, the carbon nanotubes are heated to a sufficiently high temperature so that the graphene layers become substantially straight and well aligned with the tube axis. In an embodiment, the MWCNT are heated to produce a substantially well ordered structure. As used herein, a carbon nanostructure is substantially well ordered when it has at least one peak in its X-ray diffraction pattern, which peak 1) appears in the angular area comprised between 24.5 degrees and 26.6 degrees in the diffraction angle 2 theta, using a copper monochromatic radiation, and 2) has a full width at half maximum of less than 4 degrees in the 2 theta diffraction angle.

As used herein, carbon nanofibers refer to carbon fibers having a diameter greater than 20 nm and less than 1000 nm. In different embodiments, the carbon nanofibers used in the invention are between 20 and 1000 nm, between 40 and 1000 nm or between 80 and 350 nm. Carbon nanofibers having concentric carbon layers similar to those of multi-walled nanotubes can be produced by catalytic chemical vapor deposition and heat treatment. In particular, the CVD-produced carbon nanofibers are heated to a sufficiently high temperature so that the carbon layers become substantially straight and well aligned with the fiber axis. In different embodiments, the carbon nanofibers are heated to a temperature greater than greater than 1800° C., or greater than 2500° C. to produce a substantially well ordered structure.

As is known in the art, vapor-grown carbon fibers (VGCF) with larger diameters (e.g. 10 microns) can also be produced by catalytic chemical vapor deposition. These fibers can have a structure of layer-like growth rings which lie concentrically on top of each other (Endo, M., 1988, Chemtech, 568-576). VGCF having a diameter of one micron or greater are not intended by be encompassed by the term "carbon nanomaterials" as used in the present invention.

Carbon nanoparticles can be thought of as structures related to large, rather imperfect multilayered fullerenes (Harris, P., 1999, "Carbon Nanotubes and Related Structures", Cambridge University Press, Cambridge, p. 103). One form of carbon nanoparticle is referred to as a "carbon onion." When fully formed, carbon onions appear highly perfect in structure and have few obvious defects (Harris 1999). Carbon onions have been formed with diameters in excess of 5 nm (Harris 1999). Nasibulin et al. report formation of carbon onions between 5 nm and 30 nm (Nasimbulin, A. G., et al, 2005, Colloid J., 67(1), 1-20), while Sano et al. report formation of carbon onions between 4 and 36 nm (Sano, N. et al, 2002, J. Appl. Phys., 92(5), 2783). In different embodiments, the multi-walled carbon nanoparticles used in the invention have a diameter greater than 5 nm, greater than 10 nm, greater than 20 nm, between 5 and 35 nm, or between 10 and 30 nm.

One form of carbon nanorods, grown by electron cyclotron resonance chemical vapor deposition, was reported by Woo et al. The filamentous carbon did not form a hollow tube. High resolution transmission electron microscopy was reported to show crystalline walls, with the graphene layers being somewhat disordered and slanted about the rod axis. The average distance between the graphene layers was reported to be larger than that in MWCNT (Woo, Y. et al., 2003 J. Appl. Phys. 94(10, 6789).

Carbon whiskers, also known as graphite whiskers, are known to the art. These materials appear to have a scroll-like structure made up of an essentially continuous graphitic structure (Harris 1999).

As used herein, fluorination of a material involves introduction of fluorine into the material. In the present invention, fluorination will typically involve formation of bonds between carbon and fluorine. As is known in the art, fluorine is capable of forming both ionic and covalent bonds with carbon. In some cases, C—F bonds have also been classified as intermediate in strength between ionic and covalent bonds (e.g. partially ionic, semi-ionic, semi-covalent). The fluorination method can influence the type of bonding present in the fluorination product.

In the present invention, the fluorinated multi-layered carbon nanomaterials are produced by direct fluorination. In direct fluorination, the C—F bonds tend to be of higher energy and have a more covalent character than the C—F bonds obtained through low temperature fluorine intercalation. Fluorine-graphite intercalation compounds are expected to have carbon-fluorine bonding varying between the ionic and the semi-covalent depending on the fluorine content (Matsuo, Y. et al, 1995 Z. Anorg. Allg. Chemie, 621, 1943-1950). For example, Matsuo et al. (1995) classify XPS $F_{1s}$ spectral peaks at 687 eV, 685 eV and 683 eV, respectively, as semi-covalent, nearly ionic, and ionic. In contrast, the $F_{1s}$ peak in covalently bonded graphite fluoride is at 689.3-689.6 eV (Watanabe 1988 ibid.).

In one aspect of the invention, at least some of the carbon in the fluorination product is covalently bound or nearly covalently bound to fluorine. In another aspect of the invention, at least some of the carbon in the fluorination product is covalently bound to fluorine. In an embodiment, the carbon which is covalently bound or nearly covalently bound to fluorine is located below the surface of the fluorinated carbon nanomaterial.

As used herein, a carbon-fluorine bond in the fluorination product is classified as nearly covalent if the bond has an energy greater than the energy of "semi-ionic" or "semi-covalent" carbon-fluorine bonds in graphite intercalation compounds of fluorine obtained through low temperature fluorination of graphite, but less than the typical energy of covalent carbon-fluorine bonds in the non-surface region of poly(dicarbon monofluoride) $(C_2F)_n$ or poly(carbon monofluoride) $(CF)_n$.

The nature of the C—F bonding in the fluorination product may be determined by suitable analysis techniques. Such techniques are known to those of ordinary skill in the art, and include, but are not limited to, Fourier Transform Infrared Spectroscopy (FT-IR), Nuclear Magnetic Resonance Spectroscopy (NMR), X-Ray Photoelectron Spectroscopy (XPS) or Electron Spectroscopy for Chemical Analysis (ESCA). The extent of covalency in the C—F bonds can be assessed by comparison of the analysis results for the fluorination product to those obtained for a "standard" commonly accepted to have covalent C—F bonds. A match (within experimental error) between the analysis results for the fluorination product and those of the "standard" may be taken to indicate covalent bonding. The graphite fluorides poly(dicarbon monofluoride) $(C_2F)_n$ and poly(carbon monofluoride) $(CF)_n$ are commonly accepted to have covalent C—F bonds.

As is discussed in Example 1, solid state $^{19}$F-NMR spectra having a chemical shift peak centered at about −190 ppm/$CFCl_3$ indicate fluorine atoms covalently bonded to carbon atoms. As another example, solid state $^{13}$C-NMR spectra having a resonance present at a chemical shift of 84-88 ppm/TMS indicate carbon atoms covalently bound to fluorine atoms. Fourier Transform Infrared Spectroscopy (FT-IR) spectra showing vibration bands centered at about 1215 $cm^{-1}$ are also indicative of covalent C—F bonds.

As used herein, a partially fluorinated carbon material includes some carbon material which has reacted with fluorine and some carbon material which has not reacted with fluorine. Partially fluorinated carbon materials include materials in which primarily the exterior portion has reacted with fluorine while the interior region remains largely unreacted.

The average ratio of fluorine to carbon may be used as a measure of the extent of fluorination. This average ratio may be determined through weight uptake measurements or through NMR measurements as described in Example 1. When fluorine is not uniformly distributed through the wall thickness of the carbon material, this average ratio may differ from surface fluorine to carbon ratios as may be obtained through x-ray photoelectron spectroscopy (XPS) or ESCA.

In an embodiment, the invention provides fluorinated carbon nanomaterial obtained by direct fluorination and having an average chemical composition $CF_x$ wherein x is the atomic ratio of fluorine to carbon and has a value between 0.06 and 0.95, wherein the carbon nanomaterial has a substantially ordered multi-layered structure prior to fluorination. In other embodiments, x is between 0.06 and 0.68, between 0.3 and 0.66, or between 0.39 and 0.95.

In an embodiment, x is between 0.06 and 0.68 and the fluorinated material displays a) an X-ray diffraction peak in the 24.5-26.6 degrees angle range using a Cu monochromatic radiation source and b) a $^{19}$F NMR peak in the range between (−160) ppm and (−200) ppm/$CFCl_3$. The XRD peak for unfluorinated carbon nanomaterials is expected to fall in the cited range.

In another embodiment, x is between 0.39 and 0.95 and the fluorinated material displays a) an X-ray diffraction peak in the 9.8-15 degrees angle range, b) a $^{19}$F NMR peak in the range between (−180) ppm and (−200) ppm/$CFCl_3$, and c) three $^{13}$C NMR peaks: a first peak in the 100-150 ppm/TMS range, a second peak in the 84-88 ppm/TMS range and a third peak in the 42-48 ppm/TMS range.

In another embodiment, the invention provides a fluorinated carbon nanomaterial, the fluorinated carbon nanomaterial comprising an unfluorinated carbon phase and at least one fluorinated carbon product in which at least some of the carbon is covalently bound or nearly covalently bound to fluorine, wherein the carbon nanomaterial has a substantially ordered multi-layered structure prior to fluorination. In different embodiments, the average ratio of fluorine to carbon is between 0.06 and 0.68, between 0.3 and 0.66 or between 0.3 and 0.6.

In another embodiment, the invention provides a carbon nanomaterial which has been partially fluorinated, the partially fluorinated carbon nanomaterial comprising an unfluorinated carbon phase and a fluorinated carbon product, wherein the average ratio of fluorine to carbon is less than 0.4 and the carbon nanomaterial has a substantially ordered multi-layered structure prior to fluorination.

In another aspect of the invention, the invention provides a fluorinated carbon nanomaterial comprising at least one fluorinated carbon product in which at least some of the carbon is covalently bound or nearly covalently bound to fluorine and in which the average interlayer spacing is intermediate between that of graphite poly(dicarbon monofluoride) and that of graphite poly(carbon monofluoride), wherein the carbon nanomaterial has a multi-layered structure prior to fluorination. In different embodiments, the average fluorine to carbon ratio is less than 1.0, between 0.3 and 0.8 or between 0.6 and 0.8, between 0.39 and 0.95, between 0.39 and 0.86, between 0.39 and 0.68, between 0.68 and 0.86, or between 0.74 and 0.86.

In an embodiment, the fluorinated carbon product has some characteristics similar to those which would be produced by a mixture of graphite fluorides $(C_2F)_n$ and $(CF)_n$. X-ray diffraction analysis shows this product to have 2θ peaks centered at 12.0 degrees and 41.5 degrees. The interlayer spacing of this compound is approximately 0.72 nm. $^{13}$C-NMR spectra of this compound have a resonance present at 42 ppm, which indicates non-fluorinated sp$^3$ carbon atoms. NMR analysis also indicates covalent bonding between carbon and fluorine. $CF_2$ and $CF_3$ groups may also be present in minor amounts.

Another fluorinated carbon product can have structural similarities to $(CF)_n$. X-ray diffraction analysis shows this compound to have 2θ peaks centered at greater than 12.0 degrees and less than 41.5 degrees. The interlayer spacing of this compound is approximately 0.60 nm. NMR analysis also indicates at covalent bonding between carbon and fluorine. $CF_2$ and $CF_3$ groups may also be present in minor amounts.

Without wishing to be bound by any particular belief, fluorination of multi-layered carbon nanomaterials at relatively low temperatures (e.g. temperatures less than 420° C. for CNF having an average diameter of approximately 150 nm) is believed to result primarily in fluorination of the surface of the carbon material. The remainder of the carbon material remains unfluorinated. This surface fluorination may include formation of groups such as $CF_2$, and $CF_3$. In an embodiment, the ratio of fluorine to carbon associated with this regime is between 0 and 0.16.

At intermediate temperatures (e.g. temperatures between 420° C. and 465° C. for CNF having an average diameter of approximately 150 nm), fluorination is believed to proceed past the surface of the material. In an embodiment, the fluorinated product has some crystallographic similarities to a mixture of graphite fluorides $(C_2F)_n$ and $(CF)_n$. In one embodiment, the multi-layered carbon nanomaterials are partly fluorinated and contain some unreacted carbon. In another embodiment, a second fluorination product in which some of the carbon is "lightly fluorinated" and has predominately non-covalent bonding is present in addition to the first fluorination product which has at least some of the carbon atoms covalently or nearly covalently bound to fluorine. In an embodiment, the ratio of fluorine to carbon associated with this regime is between 0.31 and 0.79.

At higher temperatures (e.g. temperatures above 465° C. for CNF having an average diameter of approximately 150 nm), the fluorination product begins to display greater crystallographic similarity to graphite fluoride $(CF)_n$. Without wishing to be bound by any particular theory, the $(C_2F)_n$— like phases present in the material are believed to begin conversion to a $(CF)_n$— like phase which also exhibits covalent bonding. The conversion is accompanied by exfoliation. In an embodiment, the amount of unfluorinated carbon is small enough that it cannot be detected by XRD. In an embodiment, ratio of fluorine to carbon is greater than 0.86.

The fluorinated multi-layered carbon nanomaterials of the invention are prepared using a direct fluorination method, in which the multi-layered carbon nanomaterials are contacted with a gaseous source of elemental fluorine. The fluorination conditions (including temperature, time, and pressure of fluorine) are selected to obtain the desired degree of fluorination of the carbon materials. In an embodiment, the fluorination conditions are selected so they are suitable for fluorination of CNF having an average diameter between 80 and 350 nm.

In different embodiments, the fluorination temperature may be between 375° C. and 480° C., between 400° C. and 475° C., between 405° C. and 465° C., or between 420° C. and 465° C.

In different embodiments, the time period is greater than 4 hours, between 4 and 40 hours, between 4 and 20 hours, between 4 and 16 hours, between 4 and 12 hours, between 8 and 20 hours, between 8 and 16 hours, between 8 and 12 hours, or about 16 hours.

In an embodiment, the fluorination is conducted at atmospheric pressure with a gas mixture essentially consisting of $F_2$ and inert gas The percentage of fluorine in the mixture may be between 5% and 100%, between 10% and 90%, between 20% and 80%, between 20% and 60%, between 20% and 50% or about 20%.

In other embodiments, the fluorination may be conducted at a pressures less than atmospheric pressure. In an embodiment, the fluorination may be conducted at pressures between 1 atm and 0.1 atm, or between 1 atm and 0.25 atm.

A suitable gaseous source of elemental fluorine will be known to one of ordinary skill in the art; an exemplary such source is a mixture $F_2$ and a sufficiently inert gas. Suitable inert gases include, but are not limited to nitrogen, and argon. Preferably, only trace amounts of HF or other fluorides known to be fluorine intercalation catalysts are present in the gas mixture.

In an embodiment, the invention provides a method for fluorinating multi-layered carbon nanomaterials comprising the steps of exposing the carbon nanomaterials to a gaseous source of elemental fluorine at a pressure between 1 atm and 0.1 atm at a temperature between 375° C. and 480° C. for a time between 4 and 20 hours.

The fluorinated multi-layered carbon nanomaterials of the invention can be heat treated following fluorination.

In the electrochemical devices of the invention, the fluorinated multi-layered carbon nanomaterials are normally present in a composition that also includes a conductive diluent such as may be selected from, for example, acetylene black, carbon black, powdered graphite, cokes, carbon fibers, and metallic powders such as powdered nickel, aluminum, titanium, and stainless steel. The conductive diluent improves conductivity of the composition and is typically present in an amount representing about 1 wt. % to about 10 wt. % of the composition, preferably about 1 wt. % to about 5 wt. % of the composition. The composition containing the fluorinated multi-layered carbon nanomaterial and the conductive diluent also, typically, contains a polymeric binder, with preferred polymeric binders being at least partially fluorinated. Exemplary binders thus include, without limitation, poly(ethylene oxide) (PEO), poly(vinylidene fluoride) (PVDF), a poly (acrylonitrile) (PAN), poly(tetrafluoroethylene) (PTFE), and poly(ethylene-co-tetrafluoroethylene) (PETFE). The binders, if present, represent about 1 wt. % to about 5 wt. % of the composition, while the fluorinated multi-layered carbon nanomaterial represent about 85 wt. % to about 98 wt. % of the composition, preferably about 90 wt. % to 98 wt. % of the composition.

The resulting fluorinated multi-layered carbon nanomaterial is then admixed with a conductive diluent and binder as described above, with the preferred weight ratios being about 85 wt. % to about 98 wt. %, more preferably about 90 wt. % to about 98 wt. % at fluorinated multi-layered carbon nanomaterial; about 1 wt. % to about 10 wt. %, preferably about 1 wt. % to about 5 wt. %, conductive diluent; and about 1 wt. % to about 5 wt. % binder.

Typically, the slurry formed upon admixture of the foregoing components is then deposited or otherwise provided on a conductive substrate to form the electrode. A particularly preferred conductive substrate is aluminum, although a number of other conductive substrates can also be used, e.g., stainless steel, titanium, platinum, gold, and the like. The fluorinated multi-layered carbon nanomaterial may be at least partially aligned during the deposition process. For example, shear alignment may be used to align the fluorinated multi-layered carbon nanomaterial.

In still a further aspect of the invention, a method is provided for preparing an electrode for use in an electrochemical device, comprising the following steps:

fluorinating a multi-layered carbon nanomaterial according to the methods of the invention;

admixing the fluorinated multi-layered carbon nanomaterial with a conductive diluent and a binder to form a slurry; and applying the slurry to a conductive substrate.

In an embodiment, the invention provides an electrochemical device comprising a first electrode and a second electrode, and an ion transporting material disposed therebetween, wherein the first electrode comprises a fluorinated carbon nanomaterial according to the present invention.

In a primary lithium battery, for example, the aforementioned electrode serves as the cathode, with the anode providing a source of lithium ions, wherein the ion-transporting material is typically a microporous or nonwoven material saturated with a nonaqueous electrolyte. The anode may comprise, for example, a foil or film of lithium or of a metallic alloy of lithium (LiAl, for example), or of carbon-lithium, with a foil of lithium metal preferred. The ion-transporting material comprises a conventional "separator" material having low electrical resistance and exhibiting high strength, good chemical and physical stability, and overall uniform properties. Preferred separators herein, as noted above, are microporous and nonwoven materials, e.g., nonwoven polyolefins such as nonwoven polyethylene and/or nonwoven polypropylene, and microporous polyolefin films such as microporous polyethylene. An exemplary microporous polyethylene material is that obtained under the name Celgard® (e.g., Celgard® 2400, 2500, and 2502) from Hoechst Celanese. The electrolyte is necessarily nonaqueous, as lithium is reactive in aqueous media. Suitable nonaqueous electrolytes are composed of lithium salts dissolved in an aprotic organic solvent such as propylene carbonate (PC), ethylene carbonate (EC), ethyl methyl carbonate (EMC), dimethyl ether (DME), and mixtures thereof. Mixtures of PC and DME are common, typically in a weight ratio of about 1:3 to about 2:1. Suitable lithium salts for this purpose include, without limitation, $LiBF_4$, $LiPF_6$, $LiCF_3SO_3$, $LiClO_4$, $LiAlCl_4$, and the like. It will be appreciated that, in use, an applied voltage causes generation of lithium ions at the anode and migration of the ions through the electrolyte-soaked separator to the fluorinated multi-layered carbon nanomaterial cathode, "discharging" the battery.

In an embodiment, the invention provides an electrochemical device wherein the device is a primary lithium battery in which the first electrode acts at the cathode, the second electrode acts at the anode and comprises a source of lithium ions, and the ion-transporting material physically separates the first and the second electrode and prevents direct electrical contact therebetween.

In another embodiment, the at least partially fluorinated MWCNT or CNF is utilized in a secondary battery, i.e., a rechargeable battery such as a rechargeable lithium battery. In such a case, the cations, e.g., lithium ions, are transported through a solid polymer electrolyte—which also serves as a physical separator—to the at least partially fluorinated MWCNT or CNF electrode, where they are intercalated and de-intercalated by the at least partially fluorinated MWCNT or CNF material. Examples of solid polymer electrolytes include chemically inert polyethers, e.g., poly(ethylene oxide) (PEO), poly(propylene oxide) (PPO), and other polyethers, wherein the polymeric material is impregnated or otherwise associated with a salt, e.g., a lithium salt such as those set forth in the preceding paragraph.

In another embodiment, the invention provides an electrochemical device, wherein the device is a secondary battery in which the second electrode comprises a source of ions of a metal selected from Groups 1, 2, and 3 of the Periodic Table of Elements and the ion-transporting material comprises a solid polymer electrolyte that permits transport of said metal cations and physically separates the first and second electrodes.

In still a further aspect of the invention, a rechargeable battery is provided that includes:

a first electrode comprising an at least partially fluorinated MWCNT or CNF, the electrode capable of receiving and releasing cations of a metal selected from Groups 1, 2, and 3 of the Periodic Table of the Elements;

a second electrode comprising a source of the metal cations; and a solid polymer electrolyte that permits transport of the metal cations and physically separates the first and second electrodes.

Figure 14:
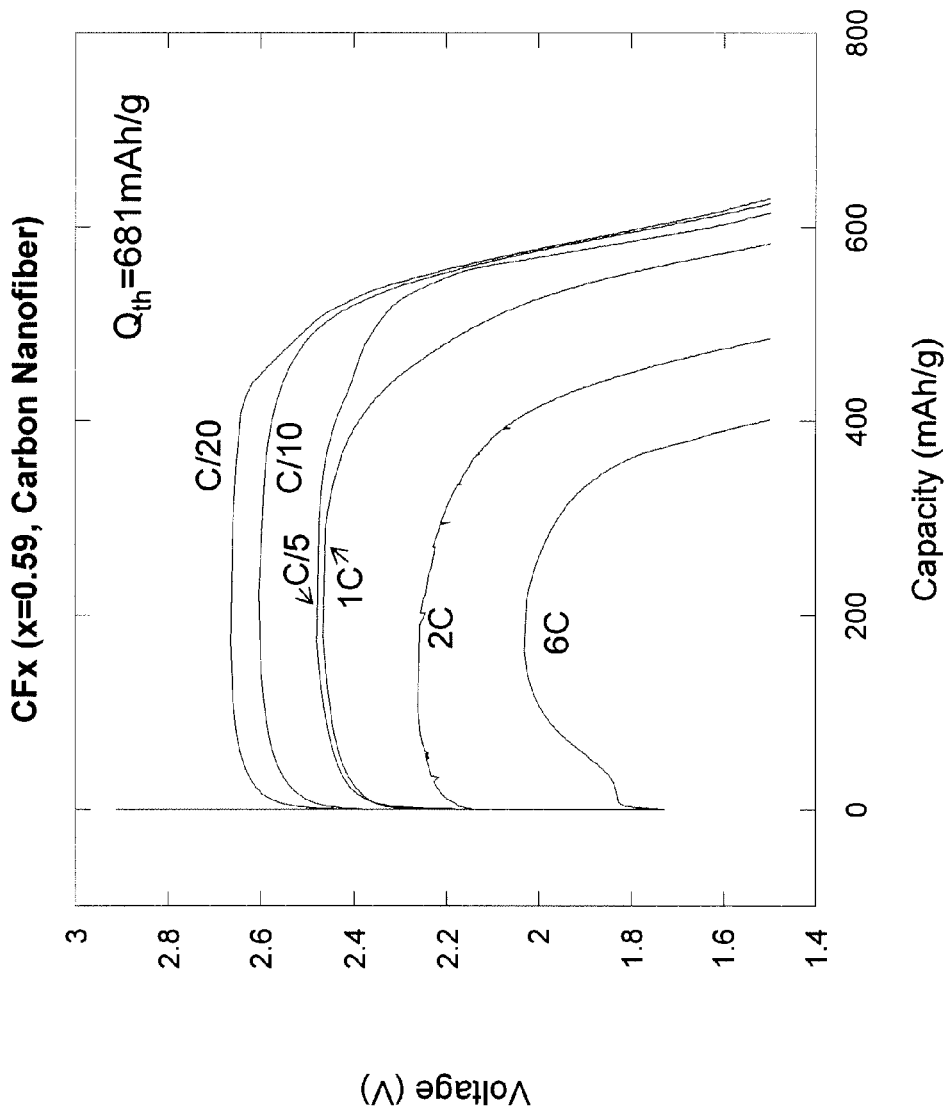
FIG. 14. Discharge curve of cell with a lithium anode and a fluorinated carbon nanofiber cathode, the fluorinated nanofibers having a fluorine to carbon ratio of 0.59.
Figure 15:
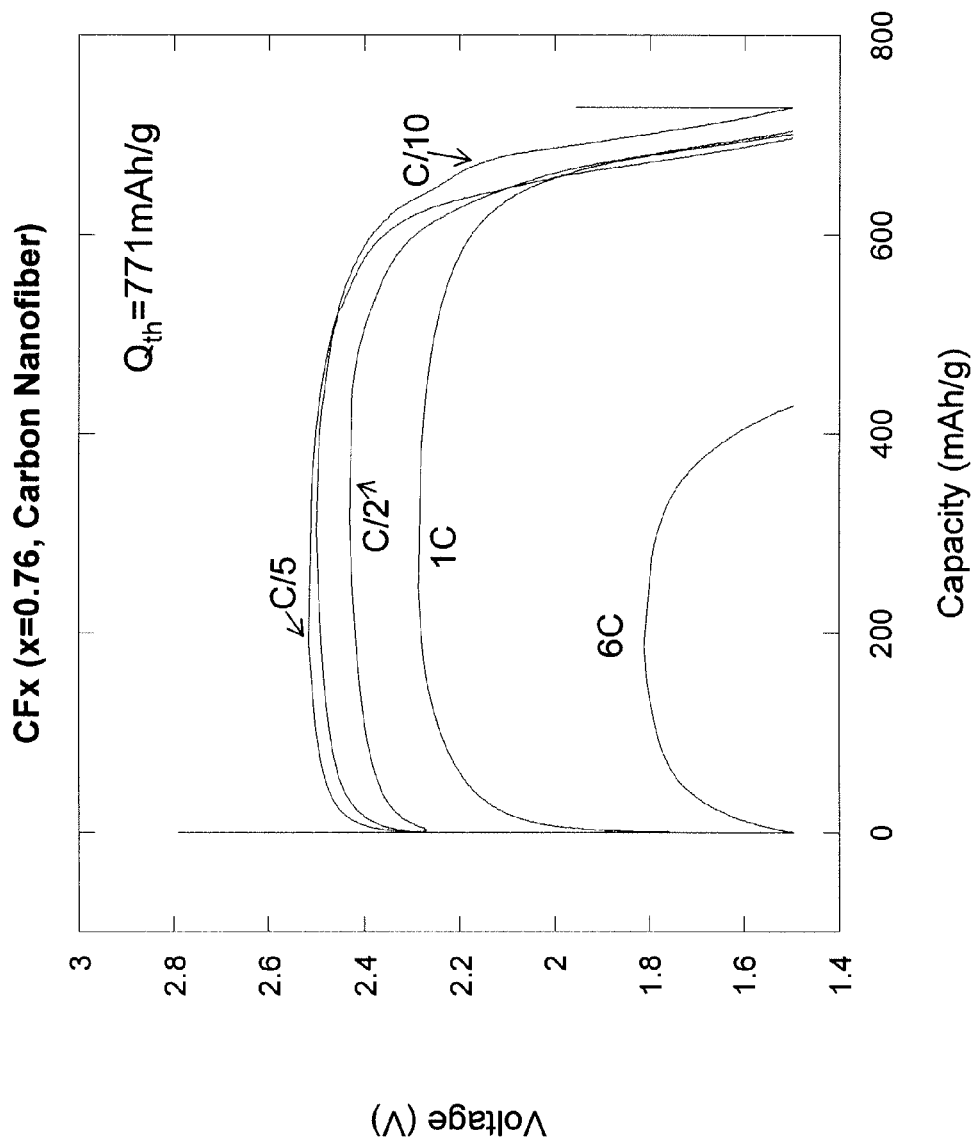
FIG. 15. Discharge curve of cell with a lithium anode and a fluorinated carbon nanofiber cathode, the fluorinated nanofibers having a fluorine to carbon ratio of 0.76.
Figure 16:
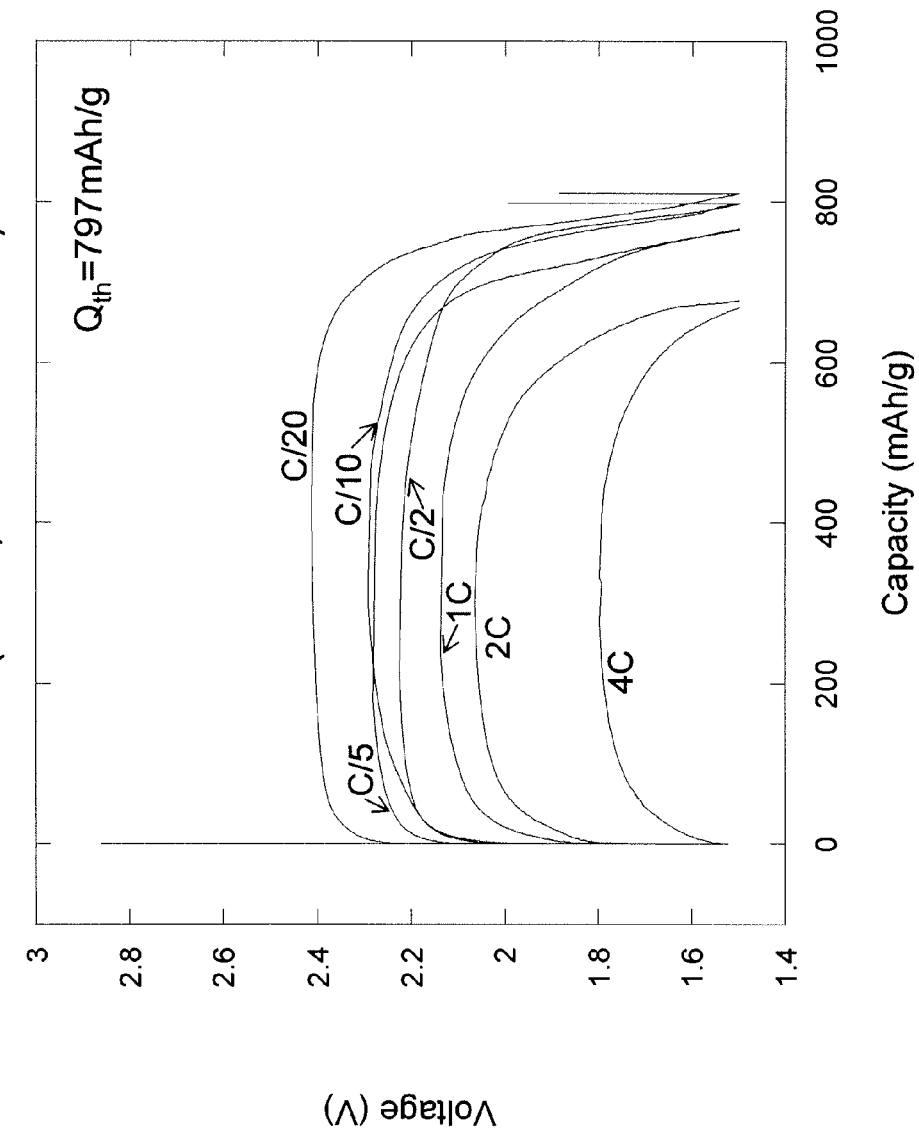
FIG. 16. Discharge curve of cell with a lithium anode and a fluorinated carbon nanofiber cathode, the fluorinated nanofibers having a fluorine to carbon ratio of 0.82.
Figure 17:
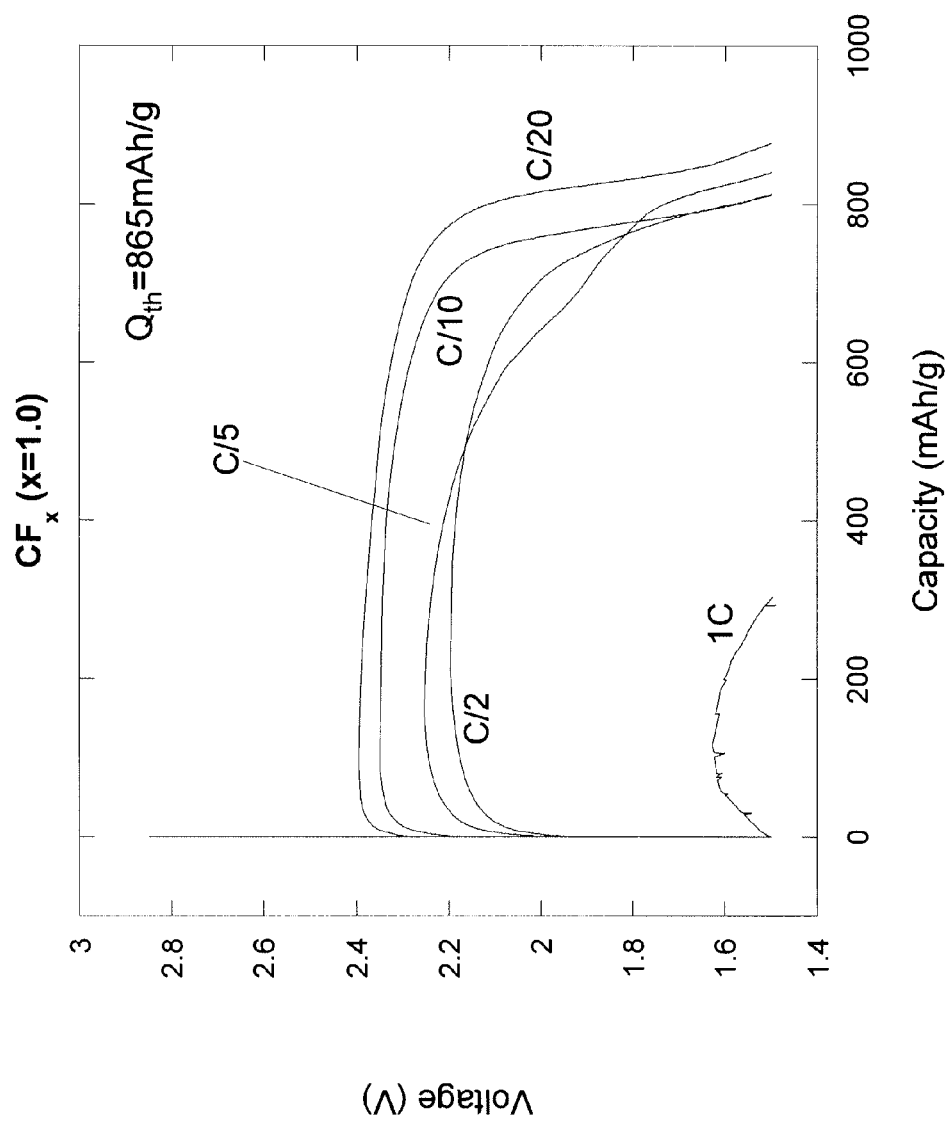
FIG. 17. Discharge curve of cell with lithium anode and a conventional carbon fluoride cathode, the carbon fluoride having a fluorine to carbon ratio of 1.0

A characteristic discharge profile of a Li/fluorinated CNF cell is shown in FIG. 14; the ratio of fluorine to carbon is about 0.59. These cells exhibit a characteristic plateau corresponding to the formation of LiF according to Equation 1. The value of the plateau voltage depends upon the discharge rate. For comparison, a characteristic discharge profile of a commercial Li/CF cell is shown in FIG. 17.

The discharge profiles of Li/fluorinated CNF cells differ depending on the fluorine to carbon ratio of the CNF. In general, the higher F/C, the higher the discharge capacity, as indicated by Equation 2. Samples with fluorine to carbon ratios of 0.15 or less may not show a constant discharge potential.

Partially fluorinated MWCNT and CNF can show reduced over-potential for low discharge times as compared to fully fluorinated materials. This is related to the decrease of electrical conductivity of the sample when the fluorinated parts progress i.e. the decrease of pristine carbon amount in the sample.

In addition, cells including Li and CNF are partially fluorinated can display improved performance as compared to commercial Li/CF cells at higher discharge rates (e.g. at or above 1 C).

In an embodiment, once the electrochemical cell is assembled, it may be "pre-discharged" before being put into actual use. The pre-discharge step involves discharging from 1%-5% of the capacity of the cell. Pre-discharge of the cell can eliminate the initial voltage delay before establishment of the voltage plateau which is seen in the characteristic discharge profile of a Li/fluorinated CNF cells.

In the following examples, efforts have been made to ensure accuracy with respect to numbers used (e.g., amounts, temperature, etc.) but some experimental error and deviation should be accounted for. Unless indicated otherwise, temperature is in degrees C. and pressure is at or near atmospheric. All solvents were purchased as HPLC grade, and all reagents were obtained commercially unless otherwise indicated.

EXAMPLE 1

Reactivity of Carbon Nanofibers with Fluorine Gas

Overview

The following study highlights the reactivity of Carbon Nanofibers or Nanofibres (CNFs) with fluorine gas. Highly purified and graphitized CNFs were treated under a stream of fluorine gas for 16 hours at temperatures ranging from 380 to 480° C. Different fluorination temperature zones have been revealed by direct physicochemical analysis such as XRD, Raman spectroscopy, EPR and solid state NMR ($^{13}$C and $^{19}$F). The comparison between various parameters such as covalence of C—F bond, $T_1$ spin-lattice nuclear relaxation time, density and environment of the dangling bonds amongst others, allows the fluorination mechanism to be determined i.e. the formation $(C_2F)_n$ type graphite fluoride as the precursor of richer $(CF)_n$ compound. This is supported by TEM characterization as the fluorination proceeds from the external parts of the carbon nanofibers and then propagates through the core without major structural change of the fluorinated parts. A low exfoliation of the sheets is necessary for extended fluorination and conversion into $(CF)_n$; this occurs for fluorination temperatures higher than 472° C., with concomitant disappearance of the graphitic structure.

1. Introduction

The reactivity of carbon allotropic forms with fluorine gas differs largely owing either to the degree of graphitization or to the type of the carbon material. The higher the degree of graphitization or the number of shells, the higher the temperature required for fluorination. The fluorination temperature of MWCNTs is significantly increased in comparison with SWCNT because of the presence of graphitic multilayers surrounding the nanotube core. This temperature depends on the number of MWCNT shells and is generally close to 400° C. (Hamwi A.; Alvergnat H.; Bonnamy S.; Béguin F.; *Carbon* 1997, 35, 723; Nakajima T.; Kasamatsu S.; Matsuno Y.; *Eur. J. Solid. State Inorg. Chem.* 1996, 33, 831).

In comparison to the fluorination of MWCNTs, the structure of SWCNTs favors fluorination for temperatures as low as 50° C. (Mickelson E. T.; Huffman C. B.; Rinzler A. G.; Smalley R. E.; Hauge R. H.; Margrave J. L.; *Chem. Phys. Lett.* 1998, 296, 188; Kelly K. F.; Chiang I. W.; Mickelson E. T.; Hauge R.; Margrave J. L.; Wang X.; Scueria G. E.; Radloff C.; Halas N. J.; *Chem. Phys. Lett.* 1999, 313, 445. Nevertheless, this structure is partially destroyed above 350° C.

In this work, we have studied the reactivity of CNFs with pure fluorine gas in the 380-480° C. temperature range. The fluorinated compounds were characterized by different techniques including: (1) XRD, TEM and Raman spectroscopy; (2) $^{19}$F and $^{13}$C high resolution Nuclear Magnetic Resonance and, (3) Electron Paramagnetic Resonance. The cross data analysis gives new insights on the mechanism of fluorination, crystal structure and on the nature of the C—F bonding. The properties of the resulting materials will be discussed and compared to those of conventional $(CF)_n$ and $(C_2F)_n$ graphite fluorides, also prepared for this study.

2. Experimental

High purity (>90%) Carbon Nanofibers, 2-20 microns in length, were supplied by courtesy of the MER Corporation, Tucson, Ariz. They were obtained by Chemical Vapor Deposition (CVD) and heat treated at 1800° C. in an argon atmosphere to enhance their crystallinity. Fluorinated carbon nanofibers (denoted CNF-FT$_F$) were prepared with 200 mg of CNFs at temperatures ($T_F$) ranging between 380° C. and 480° C. in a $F_2$ stream. A reaction time of 16 h was used. The fluorination level 'x' (i.e. F:C molar ratio) was determined by gravimetry (weight uptake) and by quantitative $^{19}$F NMR measurements. X-ray diffraction (XRD) powder patterns were obtained using a Siemens D501 diffractometer with Cu(K$_\alpha$) radiation ($\lambda$=1.5406 Å).

NMR experiments were performed with Tecmag Discovery and Bruker Avance spectrometers, with working frequencies for $^1$H, $^{13}$C and $^{19}$F of 300.1, 73.4 and 282.2 MHz, respectively. Two NMR Bruker probes were used: a static and a special Cross Polarization/Magic Angle Spinning probe with fluorine decoupling on a 4 mm rotor. The $^{19}$F-$^{13}$C match was optimised on polytetrafluoroethylene (PTFE); the $^{19}$F $\pi/2$ pulse width was 4 µs. For MAS spectra, a simple sequence ($\tau$-acquisition) was used with a single $\pi/2$ pulse length of 3.5, 4 and 3.5 µs for $^1$H, $^{19}$F and $^{13}$C, respectively. Spin-lattice relaxation time $T_1$ was measured using a saturation recovery sequence and calculated taking into account a magnetization curve evolving as $\exp(-t/T_1)$. $^1$H and $^{13}$C chemical shifts were externally referenced to TetraMethylSilane (TMS). $^{19}$F chemical shifts were referenced with respect to CFCl$_3$. In order to confirm the molar ratio F:C obtained by weight uptake and to determine the limit of this method, in particular for the highest fluorination temperature for which partial exfoliation and departure of volatile fluorides can occur, quantitative $^{19}$F NMR measurements were carried out using the same conditions for each sample i.e. similar receiver gain, recycling time $D_1$ ($D_1 > 5T_1$ using the longest spin-lattice relaxation time $T_1$ which corresponds to CNF-F480, so $D_1$=3 s) and scan number. The intensities are divided by the sample mass. For comparison, two conventional $(CF)_n$ samples, obtained by direct reaction of natural graphite and petroleum coke with fluorine gas at 600° C., and a $(C_2F)_n$ sample obtained by direct reaction of natural graphite with fluorine gas at 380° C., with compositions $CF_{1.1}$, $CF_{1.0}$ and $CF_{0.6}$, respectively were also analyzed by quantitative NMR. Polyvinyldifluoride —(CF$_2$—CH$_2$)—$_n$ was used as reference for the fluorine content.

EPR spectra were performed with a Bruker EMX digital X band (ν=9.653 GHz) spectrometer. Diphenylpicrylhydrazil (DPPH) was used as the calibration reference to determine both the resonance frequency and the densities of spin carriers.

Raman spectra were recorded at room temperature using a JOBIN YVON T64000 with a charge coupled device multichannel detector. The radiation source was a 514.5 nm Argon laser line. The laser power was tuned to 10 mW.

The different samples were characterized by Transmission Electron Microscopy (TEM, FEI CM200 operating at 200 kV). The carbon nanofibers were dispersed in chloroform using ultrasonic treatment and a few drops of suspension were deposited onto copper observation grids covered with ultrathin carbon/formvar films. The grids were subsequently dried at ambient conditions.

The quantitative analysis of TEM images was performed in reciprocal space. The details of the method can be found elsewhere (Basire C.; Ivanov D. A.; *Phys. Rev. Lett.* 2000, 85, 5587). The two-dimensional power spectral density function $(P_2(\underline{s}))$ was computed from TEM images $(u(\underline{r}))$ up to the critical, or Nyquist, frequency depending upon the experimental sampling interval as:

$$P_2(\underline{s}) \equiv \frac{1}{A}\left|\int_A u(\underline{r})W(\underline{r})\exp(2\pi i\underline{s}\cdot\underline{r})d^2\underline{r}\right|^2, \quad (3)$$

where A denotes the image area, W(r) window function (Press W. H.; *Numerical Recipes in C, The Art of Scientific Computing,* 1988, Plenum Press, New York) and $\underline{s}$ the 2D reciprocal space vector. The $P_2(\underline{s})$ function was then transformed into the one-dimensional PSD ($P_1(s)$), where s stands for the norm of $\underline{s}$, according to:

$$P_1(s)=(2\pi s)^{-1}\int P_2(\underline{s}')\delta(|\underline{s}'|-s)d\underline{s}' \quad (4).$$

3. Results

3.1 Fluorination Process

3.1.a.i Chemical Composition vs. Fluorination Temperature ($T_F$)

The F:C ratio of the sample, obtained from weight uptake and NMR data, are plotted as a function of the fluorination temperature in FIG. 1; the values are also summarized in Table 1. The two methods yield similar results for $T_F$ up to 450° C. At higher temperatures, however, a large discrepancy between the two methods appears as gravimetry underestimates the actual amount of fluorine, which is more accurately determined by NMR. In fact, the NMR method was tested with two standard graphite fluorides based on $(CF)_n$ and $(C_2F)_n$ compounds and gives the correct F:C ratio. The origin of discrepancy most likely comes from the thermal decomposition of fluorinated CNFs at T>450° C., which generates volatile alkyl fluorides such as $CF_4$, $C_2F_6$ and others, and, consequently, results in weight loss. In conclusion, by quantitative NMR data, the drastic increase of the fluorine content for $T_F$ higher than 420° C. is clearly demonstrated. However, a progressive increase of the fluorine content with treatment temperature is then registered contrary to what is found by weight uptake.

Four fluorination temperature zones can be distinguished in FIG. 1 and Table 1:

i) for $T_F$ lower than 420° C., the fluorination level is low: $0<x<0.2$; In particular, for $T_F=380°$ C. the composition is $CF_{0.04}$ whereas for graphite at the same reaction temperature $CF_{0.60}$ is achieved (Dubois M.; Giraudet J.; Guérin K.; Hamwi A.; Fawal Z.; Pirotte P.; Masin F.; *J. Phys. Chem. B* 2006, 110, 11800).

ii) when $T_F$ is in the 420-435° C. range, the F:C ratio is drastically increased: $0.31<x<0.7$.

iii) when $T_F$ is included between 435 and 450° C., the F:C ratio is nearly constant: $x\sim0.7$-$0.8$.

iv) for $T_F$ higher than 450° C., a jump in composition is observed up to 465° C., then the later stabilizes around $x\sim1.0$.

Contrary to SWCNTs, MWCNTs and larger diameter CNTs react with fluorine at higher temperatures because of their graphitic structure. Indeed, SWCNTs react with fluorine at a temperature as low as 50° C. to form the $CF_{0.114}$ compound (Mickelson 1998; Kelly 1999 ibid.). For MWCNTs, the greater the number of shells, the higher the reaction temperature with fluorine (Hamwi 1997 ibid.). In our case the number of graphene layers (similar to shells in MWCNT) of the pristine CNFs is about 35. This value demonstrates a high graphitization degree for the CNFs.

Probably a surface fluorination of CNFs occurs during the first temperature range, whereas fluorination of the less accessible graphene layers takes place during the second temperature range. In order to confirm this interpretation, different physicochemical characterisations were investigated at increasing $T_F$ values.

3.1.a.ii Chemical Composition vs. Fluorination Time

For a fluorination temperature of 430° C., the fluorination time was varied between 4 and 16 hours (with the other fluorination conditions being the same). The F/C ratios obtained from a weight uptake measurement were as follows: 0.22 for a fluorination time of 4 hours, 0.38 for a fluorination time of 8 hours, 0.55 for a fluorination time of 12 hours, and 0.60 for a fluorination time of 16 hours.

3.1.a.iii Chemical Composition vs. Fluorination Pressure

For a fluorination temperature of 430° C., and a fluorination time of 16 hours, the fluorination pressure was reduced to 0.3 atm (with the other fluorination conditions being the same). For this pressure the F/C ratio obtained from a weight uptake measurement was 0.53, as compared to a F/C ratio of 0.60 at 1 atm.

3.1.b. Layers Stacking Structure and Morphology

Figure 2:
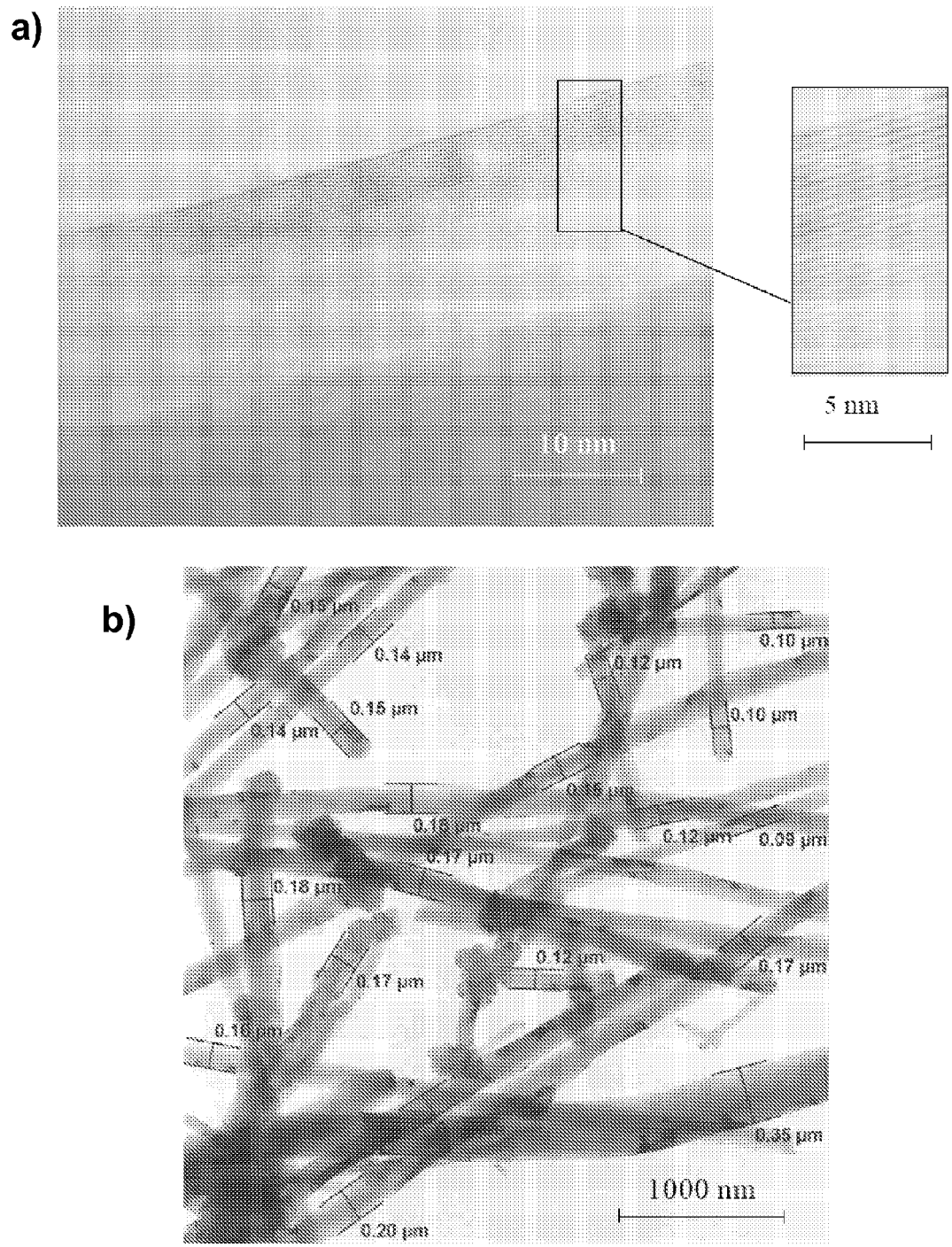
FIG. 2. TEM bright field images of the pristine carbon nanofibers (a) and (b); of the fluorinated samples at 420° C. (c) and 480° C. (d).
Figure 2:
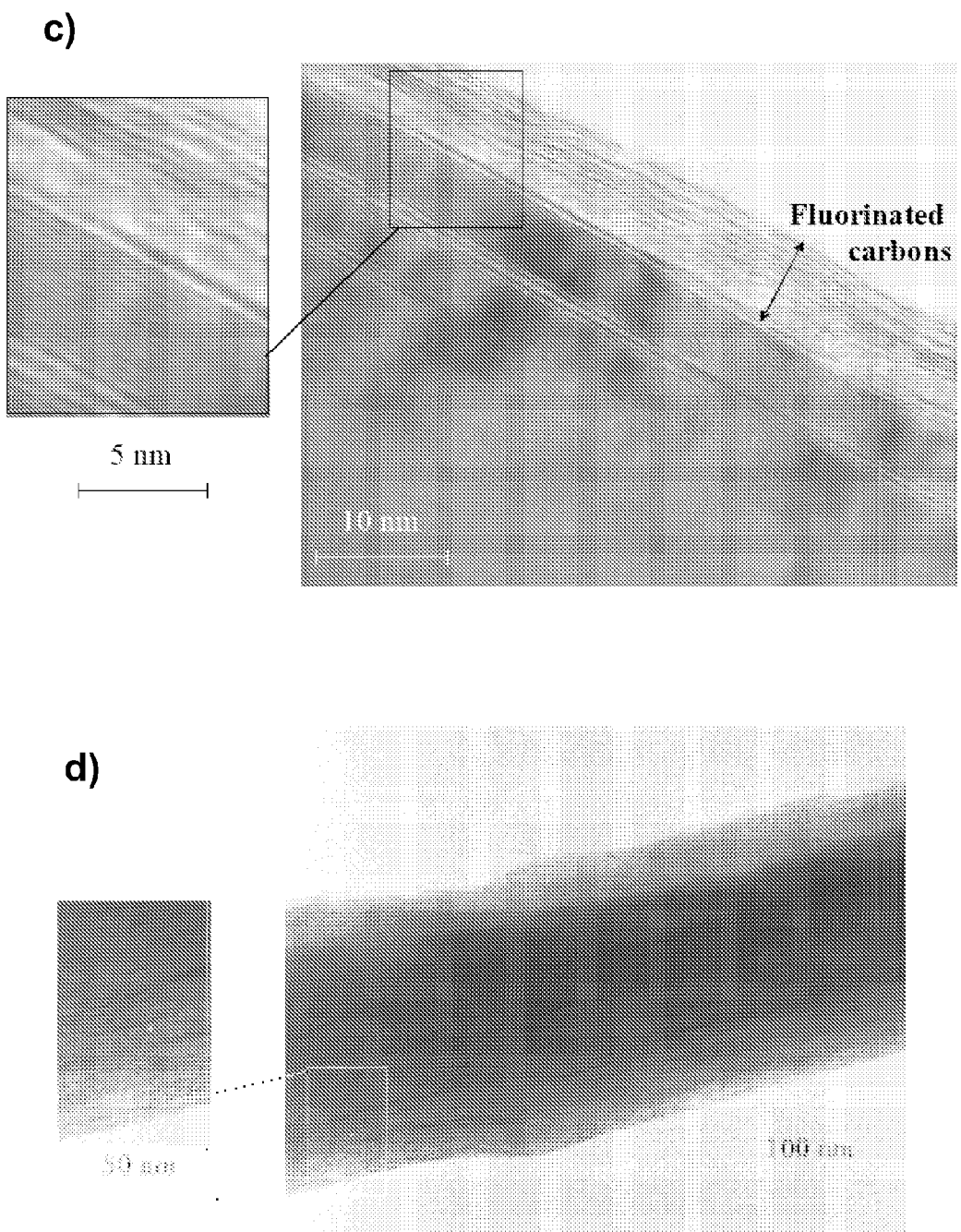
Figure 3:
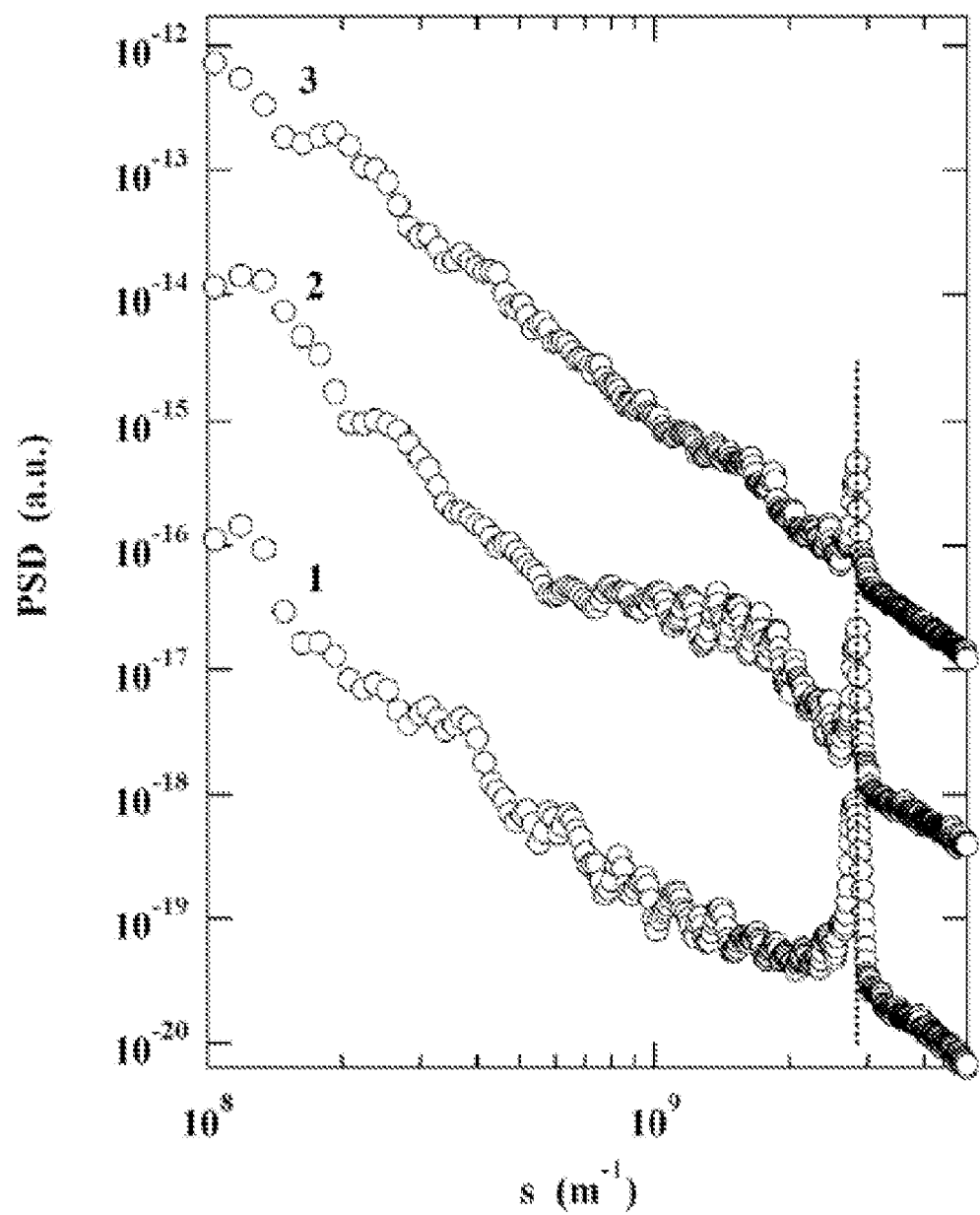
FIG. 3. Power spectral density (PSD) functions calculated for the TEM images of FIG. 2: pristine carbon nanofibers (1), fluorinated sample treated at 420° C. (2 and 3). The curves 2 and 3 correspond to the entire image 2c and to the core of the fiber exclusively. The curves are offset vertically for clarity. The dotted line indicates the periodicity of graphitic layers.

TEM bright-field images of the post-treated CNFs underline this structural order by showing the presence of graphitic layers (FIG. 2a). The well-defined periodicity of the layers is reflected by a Bragg peak in the corresponding PSD curve (FIG. 3), which is positioned at about 0.34 nm. The diameter distribution is quite narrow, included between 80 and 350 nm (FIG. 2b). The average diameter ($<\Phi>$) is estimated near 150 nm from observations of various parts of the raw sample. Due to the accommodation of the fluorine atoms within the graphene layers, fluorination results in a moderate increase in the average diameter after reaction at 420° C. ($<\Phi>=160$ nm), and to a larger extent at 480° C. ($<\Phi>=180$ nm). The graphitic structure is maintained for fluorination at 420° C. (FIG. 2c), contrary to fluorination at 480° C. (FIG. 2d). For CNF-F420, the fiber morphology shows two different structures present at the periphery and in the core of the fiber. The PSD function (FIG. 3) corresponding to the image in FIG. 2c displays a broad peak with a maximum at about 1.5-2.0 nm$^{-1}$ in addition to the usual graphene layer periodicity found for the untreated sample (FIG. 2a). This additional feature in the PSD curve indicates the presence of layers, which are less ordered and are more spatially separated due to the accommodation of fluorine atoms. Note that the fiber core of the same sample does not exhibit this increased periodicity (FIG. 3).

By considering the crystalline order and the graphene layers orientation resulting from the posttreatment at 1800° C., the pristine nanofibers and MWCNTs have many things in common. So, calculation similar to those applied for MWCNTs will be discussed in the following parts.

3.2 Structural Evolution

Figure 4:
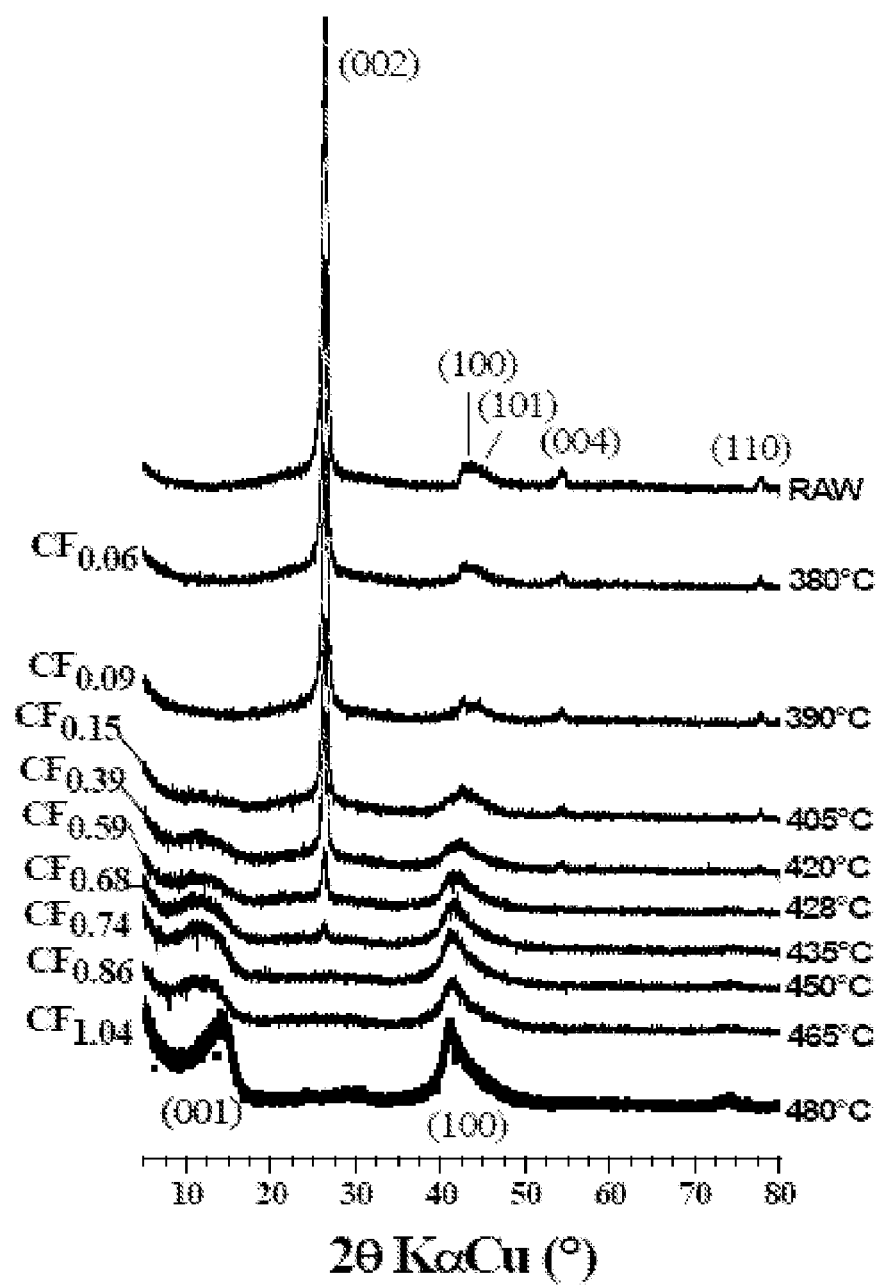
FIG. 4. X-Ray diffraction patterns of CNFs fluorinated at temperatures ranging between 380 and 480° C. compared with the CNFs patterns.

XRD patterns of pristine and fluorinated CNFs are compared in FIG. 4. The pristine CNFs pattern is similar to that of MWCNTs synthesized by the arc discharge (Okotrub A. V.; Yudanov N. F.; Chuvilin A. L.; Asanov I. P.; Shubin Y. V.; Bulusheva L. G.; Gusel'nikov A. V.; Fyodorov I. S.; *Chem. Phys. Lett.* 2000, 323, 231) or by CVD (Nakajima 1996, ibid.). The main peaks correspond to the graphite (002), (100), (101), (004) and (110) diffraction lines for 2θ values of 26°3 (interlayer distance d=0.338 nm), 43°5 (0.207 nm), 45° (0.201 nm), 54°4 (0.169 nm) and 77°9 (0.123 nm), respectively. The strongest (002) reflection is associated to an average interlayer spacing of 0.338 nm, in agreement with the TEM bright field results. The width of the (002) peak (Δ2θ=0.72°) characterizes both the average number of carbon layers (close to 35) and the coherence length $L_c$ along the c-axis (11.8 nm). As for MWCNTs, the symmetry of the (hk0) lines and the weak intensity of the (hkl) peaks reflect the lack of positional correlation between carbon atoms in different layers of a nanoparticle. The fluorination of CNFs progressively changes the structure as a function of $T_F$ as shown by the XRD. For $405<T_F<420°$ C., a new phase appears with corresponding peaks at 2θ values centred at 12.0° and 41.5° attributed to the (001) and (100) peaks of a fluorographite matrix in a hexagonal system. This phase co-exists with that of the pristine CNFs. However, the observed peak broadening of this new phase may be caused by lower stacking order of the fluorinated layers. For $435<T_F<450°$ C., the pristine CNFs phase disappears and only the fluorinated nanofibers phase is present. The fluorinated CNFs exhibit an inter-layers spacing of 0.72 nm, which ranges between that of $(C_2F)_n$ (d-spacing of 0.81 nm) and that of $(CF)_n$ (d-spacing equal to 0.60 nm) (Nakajima et al., 1991, ibid.). For $T_F$ about 480° C., a $(CF)_n$ like structure is obtained with an inter-layer spacing of 0.60 nm.

Figure 5:
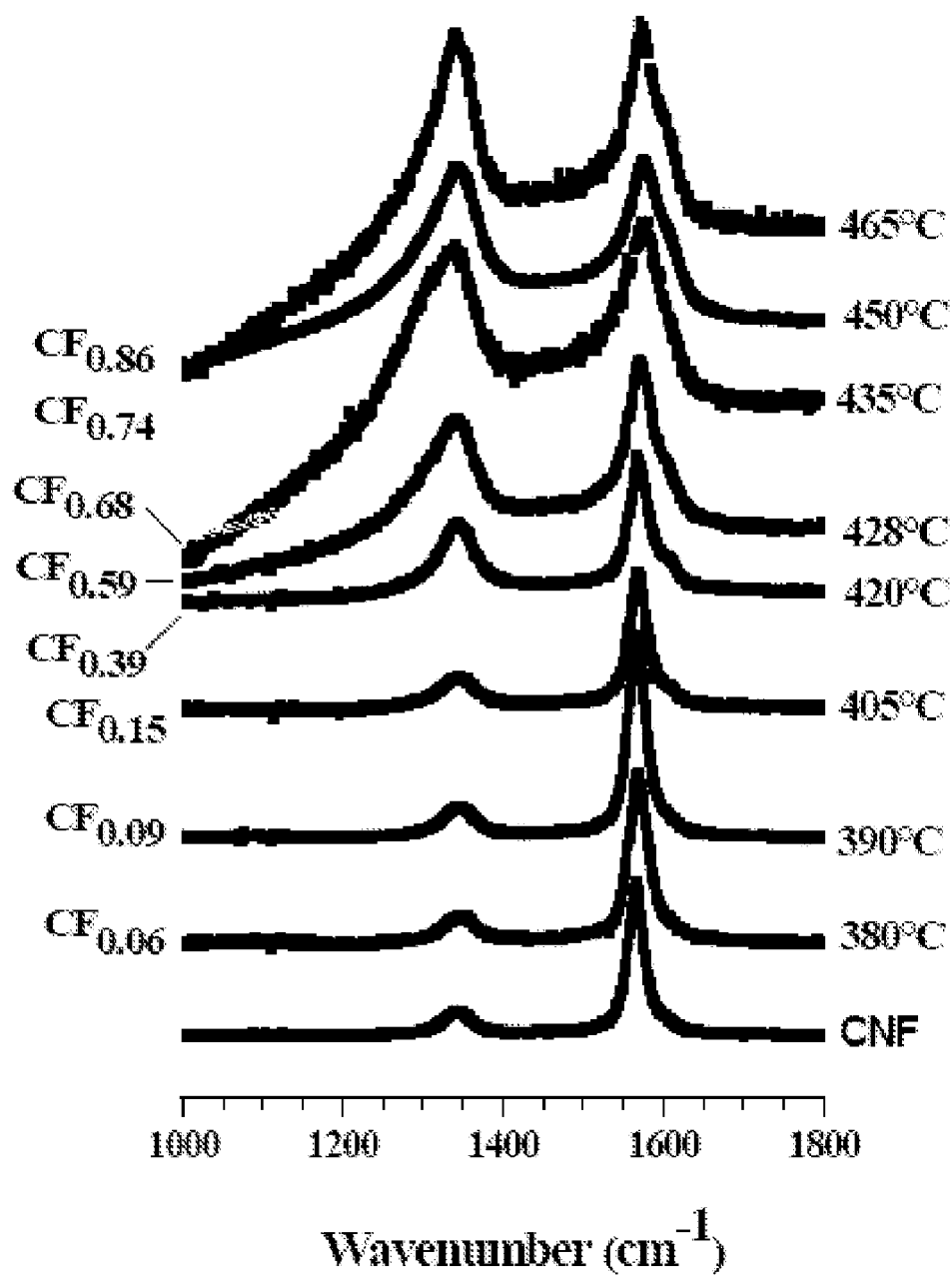
FIG. 5. Raman spectra of CNFs fluorinated at temperatures ranging between 380 and 465° C. compared with CNFs patterns.

In FIG. 5, the Raman spectra of the fluorinated CNFs are compared with that of the starting CNFs. The later exhibits two bands: one at 1345 cm$^{-1}$ attributed to the D mode and a second one at 1570 cm$^{-1}$ corresponding to the G mode and assigned to a double resonance Raman effect in sp$^2$ carbon atoms. In MWCNTs, the D band probably originates primarily from defects in the tube walls (Osswald S.; Flahaut E.; Ye H.; Gogotsi Y.; *Chem. Phys. Lett.* 2005, 402, 422). However, both in the tube walls and in other forms of carbon, the contribution of defects to the D band is still not completely understood. The G mode is due to an optical in-plane lattice vibration with $E_g$ symmetry of the Raman active graphitic mode. As reported by Rao et al., no Raman active vibrational modes for either fluorine or carbon-fluorine bonds exist between 1250 and 1700 cm$^{-1}$ (Rao A. M.; Fung A. W. P.; di Vittorio S. L.; Dresselhaus M. S.; Dresselhaus G.; Endo M.; Oshida K.; Nakajima T.; *Phys. Rev. B* 1992, 45, 6883).

As the F:C ratio increases so does the intensity of D band. For temperatures lower than 420° C., the CNF-FT$_F$ spectra are similar to that of CNFs. More particularly, the ratio $I_D/I_G$ of the integrated intensity of D and G bands are nearly constant ($I_D/I_G$=0.30, Table 1) within experimental errors. This ratio relates to the structural disorder in CNFs. Therefore, as fluorination proceeds, the $I_D/I_G$ ratio increases and so does disorder. For 420<$T_F$<435° C., disorder is drastically increased (see Table 1) and a new mode appears at around 1620 cm$^{-1}$. This weak intensity feature was reported using a high density of states phonon for midzone phonons (Chien T. C.; Dresselhaus M. S.; *Endo M. Phys. Rev. B* 1982, 26, 5867). For 435<$T_F$<465° C., the disorder-induced D band increases but moderately and the ratio $I_D/I_G$ reaches a maximum of 1.12. Finally, for $T_F$ higher than 465° C., Raman spectra of the resulting materials cannot be recorded due to fluorescence phenomena.

Complementary to XRD measurements, Raman spectroscopy underlines the decrease of structural coherency caused by fluorine bonding. Further proof of this evolution is provided by the investigation of the average crystal planar domain size ($L_a$) obtained using the inverse relation between domain size and the intensity ratio $I_D/I_G$ given by Knight and White (Knight D. D.; White W. S.; *J. Mater. Res.* 1989, 4, 385). The $L_a$ value decreases substantially from 14.7 nm for CNFs to 3.9 nm for CNF-F480.

3.3 Solid State NMR

Figure 6:
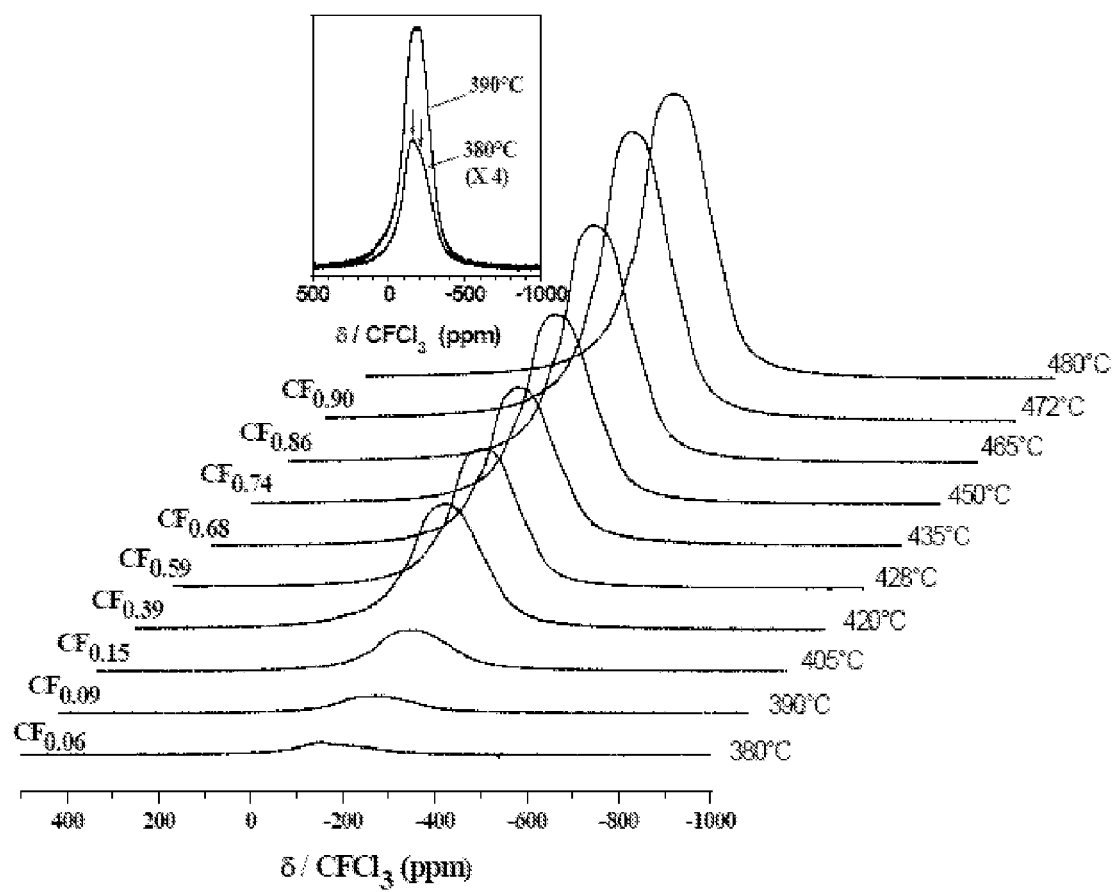
FIG. 6. Static $^{19}F$ NMR spectra of $CNF\text{-}FT_F$ (380<$T_F$<480° C.). The insert shows the spectra of the lowest fluorinated samples ($T_F$=380 and 390° C.).

Except in the case of CNF-F380, for which the static $^{19}$F-NMR spectrum shows two asymmetric contributions at −170 and −190 ppm/CFCl$_3$, all spectra exhibit similar shape irrespective of the fluorination temperature (FIG. 6). The $^{19}$F NMR's full width at half maximum (FWHM), of similar value (5.104 Hz) for all samples, is explained by a strong dipolar homonuclear coupling between fluorine nuclei such as found in other fluorinated carbons, as covalent graphite fluorides: $(C_2F)_n$ and $(CF)_n$ (Dubois, 2006 ibid.; Panich A. M.; *Synth. Metals* 1999, 100, 169; Touhara H.; Okino F.; *Carbon* 2000, 38, 241; Panich A. M.; Shames A. I.; Nakajima T.; *J. Phys. Chem. Solids* 2001, 62, 959; Krawietz T. R.; Haw J. F.; *Chem. Commun.* 1998, 19, 2151; Dubois M.; Guérin K.; Pinheiro J. P.; Fawal Z.; Masin F.; Hamwi A.; *Carbon* 2004, 42, 1931; Giraudet J.; Dubois M.; Guérin K.; Pinheiro J. P.; Hamwi A.; Stone W. E. E.; Pirotte P.; Masin F.; *J. Solid State Chem.* 2005, 118, 1262. hereafter termed Giraudet 2005a), semi-ionic compounds (Guérin 2004 and Giraudet 2005a ibid.) and fluorinated charcoal (Touhara 2000 ibid.; Hagaman E. W.; Murray D. K.; Cul G. D. D.; *Energy & Fuel* 1998, 12, 399). The center of this symmetrical resonance peak is located at −190 ppm and attributed to fluorine atoms covalently bonded to carbon atoms (Dubois 2006; Dubois 2004; Giraudet 2005a ibid.). The increase in the fluorine nuclei content occurs without significant change in peak shape indicating a similar environment for fluorine atoms even though the F:C ratios are different. The case of CNF-F380 is different since two groups of fluorine nuclei are detected (δ=−170 and −190 ppm) (insert in FIG. 6); they result from either different interactions between carbon and fluorine atoms or different environments. The intercalation of mobile F- resulting from traces of HF molecules can not be excluded as in the case of $(C_4F)_n$-type (Panich 1999 ibid.). The low fluorine content (F:C=0.04) may lead then to inhomogeneous fluorination at the CNF surfaces.

Figure 7:
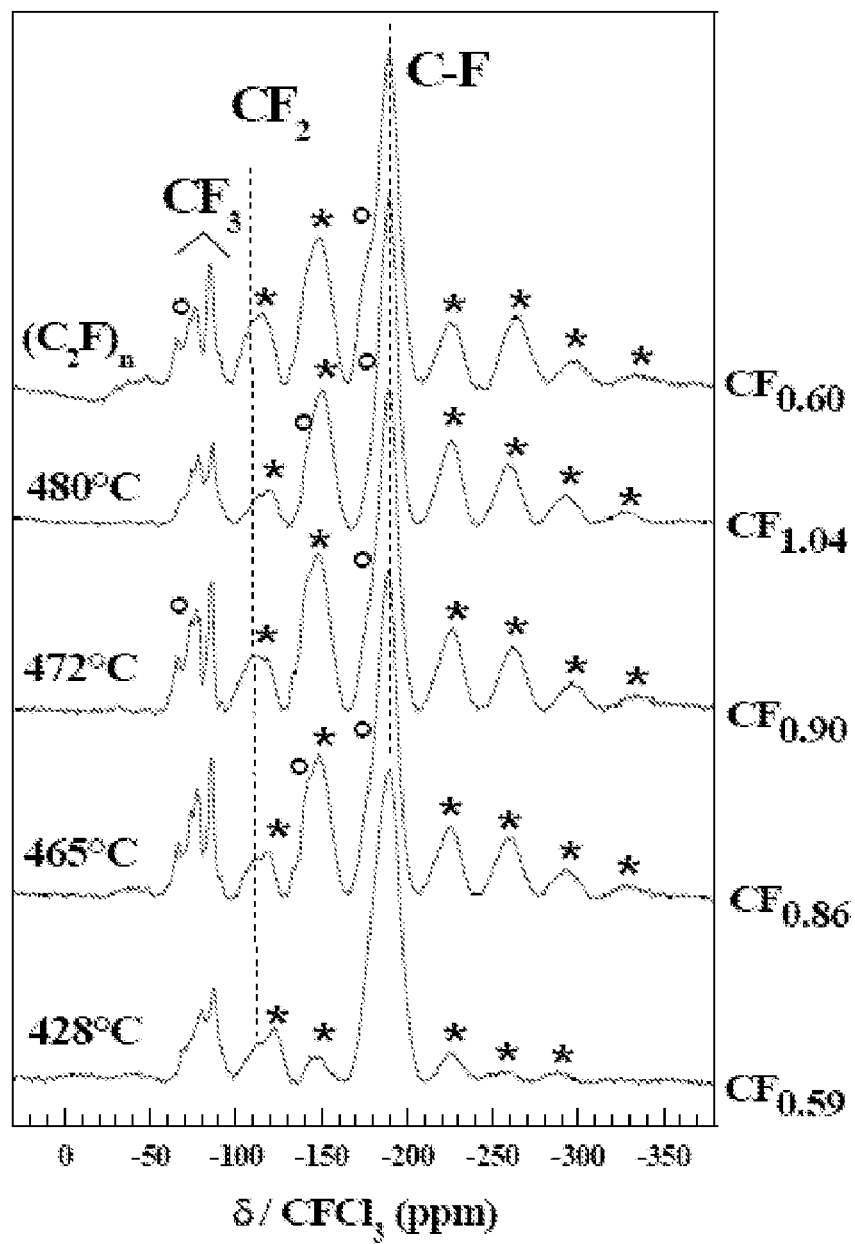
FIG. 7. $^{19}F$ MAS NMR spectra of $CNF\text{-}FT_F$ and $(C_2F)_n$ graphite fluoride with 10 kHz spinning rate; the * and ○ markers denote spinning sidebands related to the isotropic peaks at −190 and −120 ppm, respectively.

The room temperature $^{19}$F MAS NMR spectra of CNF-FT$_F$ recorded at a spinning rate of 10.0 kHz are displayed in FIG. 7. The spectrum for $(C_2F)_n$ is also added to show its strong similarity with fluorinated CNFs. CNF-F428's FWHM (6800 Hz) is larger than the one of the other fluorinated samples (4100 Hz). This can be explained by the efficiency of the MAS experiment, which depends on the structural order of the studied sample; this particular compound is less ordered as revealed by XRD. $(C_2F)_n$ and all types of CNFs studied above 428° C. exhibit similar MAS spectra, hence unaffected by the degree of fluorination. This confirms that both C—F bonding and fluorine environment are similar in these samples. An intense isotropic peak at −190 ppm/CFCl$_3$ is present together with its spinning sidebands. This peak corresponds to fluorine atoms involved in covalent C—F bonds. This covalent character was confirmed by FT-IR spectroscopy (not shown here) which shows a vibration band at 1215 cm$^{-1}$, assigned to covalent C—F bond in $(C_2F)_n$ (Kita 1979 ibid.).

A second less intense resonance at −120 ppm (present as a shoulder on one of the spinning sidebands of the C—F line) indicates the presence of CF$_2$ groups. Nevertheless, the content of the CF$_2$ groups is small but sufficient to be detected by $^{19}$F MAS NMR. The sidebands of the >CF$_2$ resonance are also present, in particular the one superimposed on the left side of the isotropic peak of the C—F groups and resulting in a shoulder. These groups could be assigned either to fluorine atoms located at the edge of graphite layers or to structural defects. These $^{19}$F MAS experiments allow other groups (—CF$_3$) to be detected in spite of their very low amount. Several narrow lines are present in the −60/−90 ppm range, superimposed with spinning sidebands of C—F and >CF$_2$ peaks. These groups can be localized on the fluorocarbon sheet edges and probably possess a spinning motion around the C—C bonds, explaining the narrowness of the resonance.

Figure 8:
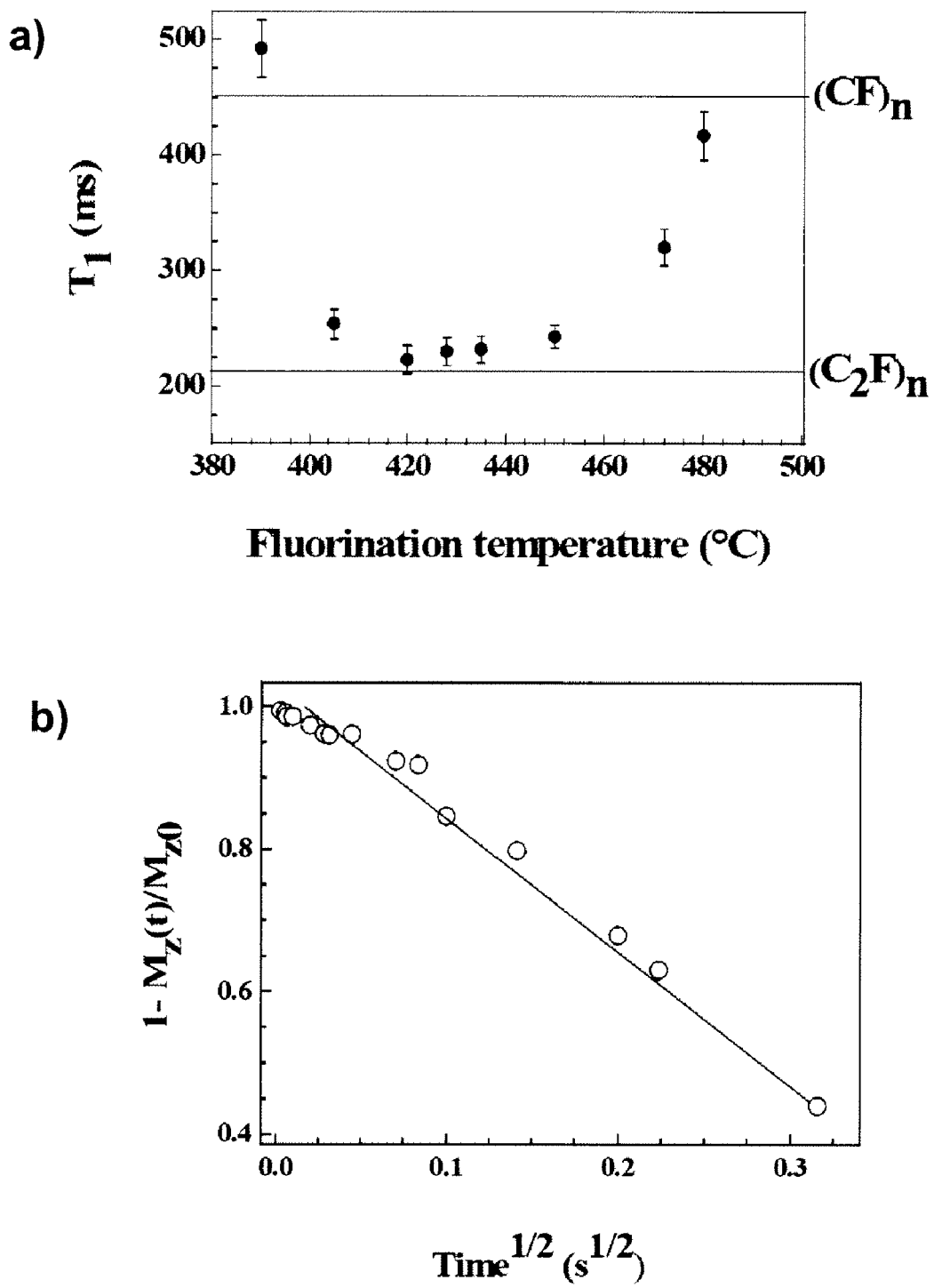
FIG. 8. Evolution of the spin-lattice relaxation time $T_1$ as a function of the fluorination temperature (a) and of initial $^{19}F$ magnetization curve of CNF-F420, $$1 - \frac{Mz(t)}{M_0} vs t^{1/2}. \tag{b}$$

The evolution of the $^{19}$F spin-lattice relaxation time ($T_1$) with fluorination temperature shown on FIG. 8a gives complementary information about the fluorine accommodation if the values are compared to those of conventional high temperature graphite fluorides types $(CF)_n$ and $(C_2F)_n$, which are equal to 450 and 210 ms, respectively (Dubois 2006 ibid.; Giraudet J.; Dubois M.; Guérin K.; Hamwi A.; Masin F.; *J. Phys. Chem. Solids* 2006, 67(5-6), 1100.). For a large range of fluorination temperatures (405<$T_F$<450° C.) i.e. corresponding to a large range of F:C ratios from 0.16 to 0.74, the spin-lattice relaxation times are close to the value found in $(C_2F)_n$ (FIG. 8a). This fact, in accordance with the other characterizations, suggests a fluorination mechanism involving $(C_2F)_n$ formation and its propagation towards the core without major structural change. This assumption will be confirmed below by $^{13}$C MAS-NMR experiments. Hence, when the reaction temperature is increased to 480° C., $T_1$ progressively approaches a 450 ms value, which is similar to that measured in $(CF)_n$ prepared using petroleum coke. The conversion from $(C_2F)_n$-type to $(CF)_n$-type structure goes through a partial exfoliation of fluorinated layers to allow for additional fluorine uptake.

The case of CNF-F390 is special since the fluorine content is very low (F:C=0.09) and the fluorinated parts are located essentially on the CNFs surface. We believe that the external surface is heavily fluorinated and it could explain the high $T_1$ value (492 ms) registered for this compound.

Contrary to $(CF)_n$ carbon fluoride (fluorinated coke), the presence of paramagnetic centers is an important factor of relaxation in the case of $(C_2F)_n$ (Dubois 2006 ibid.; Panich 2001 ibid.; Giruadet 2006 ibid.). Such a process is underlined by the linearity of the magnetization curve $$1 - \frac{Mz(t)}{M_0} vs t^{1/2}$$

for short recovery times (FIG. 8b). In fact, under certain conditions when the spin diffusion constant is of appropriate value, the magnetization for short recovery times develops as $t^{1/2}$ (Blumberg W. E.; *Phys. Rev.* 1960, 119, 79). This curve is linear for all fluorinated CNFs, as exemplified by the sample obtained at 420° C., giving additional proof of the structural similarities between CNF-FT$_F$ and $(C_2F)_n$.

Figure 9:
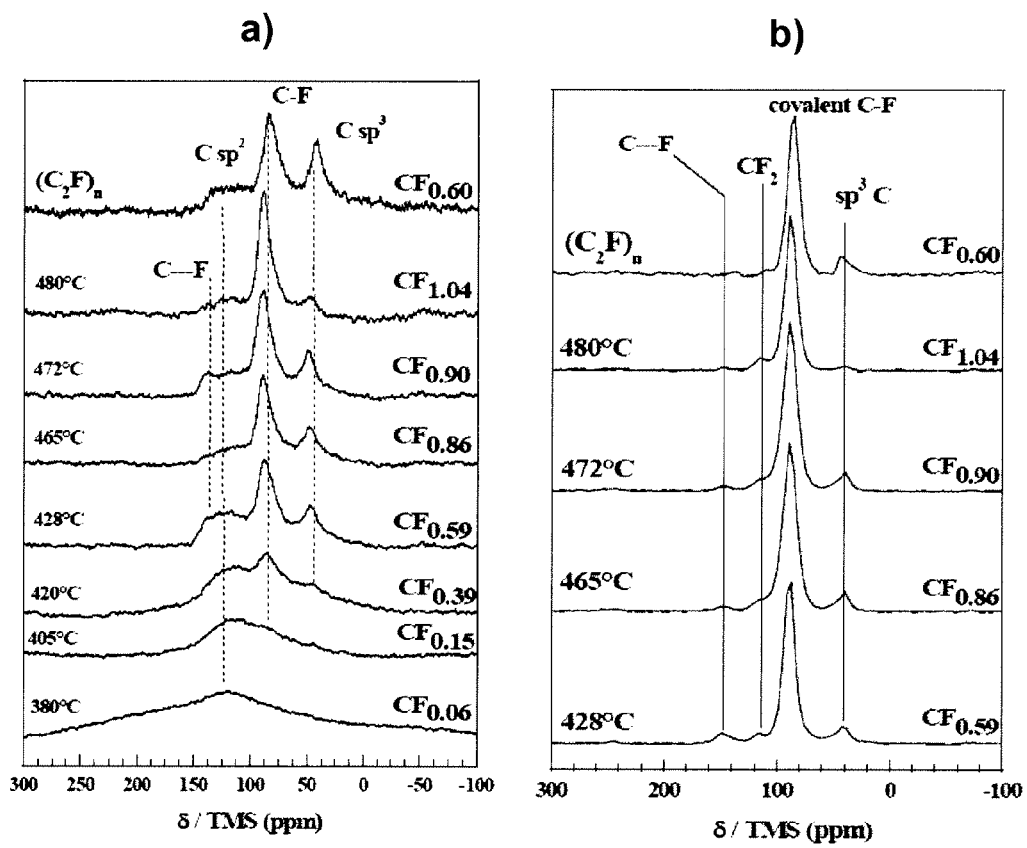
FIG. 9. (a) $^{13}C$ NMR spectra of CNFs fluorinated at temperatures ranging between 380 and 480° C. compared with the $(C_2F)_n$ graphite fluoride spectrum. (b) $^{13}C$ MAS NMR spectra of $CNF\text{-}T_F$ and $(C_2F)_n$ graphite fluoride obtained with $^{19}F$ to $^{13}C$ cross polarization (the spinning rate is 10 kHz).

$^{13}$C-NMR gives additional information about the nature of the interaction between carbon and fluorine atoms, i.e. the C—F bonding, and presence of non-fluorinated carbon atoms. Here again, the lowest fluorinated sample (CNF-F380) differs from the other CNF-FT$_F$ since it exhibits only one broad resonance centered near 120 ppm/TMS (FIG. 9a). Such a shape is close to that of pure graphite. Because of the low fluorine content, only a small part of the carbon atoms are bonded to fluorine atoms. When the fluorine content reaches 0.16, the line becomes asymmetric and two well defined resonances are present at 84-88 and 42 ppm for F:C≧0.31, both related to carbon atoms exhibiting sp$^3$ hybridization. The first line (with area denoted S$_{CF}$) is assigned to carbons atoms covalently bonded to fluorine atom as expected from the fluorine content found in this range of temperatures (Panich 1999; Dubois 2004.; Giruadet 2005a ibid). The other peak is related to non-fluorinated sp$^3$ carbons atoms (Csp$^3$) as in the case of $(C_2F)_n$ (Dubois 2006 ibid.). A chemical shift of 42 ppm corresponds to sp$^3$ carbon atoms as proposed by Wilkie et al. for $(C_xF)_n$ (x>1) (Wilkie C. A.; Yu G.; Haworth D. T.; *J. Solid Sate Chem.* 1979, 30, 197). In accordance with the proposed structural model of $(C_2F)_n$ which consists in fluorographite layers connected in pairs by interlayer covalent C—C bonds Watanabe N.; *Physica B* 1981, 105, 17; Sato Y.; Itoh K.; Hagiwara R.; Fukunaga T.; Ito Y.; *Carbon* 2004, 42, 3243), this line could be attributed to sp$^3$ carbon atoms. As only half of the carbon atoms are fluorinated, sp$^3$ hybridized carbon atoms are exclusively bonded to other carbons. The resonance peak of pure diamond is expected at 35 ppm (Duijvestjn M. J.; Van der Lugt C.; Smidt J.; Wind R. A.; Zilm K. W.; Staplin D. C.; *Chem. Phys. Lett.* 1983, 102, 25), therefore a weak fluorine-carbon interaction can lead to a chemical shift value similar to that observed in the case of $(C_2F)_n$ (δ=42 ppm) (Hamwi 1996 ibid; Dubois 2004 ibid.).

The third large resonance peak centered near 120 ppm is mainly assigned to non-fluorinated sp$^2$ carbon atoms but also to carbon atoms in low interaction with fluorine (≈140 ppm) (Hamwi 1996 ibid; Dubois 2004 ibid.).

The area ratio of the two sp$^3$ carbon resonance is nearly constant regardless of the fluorine content; we have $S_{C-F}/S_{Csp^3}$=2.43, 2.37 and 2.34 for CNFs fluorinated at 428, 465 and 472° C., respectively. For comparison, the spectrum of $(C_2F)_n$ graphite fluoride is also shown (this sample was obtained by fluorination of graphite at 380° C., exhibits a F:C ratio of 0.60 and few sp$^2$ C has been identified (Dubois 2006 ibid.). In this case, the $S_{C-F}/S_{Csp^3}$ ratio is close to 1.5.

On the other hand, the content of sp$^2$ carbon atoms decreases continuously when the fluorination temperature increases i.e. increase in the F:C content. It should be noted that such a process also occurs with $(C_2F)_n$ when the temperature is increased from 350 to 380° C. (CF$_{0.51}$ and CF$_{0.60}$, respectively) (Dubois 2006 ibid.). Then, fluorination of CNFs results in an increase of the F:C ratio without significant structural modification. The formed C—F bonds are mainly covalent.

NMR measurements performed using MAS and $^{19}$F→$^{13}$C cross-polarization may differentiate between the various carbon atoms. A comparison of the spectra acquired with MAS and CP-MAS for CNF-FT$_F$ and $(C_2F)_n$ (FIGS. 9a and 9b) confirms our assignments for the three kinds of carbon atoms. As C—F groups are favoured with CP-MAS in comparison to carbon second neighbours, i.e. sp$^3$ carbon atoms, only the peak corresponding to C—F bonds from the fluorocarbon matrix increases contrary to both sp$^3$ hybridized carbon atoms exclusively bonded to other carbon atoms (S$_{C-C}$) and sp$^2$ graphitic carbon atoms (S$_G$), the latter completely disappearing. Considering the peak at 145 ppm, which is revealed using these conditions, the measurements also show the presence of sp$^2$ carbon atoms in weak interaction with fluorine as in the case of room temperature graphite fluorides (Dubois 2004; 2005a ibid.). However, these atoms are only present in very low concentration.

Moreover, resonance of >CF$_2$ groups is also favoured with CP-MAS and a small line is observed at 110 ppm as a shoulder of the S$_{C-F}$ peak (FIG. 9b). Such groups have already been observed elsewhere in various $(CF)_n$ (Kita 1979; Touhara 2000; Panich 2001; Krawietz 1998; Wilkie 1979 all ibid.).

Whereas the MAS spectra are similar for samples treated between 428 and 472° C., the intensity of the peak related to sp$^3$ carbon atoms significantly decreases for CNF-F480 showing that the nature of this sample has been changed. The spectrum of CNF-F480 is very near to that observed for $(CF)_n$ contrary to the other spectra which exhibit similarities with $(C_2F)_n$ spectrum.

The C—F bond length can be determined by NMR because this data is included in the expression of the dipolar coupling. This latter information is lost when Hartmann-Hahn cross polarization (CP) associated to MAS is used but the dipolar coupling can be reintroduced into the spectrum thanks to the Inverse Cross Polarization (ICP) sequence. This method and the experimental conditions are fully explained in a previous paper concerning $(CF)_n$ (Giraudet J.; Dubois M.; Hamwi A.; Stone W. E. E.; Pirotte P.; Masin F.; *J. Phys. Chem. B* 2005, 109, 175, hereafter referred to as Giraudet 2005b).

For short contact times, the amplitude of the CP signal is found to be oscillatory with a frequency φ related to the C—F bond length (Bertani P.; Raya J.; Reinheimer P.; Gougeon R.; Delmotte L.; Hirschinger J.; *Solid State Magn. Res.* 1999, 13, 219). This behaviour is only observed for carbon covalently bonded to fluorine and not for sp$^3$ carbon atoms. Using the ICP sequence, the integrated peak intensity of the carbon spectra was calculated as a function of contact time thus revealing the CP dynamics (FIG. 10a); the extracted frequency was φ=3976.0±18.6 Hz. From $$r_{CF} = \sqrt[3]{\frac{10.0463}{\varphi}} \quad r_{CF} = 0.136 \pm 0.001 \text{ nm}$$

(Dubois 2006; Giruadet 2005b; Bertani 1999, all ibid.).

Figure 10:
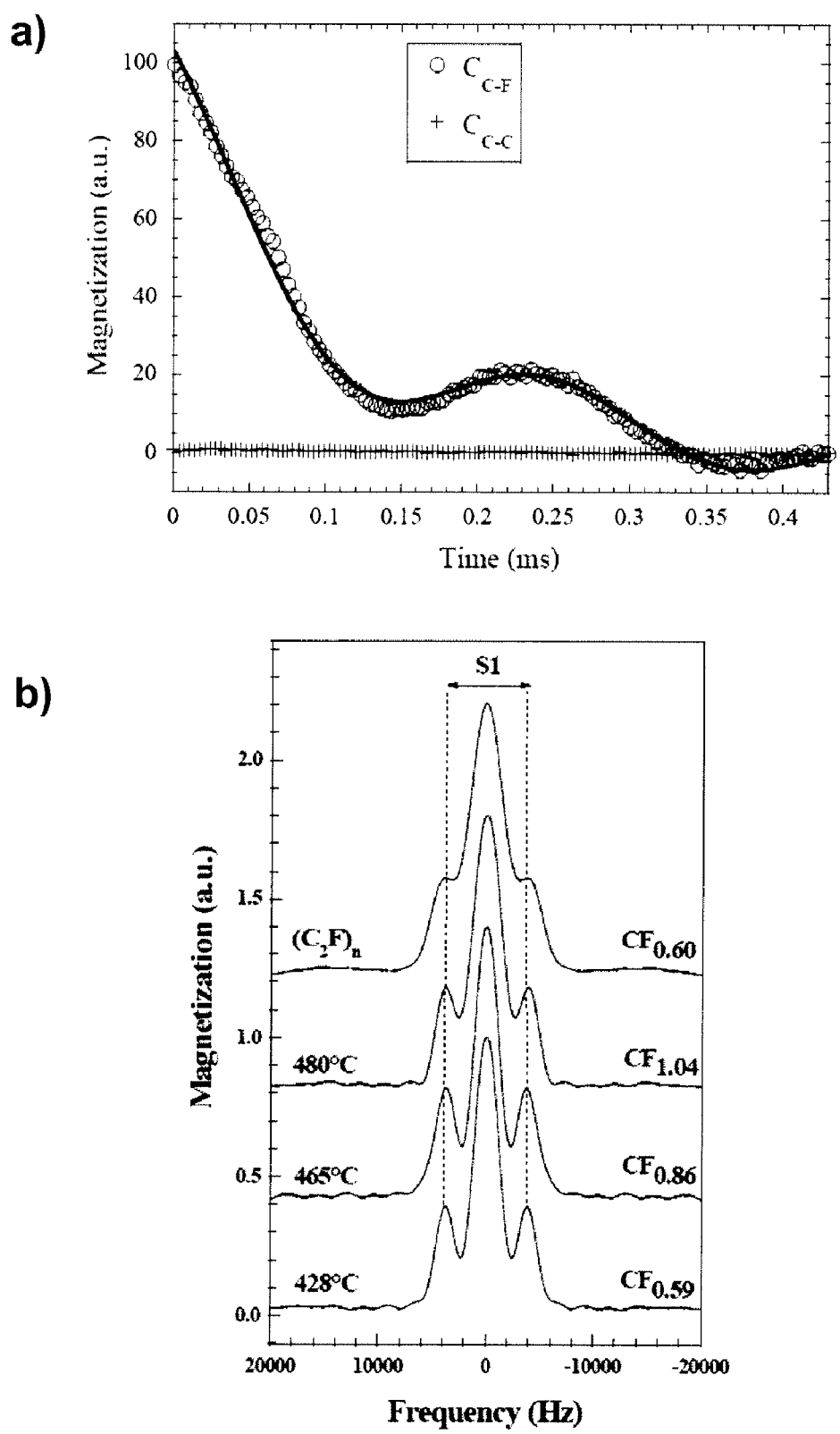
FIG. 10. (a) Time evolution of the $^{13}C$ magnetization for carbon atoms covalently bonded to fluorine (○) and exclusively bonded to carbon ($sp^3$ C) (●) of CNF-F472 with a spinning rate of 14.5 kHz at the n=1 Hartmann-Hahn condition. (b) Fourier transform of the resulting oscillation as a function of the fluorination temperature. The curve of $(C_2F)_n$ graphite fluoride is added for comparison.

As for $(C_2F)_n$ (Dubois 2006 ibid.) and $(CF)_n$ (Giruadet 2005b ibid.), Fourier transform of the $^{13}C$ magnetization evolution for C—F groups gives the Pake-like structure for all fluorination degrees of CNFs (FIG. 10b). The C—F bond length ($r_{CF}$) can be deduced from the Pake structure using the wings which are related to dipolar fluctuation. S1 is the separation between these wings. The bond length can be estimated from the equation $$r_{CF} = \sqrt[3]{\frac{20.0926}{S1}} \text{ (nm)}$$

(Dubois 2006; Giruadet 2005b; Bertani 1999, all ibid.). The S1 value is equal to 7700 Hz for all the fluorinated CNFs samples. A C—F bond distance equal to 0.138±0.002 nm is found in all studied cases. It must be noted that these values as estimated by NMR could be overestimated because of possible molecular motions which decrease the value of the second moment, inversely proportional to the C—F distance. The C—F bond lengths in CNF-FT$_F$ are close to those obtained by the same NMR procedure for $(C_2F)_n$ (Dubois 2006 ibid.) and $(CF)_n$ (0.138 nm) (Giruadet 2005b ibid.) indicating that the nature of the C—F bonding is similar in these three compound types.

3.4 EPR Study

Figure 11:
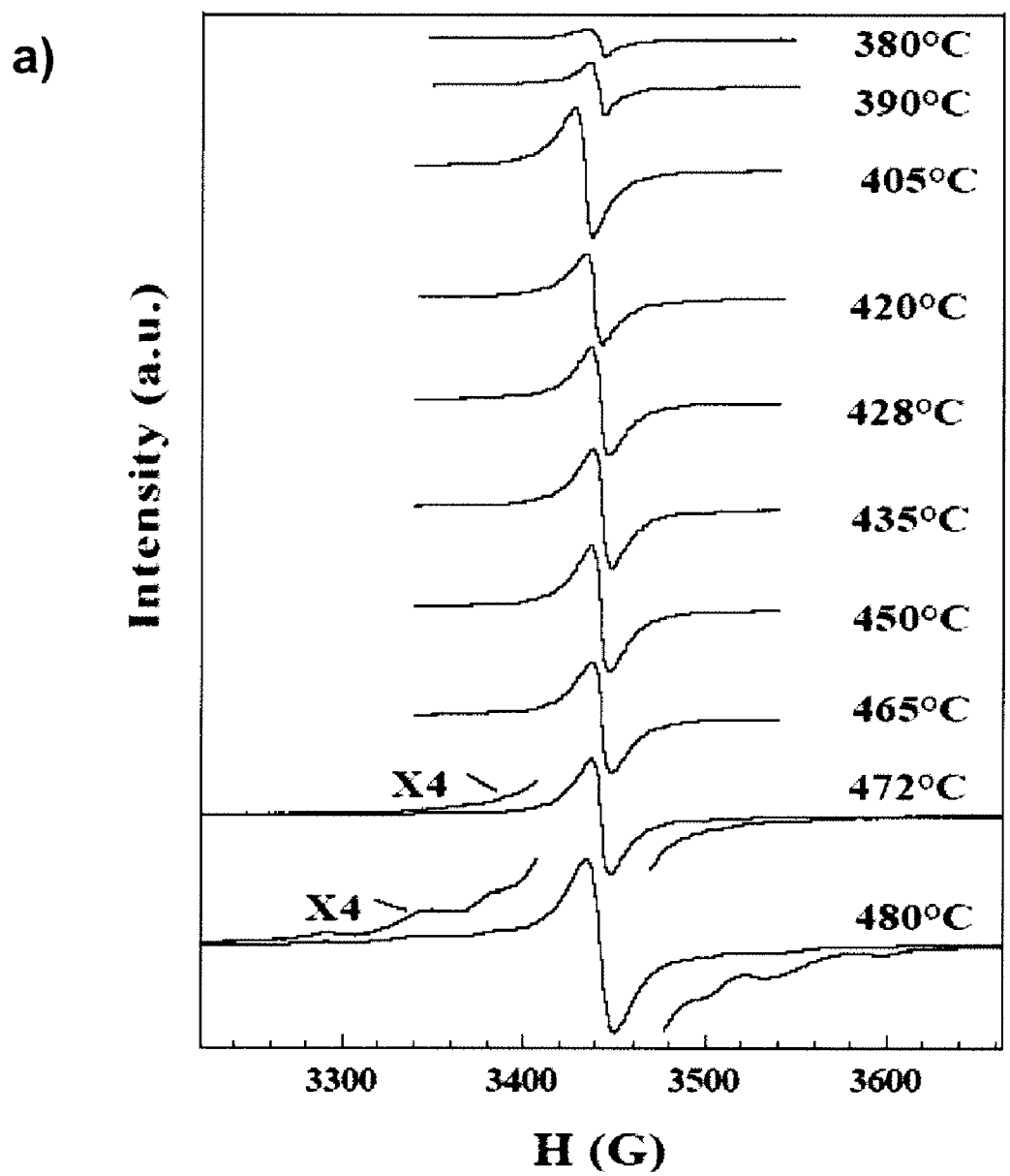
FIG. 11. EPR spectra of the fluorinated CNFs (a) (to facilitate comparison, the intensities are divided by the sample mass) and simulations of selected samples, CNF-F380 (b), CNF-F472 (c) and CNF-F480 (d).
Figure 11:
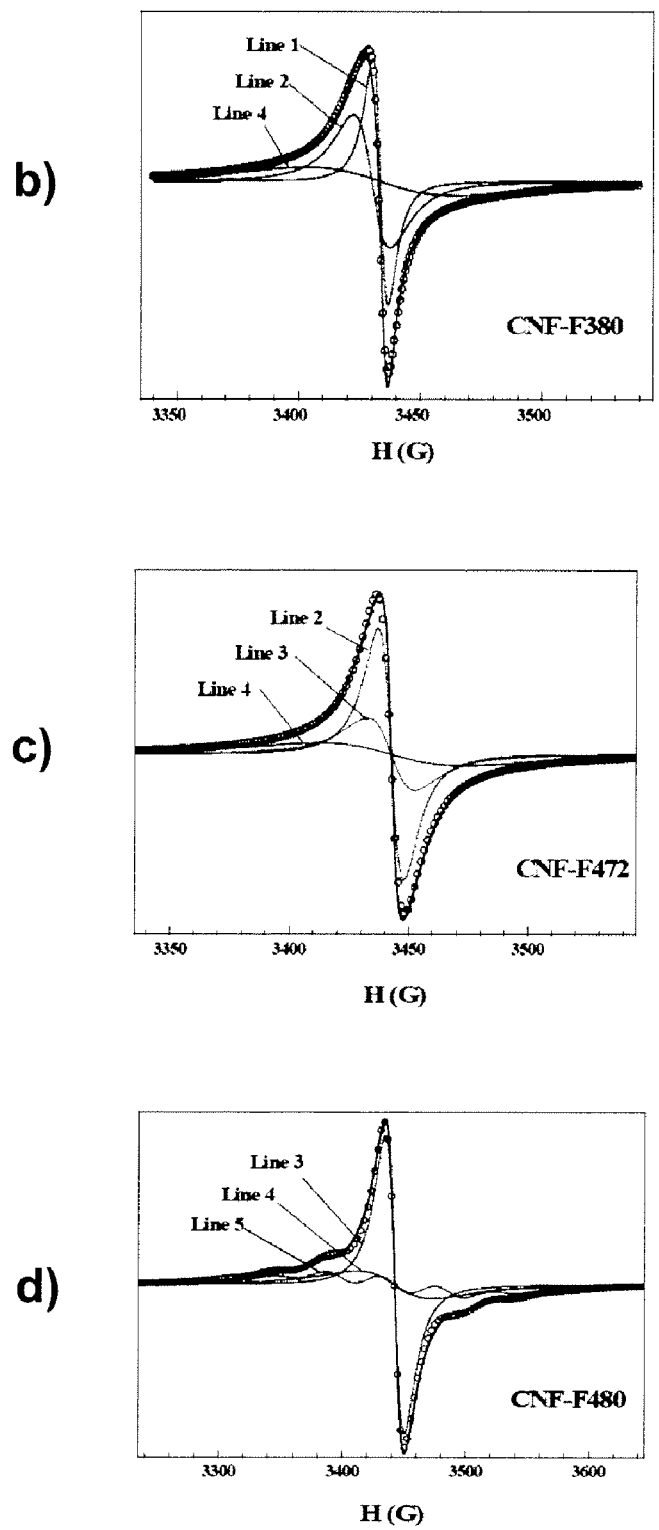

The pristine sample does not exhibit within the detection limits of the spectrometer, an EPR signal. FIG. 11a displays the EPR spectra of fluorinated CNFs. The origin of the main broad line was attributed to carbon dangling bonds having a localized spin. Such spin carriers have been proposed for other fluorinated carbons obtained in $F_2$ atmosphere at 600° C. starting from graphite (Panich 2001 ibid.) or room temperature graphite fluoride (Dubois 2004; Giraudet 2006 ibid), but also for amorphous carbon thin film (Yokomichi H.; Morigaki K.; *J. Non-Cryst. Solids* 2000, 266, 797; Yokomichi H.; Hayashi T.; Amano T.; Masuda A.; *J. Non-Cryst Solids* 1998, 227, 641) or nanosized graphite fluorides (Takai K.; Sato H.; Enoki T.; Yoshida N.; Okino F.; Touhara H.; Endo M.; *Mol. Cryst. Liq. Cryst.* 2000, 340, 289).

Figure 12:
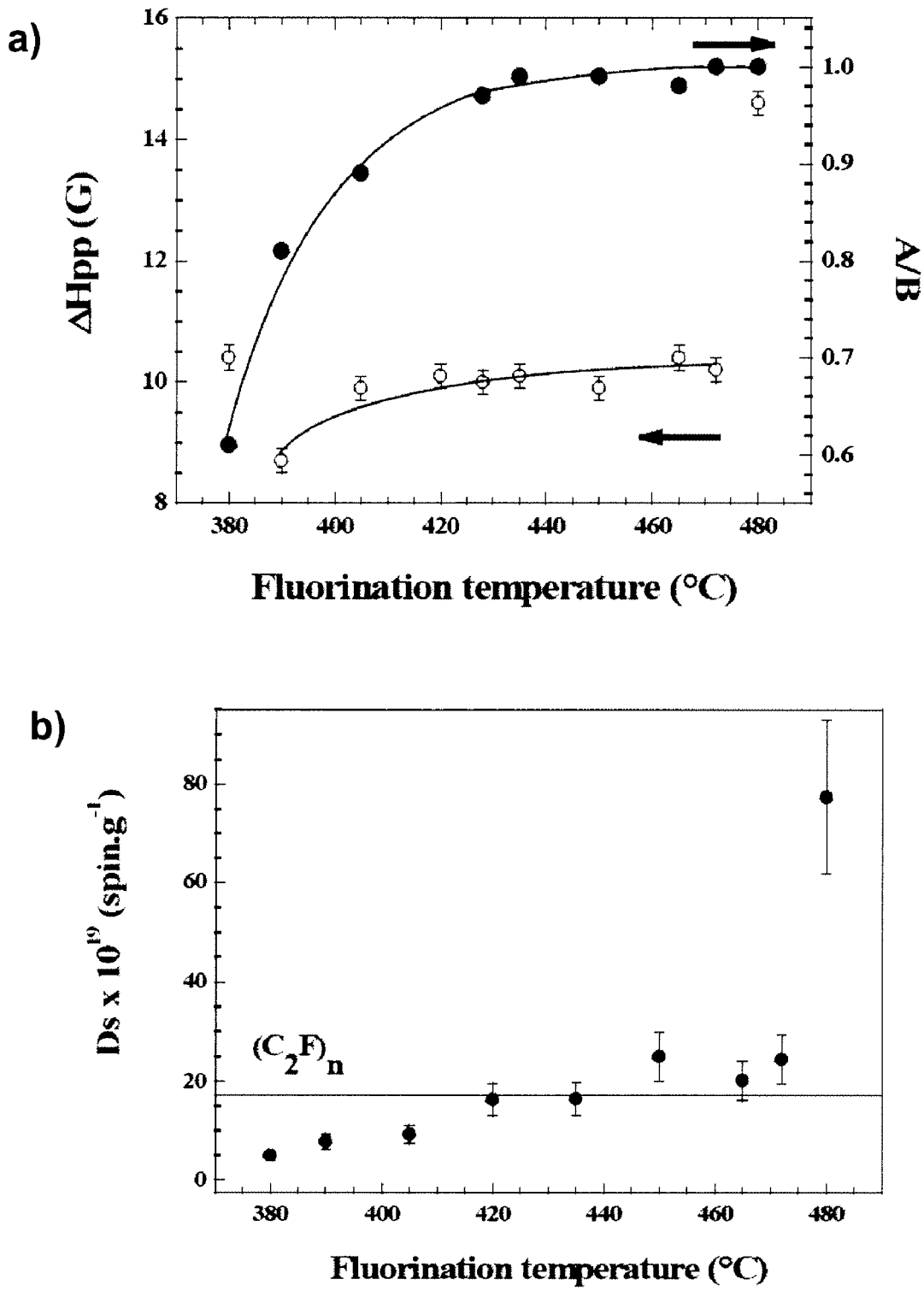
FIG. 12. Evolution with the fluorination temperature of the EPR parameters, linewidth ($\Delta H_{PP}$) and A/B ratio (a) and Ds spin density (b).
Figure 13:
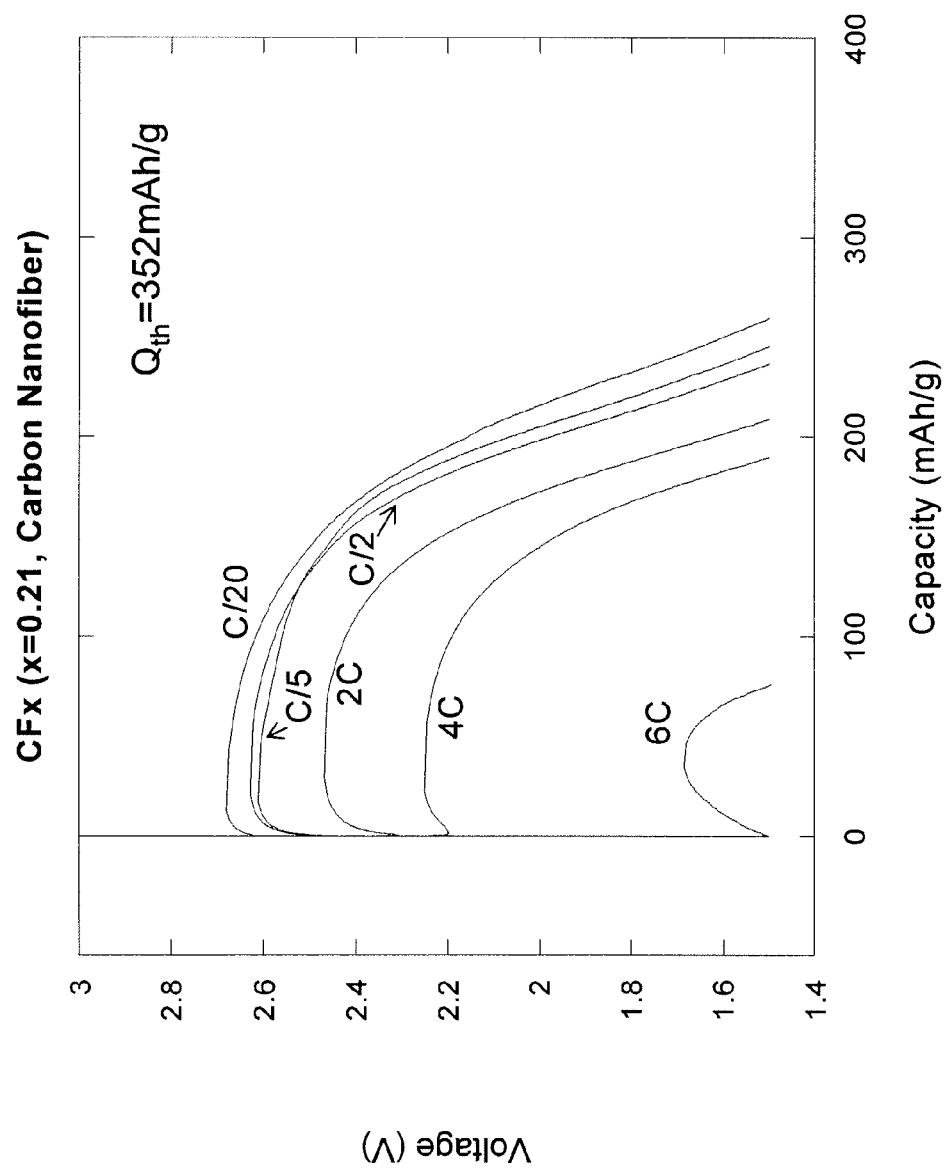
FIG. 13. Discharge curve of cell with a lithium anode and a fluorinated carbon nanofiber cathode, the fluorinated nanofibers having a fluorine to carbon ratio of 0.21.

The EPR parameters are summarised in FIGS. 12a and 12b and in Table 2. Once again, the CNFs fluorinated at the lowest and the highest temperatures ($T_F$<405° C. and $T_F$=480° C.) differ from the other samples. The spectrum of CNF-F380 is asymmetric (the A/B intensity ratio of positive and negative parts of the derivative curve is close to 0.6 (FIG. 12a)). This asymmetry, revealing different contributions to the spectra, disappears gradually as fluorination is increased. So, A/B leads to 1. Simulation of the spectra reveals three contributions for CNF-F380, CNF-F472 and CNF-F480 (FIGS. 11b, 11c and 11d, respectively, and also Table 2). These simulations were performed using WinSimfonia (Bruker software).

First, by analogy with $(C_2F)_n$ and $(CF)_n$, the observed broad line 4 may be due to the combined contributions of both the dangling bonds in interaction with oxygen (Dubois 2006 ibid.) and, in the cases of $(CF)_n$ and CNF-F480, the unresolved superhyperfine structure which for both samples exhibits nearly the same linewidth (Giraudet 2005b ibid). Because the linewidths are close, line 2 could be related to dangling bonds located in neighboring similar to $(C_2F)_n$ (Tab. 2). For the same reason, we can assign line 3 to structural defects similar to those present in $(CF)_n$ (Giraudet 2006 and 2005b ibid). The content of these spin carriers increases with the fluorination temperature and becomes predominant for CNF-F480 (dangling bonds of line 2 completely disappeared). Line 1, responsible for the asymmetry (FIG. 11b), appears for the lowest temperature reaction (380 and 390° C.) when inhomogeneous fluorination occurs close to the surface. The narrowness of this signal results from different interactions with the fluorocarbon matrix and/or presence of intercalated F—. On one hand, the spin density ($D_s$ i.e. the number of dangling bonds per mass of the sample) continuously increases with the fluorination temperature, as shown in FIG. 12b, because of the propagation of the fluorinated parts, which contain paramagnetic defects; it must be noted that CNFs do not exhibit EPR lines. For $T_F$ included between 380 and 472° C., $D_s$ is close to that of $(C_2F)_n$ (17 $10^{19}$ spins.g$^{-1}$, see table 2). On the other hand, $D_s$ drastically increases for CNF-F480 and becomes more and more similar to that of $(CF)_n$ type (15.6 $10^{20}$ spins.g$^{-1}$, this sample was obtained with natural graphite) in accordance with the structural conversion of $(C_2F)_n$ into $(CF)_n$, which has been proposed before in the present work.

4. General Discussion

The particular structure of CNFs seems to favor the formation of $(C_2F)_n$ type materials as fluorination proceeds. This $(C_2F)_n$ structure which consists of pairs of fluorographite layers, is formed and conserved irrespective of the fluorination temperature (405<$T_F$<450° C.), through a wide range of composition (from F:C of 0.16 to 0.74). This feature can be explained by a fluorination process occurring close to the external walls when low temperatures are applied and then progressing towards the internal walls when the temperature is increased. This mechanism is different from that of the fluorination of graphite, as a progressive conversion from $(C_2F)_n$ into $(CF)_n$ occurs when the temperature is increased within the 350/600° C. range (Nakajima 1991; Kupta V.; Nakajima T.; Ohzawa Y.; Zemva B.; *J. Fluorine Chem.* 2003, 120, 143). Whereas $(C_2F)_n$ and $(CF)_n$ are formed via a fluorine-intercalated phase with planar graphene layers (Kupta 2003 ibid), this intermediate phase does not seem to be involved during the fluorination of CNFs. An increase in fluorination temperature up to 480° C. results in a partial decomposition of the CNFs. The mechanism could be similar to that of a partial exfoliation. The $^{13}C$-NMR spectrum (FIG. 11) of this resulting material clearly shows the low contents of both the pristine sp$^2$ carbons and sp$^3$ carbon atoms related to $(C_2F)_n$ type. The partial decomposition of the fluorinated parts leads to a conversion of $(C_2F)_n$ into $(CF)_n$.

Even if the evolution of the F:C ratio for CNFs could be expected under the fluorination conditions applied here, some new and interesting features can be highlighted from this study. Contrary to previous works concerning MWCNT (Hamwi 1997 ibid.), the high degree of purity of our raw CNFs allows the chemical composition to be accurately deduced from the F:C ratio. In the previous studies, this was underestimated because of the presence of reactive carbon in the pristine sample which formed volatile-carbon fluorine derivatives. Moreover, the F:C ratio increase within the narrow temperature range [420-435° C.] had never been reported before; only a high fluorination process between 400 and 500° C. had been previously suggested (Nakajima 1996 ibid.). Furthermore, another important finding in this study is the determination of both a temperature limit before CNFs decomposition and a fluorination level limit for CNFs. On the basis of complementary characterization using NMR, Raman and XRD, the fluorinated materials can be classified into three different types depending on the treatment temperature:

For the lowest fluorination temperatures ($T_F$<420° C.), the fluorinated samples exhibit a low fluorine content and their structure is close to that of pristine CNFs as shown by Raman diffusion and XRD. The fluorine atoms are located on the CNFs surface i.e. on the external walls.

In the 420-465° C. temperature range, drastic changes take place as a consequence of the F:C ratio increase, which is rapid for T<435° C. The fluorination level then slows down; first, the samples become biphasic (CNF and CNF-F) and the new CNF-F phase exhibits cristallographic similarities with $(C_2F)_n$ type graphite fluoride involving paired fluorographite layers connected by interlayer covalent C—C bonds. This has been demonstrated by the presence of $sp^3$ hybridized carbon atoms exclusively bonded to carbon atoms in the fluorocarbon interlayer. The curvature of the graphene layers and/or their stacking seems both to limit the fluorination in comparison with graphite and to favor the formation of this $(C_2F)_n$ type phase. Raman scattering reveals that the concentration of structural defects increases with the fluorine content. Moreover, the incorporation of fluorine atoms occurs through the formation of covalent C—F bonds. The type of interaction between carbon and fluorine atoms does not vary with the fluorine content. Therefore, the fluorination process must start from the outer walls, forming a $(C_2F)_n$ configuration, and then progresses towards the CNF core.

When the fluorination temperature is increased above 465° C., a low exfoliation occurs and decomposes the CNF-$FT_F$ as clearly shown in the case of CNF-F480. This mechanism was evidenced by both $^{13}$C-NMR and XRD which clearly show the conversion of $(C_2F)_n$ into $(CF)_n$ allowed by a partial exfoliation. Nevertheless, the $(C_2F)_n$ into $(CF)_n$ conversion is low for treatment temperatures equal to 472° C. and mainly occurs for $T_F \geq 480°$ C. The occurrence of fluorescence in the Raman scattering spectra may be the signature of $(CF)_n$ formation at higher $T_F$.

5. Conclusion

Fluorine gas reaction with carbon nanofibers for temperatures ranging between 380 and 480° C. has been studied. Fluorine content increases from $CF_{0.31}$ up to $CF_{0.70}$ in a narrow temperature range [420-435° C.]. 472° C. appears as the upper temperature before partial CNF decomposition. For lower temperatures, only a surface fluorination occurs. In the 420-435° C. temperature range, the samples become biphasic and the new cristallographic phase in addition to the raw CNFs exhibits some similitudes with $(C_2F)_n$ type graphite fluoride. This phase is formed irrespective of the fluorine content, above a reaction temperature of 420° C., suggesting that fluorination occurs from the external walls towards the core with increasing fluorination temperature. Moreover, the incorporation of fluorine atoms occurs through the formation of covalent C—F bonds whatever the fluorine content. Comparing $(CF)_n$ and $(C_2F)_n$ graphite fluorides, the structural parameters such as interlayer distance, $T_1$ spin-lattice relaxation time, paramagnetic dangling bonds density and environment, are sufficiently different to enable us to determine which phase is formed during the fluorination of the carbon nanofibers as a function of temperature.

TABLE 1

F:C ratio obtained by weight uptake and by quantitative NMR together with Raman ratio $I_D/I_G$ of the various fluorinated CNFs.

| Material | $T_F$(° C.) | F:C Gravimetry | F:C NMR | $I_D/I_G$ |
|---|---|---|---|---|
| CNF-F380 | 380 | 0.04 | 0.06 | 0.30 |
| CNF-F390 | 390 | 0.09 | 0.09 | 0.29 |
| CNF-F405 | 405 | 0.16 | 0.15 | 0.26 |
| CNF-F420 | 420 | 0.31 | 0.39 | 0.78 |
| CNF-F428 | 428 | 0.59 | 0.59 | 0.89 |
| CNF-F435 | 435 | 0.70 | 0.68 | 1.02 |
| CNF-F450 | 450 | 0.74 | 0.74 | 1.12 |
| CNF-F465 | 465 | 0.78 | 0.86 | 0.90 |
| CNF-F472 | 472 | 0.73 | 0.90 | Fluorescence |
| CNF-F480 | 480 | 0.70 | 1.04 | Fluorescence |
| CNF-F490 | 490 | Partial Decomposition | | |

TABLE 2

Data from EPR spectra

| | ΔHPP (G) | | | | | | Ds |
|---|---|---|---|---|---|---|---|
| | Line 1 ±0.2 G | Line 2 ±0.2 G | Line 3 ±0.2 G | Line 4 ±5 G | Line 5 | A/B | (spins · $g^{-1}$) |
| CNF-F380 | 6.2 | 15.0 | — | 60 | | 0.6 | $0.5 \times 10^{20}$ |
| CNF-F472 | — | 11.0 | 19.5 | 60 | | 1 | $2.4 \times 10^{20}$ |
| CNF-F480 | — | — | 17.4 | 80 | SHFS* | 1 | $7.7 \times 10^{20}$ |
| $(C_2F)_n$ | — | 13.5 | | 80 | | 1 | $1.7 \times 10^{20}$ |
| $(CF)_n$ (from petroleum coke) | | | 20.9 | 80 | SHFS* | 1 | $15.6 \times 10^{20}$ |

*superhyperfine structure (SHFS) with (2 nl + 1) = 7 lines where n = 6 is the number of neighbouring fluorine nuclei (nuclear spin number I = ½) (coupling constant A = 45 ± 2 G, linewidth ΔHPP = 36 G ± 2 G) (Dubois 2006; Giraudet 2006)
**S1 = SSHFS + Sunresolved SHFS
Data for (C2F)$_n$ from Dubois 2006; data for (CF)$_n$ from Giraudet 2005b

EXAMPLE 2

Electrochemistry of Fluorinated Carbon Nanofibers

For the electrochemical tests, electrodes were composed of the at least partially fluorinated carbon nanofiber sample, a conductive material and a binder. For the samples tested at a constant discharge rate of 10 Akg$^{-1}$ whose results are shown in Table 3, the electrode composition was about 80% by weight of the fluorinated nanofibers, 10% by weight graphite, and 10% polyvinylidene difluoride (PVDF) 10% by weight as binder. The electrode was then mounted in a two electrode cell where the electrolyte was composed of a 1 mol.L$^{-1}$ solution of LiClO$_4$ dissolved in propylene carbonate. A microporous PVDF film containing the electrolyte was sandwiched between the graphite fluoride electrode and a lithium metal foil.

For the samples whose results are shown in FIGS. 13-16 and Table 4, the electrode composition was about 75% by weight of the fluorinated nanofibers, 10% by weight acetylene black graphite, and 15% polyvinylidene difluoride (PVDF) 10% by weight as binder. These three materials were mixed together in acetone solution with Bis(n-butyl)phthalate (DBP) 20%. The solution was then evaporated until a thin film of CF$_x$ was obtained. The film was cut to the desired diameter and dried overnight in vacuum. The electrolyte was LiBF$_4$ dissolved in propylene carbonate (PC) and dimethyl ether (DME). The separator was Celgard®, 25 microns thick, 55% porous. The separator containing the electrolyte was sandwiched between the graphite fluoride electrode and a lithium metal foil.

Figure 18:
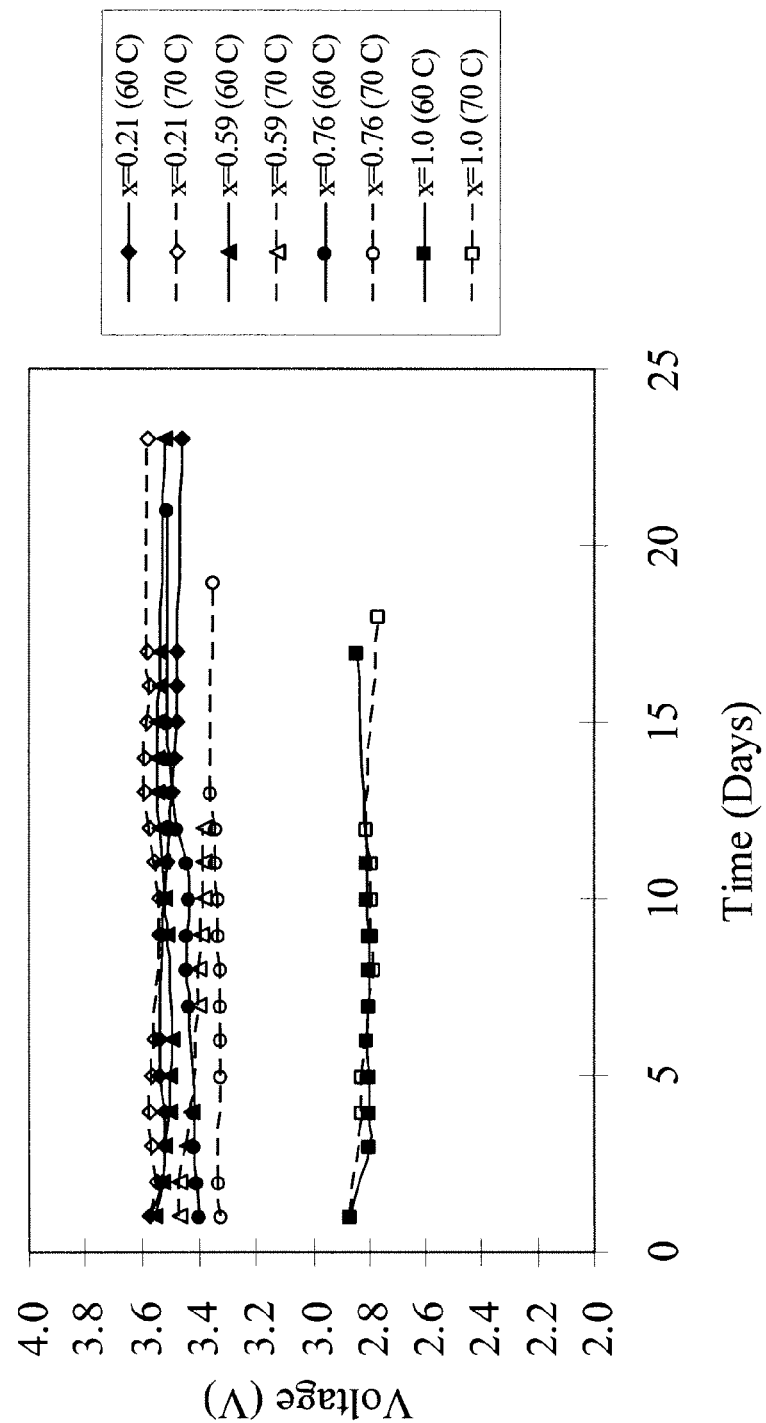
FIG. 18. Open circuit voltage profiles of lithium/$CF_x$ cells at different temperatures.

For the samples whose results are shown in FIG. 18, the electrolyte was 1 M LiBF$_4$ dissolved in propylene carbonate (PC) and dimethyl ether (DME) (3:7) (5% discharge at C/20 RT).

The discharge profile of the Li/fluorinated carbon nanofiber cells is shown in FIGS. 13-16. For reference, FIG. 17 shows a discharge profile for a conventional Li/CF cell. These cells exhibit a characteristic plateau corresponding to the formation of LiF according to equation 1.

The main electrochemical characteristics of fluorinated CNF are summarized in Tables 3 and 4. In Table 3, the discharge rate was constant and equal to 10 Akg$^{-1}$. The achieved energy density, E$_{spec}$ (units Whkg$^{-1}$), and power density, P$_{spec}$ (units Wkg$^{-1}$), are determined from the discharge curves using equations (5) and (6):

$$E_{spec} = \frac{q(i) \times \langle e_i \rangle}{m} \quad (5)$$

$$P_{spec} = \frac{i \times \langle e_i \rangle}{m} \quad (6)$$

In the equations for E$_{spec}$ and P$_{spec}$, q(i) and <e$_i$> respectively represent the discharge capacity (Ah) and the average discharge voltage (V) at current i (A), and m is the mass of active (CF$_x$)$_n$ in the electrode (kg).

At a constant discharge rate of 10 Akg$^{-1}$, the average potential of all the studied samples is about the same and equal to 2.5 V. This result is in agreement with a covalent C—F bond which does not change upon fluorination as characterized by $^{13}$C NMR. Moreover, as the fluorination temperature range is narrow, the non-dependence of the C—F bond nature with reaction temperature is easily understandable. As the power density P (W kg-1) is directly proportional to the average discharge voltage and to the current density applied to the cell (which was a constant of 10 A kg-'), the power density is also constant at 25 w kg-$^1$ whatever the fluorinated compound.

On the other hand, the discharge profiles differ greatly in their voltage and shape. This result is mainly due to the increase of F/C with fluorination temperature. The higher F/C, the higher the discharge capacity. Only, the sample fluorinated at 405 C does not exhibit a constant discharge potential as the others fluorinated MWCNTF. This can be related to the fluorine fixation site. As a matter of fact, as F is expected to be located at the surface of the MWCNTF, the concentric form of the sheets results in a slight dispersion of the C—F bonding energy and the different electrochemical potentials of LiF formation lead to a gradual discharge plateau. For the other samples, a constant discharge potential is present and corresponds to the LiF formation from fluorine intercalated between the fluorocarbon matrix. Whereas the discharge voltage and the fluorine content F/C of MWCNTF are close to (C$_2$F), compound, the capacity of the MWCNTF fluorinated between 428 and 450° C. are 30% higher than those of commercial (C$_2$F).

Regarding the energy density, the maximum value obtained is high and the energy density evolution evolves as the capacity one with fluorination temperature as discharge voltage is constant. The maximum of electrochemical performances of MWCNTF465 is due to the singular evolution of the faradic yield with fluorination temperature. The faradic yield which is defined as the ratio of the discharge capacity on the theoretical specific discharge one is low for the lowest fluorinated MWCNT and is about 100% for fluorination temperature higher than 450° C. As one could expected the presence of MWCNT (even in low amounts) of high electrical conductivity together with insulating carbon fluoride should favor the coulombic efficiency.

For the samples in Table 3, the over-potential for low discharge time was observed to increase with fluorination temperature. This is related to the decrease of electrical conductivity of the sample when the fluorinated parts progress i.e. the decrease of pristine MWCNT amount into the sample. However, lithium diffusion seems to limit the electrochemical processes and determine the electrode performances. This could be explained by the MWCNTFTT structure: a biphasic domain may not constitute a preferential way for lithium diffusion whereas for a fluorination temperature higher than 450° C., a single graphite fluoride structure with low defect level allows lithium to diffuse through the overall particles more easily and more particularly when the current density is low as in our case.

A maximum of electrochemical performances (E$_{spec}$, P$_{spec}$) was obtained for the fluorination temperature where both F/C is maximum and (C2F), type graphite fluoride phase is mainly present in the compound i.e, for a treatment temperature equal to 465° C.

The stability of the open circuit voltage with time (self-discharge) was investigated for several fluorinated CNF compositions. FIG. 18 shows the excellent stability of these materials.

TABLE 3

| | T$_F$ (° C.) | F/C | I$_D$/I$_G$ | C (mA/g) | <E> (V) | E$_{spec}$ (Wh/kg) | P$_{spec}$ (W/kg) | Yield % |
|---|---|---|---|---|---|---|---|---|
| CNF380 | 380 | 0.044 | 0.30 | | | | | |
| CNF390 | 390 | 0.090 | 0.29 | | | | | |
| CNF405 | 405 | 0.160 | 0.26 | 153 | 2.49 | 381 | 24.9 | 54 |
| CNF420 | 420 | 0.312 | 0.78 | 325 | 2.50 | 813 | 25.0 | 61 |
| CNF428 | 428 | 0.587 | 0.89 | 530 | 2.53 | 1341 | 25.3 | 78 |
| CNF435 | 435 | 0.700 | 1.02 | | | | | |
| CNF450 | 450 | 0.737 | 1.12 | | | | | |
| CNF465 | 465 | 0.775 | 0.90 | 760 | 2.40 | 1824 | 24.0 | 98 |
| CNF472 | 472 | 0.730 | F | 725 | 2.50 | 1813 | 25.0 | 96 |
| CNF480 | 480 | 0.700 | F | | | | | |

*F: fluorescence

TABLE 4

| CFx | Theoretical capacity (mAh/g) | Max. C-rate available | Max. Energy density (Wh/kg) | Max. Power density (W/kg) |
|---|---|---|---|---|
| Commercial CFx (x = 1.0) | 865 | 1C | 2012 | 1370 |
| CNF, x = 0.21 | 352 | 6C | 620 | 3434 |
| CNF, x = 0.59 | 681 | 6C | 1587 | 7866 |
| CNF, x = 0.76 | 771 | 6C | 1749 | 8057 |
| CNF, x = 0.82 | 797 | 4C | 1897 | 5564 |

STATEMENTS REGARDING INCORPORATION BY REFERENCE AND VARIATIONS

All references throughout this application, for example, patent documents including issued or granted patents or equivalents; patent application publications; unpublished patent applications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

Any appendix or appendices hereto are incorporated by reference as part of the specification and/or drawings.

Where the terms "comprise", "comprises", "comprised", or "comprising" are used herein, they are to be interpreted as specifying the presence of the stated features, integers, steps, or components referred to, but not to preclude the presence or addition of one or more other feature, integer, step, component, or group thereof. Separate embodiments of the invention are also intended to be encompassed wherein the terms "comprising" or "comprise(s)" or "comprised" are optionally replaced with the terms, analogous in grammar, e.g.; "consisting/consist(s)" or "consisting essentially of/consist(s) essentially of" to thereby describe further embodiments that are not necessarily coextensive.

The invention has been described with reference to various specific and preferred embodiments and techniques. However, it should be understood that many variations and modifications may be made while remaining within the spirit and scope of the invention. It will be apparent to one of ordinary skill in the art that compositions, methods, devices, device elements, materials, procedures and techniques other than those specifically described herein can be applied to the practice of the invention as broadly disclosed herein without resort to undue experimentation. All art-known functional equivalents of compositions, methods, devices, device elements, materials, procedures and techniques described herein are intended to be encompassed by this invention. Whenever a range is disclosed, all subranges and individual values are intended to be encompassed as if separately set forth. This invention is not to be limited by the embodiments disclosed, including any shown in the drawings or exemplified in the specification, which are given by way of example or illustration and not of limitation. The scope of the invention shall be limited only by the claims.

REFERENCES

Hamwi A.; *J. Phys. Chem. Solids,* 1996, 57(6-8), 677-688
Nakajima T.; Watanabe N. *Graphite fluorides and Carbon-Fluorine compounds,* 1991, CRC Press, Boston
Kita Y.; Watanabe N.; Fujii Y.; *J. Am. Chem. Soc.,* 1979, 101, 3832
Hamwi A.; Alvergnat H.; Bonnamy S.; Béguin F.; *Carbon* 1997, 35, 723
Nakajima T.; Kasamatsu S.; Matsuno Y.; *Eur. J. Solid. State Inorg. Chem.* 1996, 33, 831
Hamwi A.; Gendraud P.; Gaucher H.; Bonnamy S.; Béguin F.; *Mol. Cryst. Liq. Cryst* 1998, 310, 185
Touhara H.; Inahara J.; Mizuno T.; Yokoyama Y.; Okanao S.; Yanagiuch K.; Mukopadhyay I.; Kawasaki S.; Okino F.; Shirai H.; Xu W. H.; Kyotani T.; Tonita A.; *J. Fluorine Chem.* 2002, 114, 181
Mickelson E. T.; Huffman C. B.; Rinzler A. G.; Smalley R. E.; Hauge R. H.; Margrave J. L.; *Chem. Phys. Lett.* 1998, 296, 188
Kelly K. F.; Chiang I. W.; Mickelson E. T.; Hauge R.; Margrave J. L.; Wang X.; Scueria G. E.; Radloff C.; Halas N. J.; *Chem. Phys. Lett.* 1999, 313, 445
Basire C.; Ivanov D. A.; *Phys. Rev. Lett.* 2000, 85, 5587.
Press W. H.; *Numerical Recipes in C, The Art of Scientific Computing,* 1988, Plenum Press, New York).
Dubois M.; Giraudet J.; Guérin K.; Hamwi A.; Fawal Z.; Pirotte P.; Masin F.; *J. Phys. Chem. B* 2006, 110, 11800
Okotrub A. V.; Yudanov N. F.; Chuvilin A. L.; Asanov I. P.; Shubin Y. V.; Bulusheva L. G.; Gusel'nikov A. V.; Fyodorov I. S.; *Chem. Phys. Lett.* 2000, 323, 231
Osswald S.; Flahaut E.; Ye H.; Gogotsi Y.; *Chem. Phys. Lett.* 2005, 402, 422
Rao A. M.; Fung A. W. P.; di Vittorio S. L.; Dresselhaus M. S.; Dresselhaus G.; Endo M.; Oshida K.; Nakajima T.; *Phys. Rev. B* 1992, 45, 6883
Chien T. C.; Dresselhaus M. S.; Endo M. *Phys. Rev. B* 1982, 26, 5867
Knight D. D.; White W. S.; *J. Mater. Res.* 1989, 4, 385
Panich A. M.; *Synth. Metals* 1999, 100, 169
Touhara H.; Okino F.; *Carbon* 2000, 38, 241
Panich A. M.; Shames A. I.; Nakajima T.; *J. Phys. Chem. Solids* 2001, 62, 959
Krawietz T. R.; Haw J. F.; *Chem. Commun.* 1998, 19, 2151
Dubois M.; Guérin K.; Pinheiro J. P.; Fawal Z.; Masin F.; Hamwi A.; *Carbon* 2004, 42, 1931
Giraudet J.; Dubois M.; Guérin K.; Pinheiro J. P.; Hamwi A.; Stone W. E. E.; Pirotte P.; Masin F.; *J. Solid State Chem.* 2005, 118, 1262.
Hagaman E. W.; Murray D. K.; CuI G. D. D.; *Energy & Fuel* 1998, 12, 399
Giraudet J.; Dubois M.; Guérin K.; Hamwi A.; Masin F.; *J. Phys. Chem. Solids* 2006, 67(5-6), 1100
Blumberg W. E.; *Phys. Rev.* 1960, 119, 79
Wilkie C. A.; Yu G.; Haworth D. T.; *J. Solid Sate Chem.* 1979, 30, 197
Watanabe N.; *Physica B* 1981, 105, 17
Sato Y.; Itoh K.; Hagiwara R.; Fukunaga T.; Ito Y.; *Carbon* 2004, 42, 3243
Duijvestjn M. J.; Van der Lugt C.; Smidt J.; Wind R. A.; Zilm K. W.; Staplin D. C.; *Chem. Phys. Lett.* 1983, 102, 25
Giraudet J.; Dubois M.; Hamwi A.; Stone W. E. E.; Pirotte P.; Masin F.; *J. Phys. Chem. B* 2005, 109, 175
Bertani P.; Raya J.; Reinheimer P.; Gougeon R.; Delmotte L.; Hirschinger J.; *Solid State Magn. Res.* 1999, 13, 219
Yokomichi H.; Morigaki K.; *J. Non-Cryst. Solids* 2000, 266, 797
Yokomichi H.; Hayashi T.; Amano T.; Masuda A.; *J. Non-Cryst. Solids* 1998, 227, 641
Takai K.; Sato H.; Enoki T.; Yoshida N.; Okino F.; Touhara H.; Endo M.; *Mol. Cryst. Liq. Cryst.* 2000, 340, 289
Kupta V.; Nakajima T.; Ohzawa Y.; Zemva B.; *J. Fluorine Chem.* 2003, 120, 143

We claim:

1. An electrochemical device comprising a first electrode, a second electrode, and an ion transporting material disposed therebetween, wherein the first electrode comprises a fluorinated carbon nanomaterial obtained by direct fluorination of a carbon nanomaterial, the fluorinated carbon nanomaterial comprising a fluorination product which includes carbon atoms covalently bound to fluorine atoms and having an average chemical composition $CF_x$ wherein x is the atomic ration of fluorine to carbon and has a value between 0.39 and 0.95, wherein the carbon nanomaterial has a substantially ordered multi-layered structure prior to fluorination, the layers of carbon being non-planar, and the carbon nanomaterial is selected from the group consisting of multiwalled carbon nanotubes and multi-layered carbon nanofibers.

2. The device of claim 1, wherein the carbon nanomaterial is a carbon nanofiber having a diameter between 40 nm and 1000 nm.

3. The device of claim 1, wherein the average ratio of fluorine to carbon is between 0.39 and 0.86 and the fluorination product further includes $sp^3$ carbon atoms covalently bound to carbon atoms.

4. The device of claim 1, wherein the average ratio of fluorine to carbon is between from 0.59 to 0.86, the material includes a second fluorination product in which carbon is non-covalently bound to fluorine and the first fluorination product further includes $sp^3$ carbon atoms covalently bound to carbon atoms.

5. The material of claim 1, wherein the carbon nanomaterial is a multiwalled carbon nanotube having a diameter greater than 10 nm.

6. The device of claim 1, wherein the average ratio of fluorine to carbon is between 0.6 and 0.8.

7. The device of claim 3, wherein the fluorinated carbon nanomaterial comprises an unfluorinated carbon phase, wherein the unfluorinated carbon phase displays an x-ray diffraction peak in the 24.6-26.6 degrees angle range using a Cu $K_\alpha$ radiation source.

8. The device of claim 1, wherein the fluorinated carbon nanomaterial is in a composition further comprising a conductive diluent and a binder.

9. The device of claim 8, wherein the conductive diluent is selected from the group consisting of acetylene black, carbon black, powdered graphite, cokes, carbon fibers, metallic powders, and combinations thereof.

10. The device of claim 8, wherein the binder is polymeric.

11. The device of claim 10, wherein the binder is a fluorinated hydrocarbon polymer.

12. The device of claim 1, wherein the second electrode comprises a source of ions of a metal selected from Groups 1, 2, and 3 of the Periodic Table of Elements.

13. The device of claim 12, wherein the ions are lithium ions.

14. The device of claim 13, wherein the source of lithium ions is selected from the group consisting of lithium metal, a lithium alloy, and a carbon-lithium material.

15. The device of claim 14, wherein the source of lithium ions is lithium metal or a lithium alloy.

16. The device of claim 1, wherein the ion-transporting material physically separates the first and the second electrode and prevents direct electrical contact therebetween.

17. The device of claim 16, wherein the ion-transporting material comprises a polymeric material and a nonaqueous electrolyte.

18. The device of claim 7, wherein the average ratio of fluorine to carbon is between 0.39 and 0.68.

19. The device of claim 1, wherein the fluorinated material displays a) an X-ray diffraction peak in the 9.8-15 degrees angle range, b) a $^{19}F$ NMR peak in the range between (−180) ppm and (−200) ppm/$CFCl_3$, and c) three $^{13}C$ NMR peaks: a first peak in the 100-150 ppm/TMS range, a second peak in the 84-88 ppm/TMS range and a third peak in the 42-48 ppm/TMS range.

20. The device of claim 19, wherein the average ratio of carbon to fluorine is between 0.68 and 0.86.

* * * * *